(12) United States Patent
Sustaeta et al.

(10) Patent No.: US 8,914,300 B2
(45) Date of Patent: Dec. 16, 2014

(54) SYSTEM AND METHOD FOR DYNAMIC MULTI-OBJECTIVE OPTIMIZATION OF MACHINE SELECTION, INTEGRATION AND UTILIZATION

(75) Inventors: Angel Sustaeta, Austin, TX (US); Ka-Hing Lin, Markham (CA); Ric Snyder, Austin, TX (US); John Christopher Theron, Laguna Beach, CA (US); Mark Funderburk, Austin, TX (US); Michael Eugene Sugars, Elgin, TX (US); Frederick M. Discenzo, Brecksville, OH (US); John J. Baier, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 711 days.

(21) Appl. No.: 12/242,552

(22) Filed: Sep. 30, 2008

(65) Prior Publication Data

US 2009/0204245 A1 Aug. 13, 2009

Related U.S. Application Data

(63) Continuation-in-part of application No. 10/674,966, filed on Sep. 30, 2003, now Pat. No. 7,797,062, which is a continuation-in-part of application No. 10/214,927, filed on Aug. 7, 2002, now Pat. No. 6,847,854.

(60) Provisional application No. 60/311,596, filed on Aug. 10, 2001, provisional application No. 60/311,880, filed on Aug. 13, 2001.

(51) Int. Cl.
*G06Q 10/00* (2012.01)
*G06Q 10/06* (2012.01)

(52) U.S. Cl.
CPC ............................... *G06Q 10/06* (2013.01)
USPC ..................... 705/7.12; 705/7.37; 700/99

(58) Field of Classification Search
CPC ................................................ G06Q 10/06
USPC ..................... 705/7.12, 7.37; 700/99
See application file for complete search history.

(56) References Cited

U.S. PATENT DOCUMENTS 2,320,492 A * 6/1943 Walker ....................... 73/152.38
3,913,829 A 10/1975 Fink
(Continued)

FOREIGN PATENT DOCUMENTS

| EP | 1286289 A2 | 2/2003 |
| EP | 1316866 A1 | 6/2003 |
| GB | 2281132 | 2/1995 |

OTHER PUBLICATIONS

Terry Owen, Paul Moylan. Optimization software leads to profitability. Manufacturing Systems. Nov. 1999. vol. 17, Iss. 11; p. 58 (5 pages).*

(Continued)

*Primary Examiner* — Timothy Padot
(74) *Attorney, Agent, or Firm* — Amin, Turocy & Watson, LLP

(57) ABSTRACT

The invention provides control systems and methodologies for controlling a process having computer-controlled equipment, which provide for optimized process performance according to one or more performance criteria, such as efficiency, component life expectancy, safety, emissions, noise, vibration, operational cost, or the like. More particularly, the subject invention provides for employing machine diagnostic and/or prognostic information in connection with optimizing an overall business operation over a time horizon.

20 Claims, 40 Drawing Sheets

(56) References Cited

U.S. PATENT DOCUMENTS

| | | | |
|---|---|---|---|
| 4,508,261 | A | 4/1985 | Blank |
| 5,311,123 | A | 5/1994 | Webster et al. |
| 5,347,466 | A | 9/1994 | Nichols et al. |
| 5,377,308 | A | 12/1994 | Inoue et al. |
| 5,461,570 | A | 10/1995 | Wang |
| 5,486,995 | A * | 1/1996 | Krist et al. ............... 700/29 |
| 5,630,070 | A * | 5/1997 | Dietrich et al. ............ 705/7.23 |
| 5,680,541 | A | 10/1997 | Kurosu et al. |
| 5,732,193 | A | 3/1998 | Aberson |
| 5,737,215 | A | 4/1998 | Schricker et al. |
| 5,873,251 | A * | 2/1999 | Iino ............................. 60/660 |
| 5,917,428 | A | 6/1999 | Discenzo et al. |
| 6,014,598 | A | 1/2000 | Duyar et al. |
| 6,021,402 | A | 2/2000 | Takriti |
| 6,041,287 | A | 3/2000 | Dister et al. |
| 6,111,643 | A | 8/2000 | Discenzo et al. |
| 6,119,074 | A | 9/2000 | Sarangapani |
| 6,233,493 | B1 * | 5/2001 | Cherneff et al. ............ 700/95 |
| 6,243,615 | B1 | 6/2001 | Neway |
| 6,260,004 | B1 | 7/2001 | Hays et al. |
| 6,262,550 | B1 | 7/2001 | Kliman et al. |
| 6,289,735 | B1 | 9/2001 | Dister |
| 6,295,510 | B1 | 9/2001 | Discenzo |
| 6,298,308 | B1 | 10/2001 | Reid et al. |
| 6,326,758 | B1 | 12/2001 | Discenzo |
| 6,330,525 | B1 | 12/2001 | Hays et al. |
| 6,341,266 | B1 | 1/2002 | Braun |
| 6,359,690 | B1 | 3/2002 | Discenzo et al. |
| 6,434,512 | B1 | 8/2002 | Discenzo |
| 6,553,816 | B1 | 4/2003 | Palanisamy et al. |
| 6,556,884 | B1 | 4/2003 | Miller et al. |
| 6,560,549 | B2 | 5/2003 | Fonkalsrud et al. |
| 6,567,752 | B2 | 5/2003 | Cusumano et al. |
| 6,619,111 | B2 | 9/2003 | Soneda et al. |
| 6,633,790 | B2 | 10/2003 | Gartstein |
| 6,681,156 | B1 | 1/2004 | Weiss |
| 6,691,007 | B2 | 2/2004 | Haugse et al. |
| 6,795,798 | B2 | 9/2004 | Eryurek et al. |
| 6,826,538 | B1 * | 11/2004 | Kalyan et al. ............ 705/7.25 |
| 6,847,854 | B2 | 1/2005 | Discenzo |
| 7,050,873 | B1 | 5/2006 | Discenzo |
| 7,085,615 | B2 | 8/2006 | Persson et al. |
| 7,143,016 | B1 | 11/2006 | Discenzo et al. |
| 7,206,644 | B2 | 4/2007 | Lino et al. |
| 7,627,493 | B1 | 12/2009 | Sarthi et al. |
| 7,860,737 | B2 | 12/2010 | Jordan et al. |
| 7,966,214 | B2 | 6/2011 | Denton et al. |
| 2002/0013635 | A1 | 1/2002 | Gotou et al. |
| 2002/0049653 | A1 * | 4/2002 | Johnson et al. ............ 705/35 |
| 2002/0065581 | A1 | 5/2002 | Fasca |
| 2002/0099580 | A1 | 7/2002 | Eicher et al. |
| 2002/0123864 | A1 * | 9/2002 | Eryurek et al. ............ 702/188 |
| 2003/0023336 | A1 | 1/2003 | Kreidler et al. |
| 2003/0023466 | A1 | 1/2003 | Harper et al. |
| 2003/0061004 | A1 | 3/2003 | Discenzo |
| 2003/0061091 | A1 | 3/2003 | Amaratunga et al. |
| 2003/0154144 | A1 | 8/2003 | Pokorny et al. |
| 2003/0167146 | A1 * | 9/2003 | Tezuka et al. ............. 702/129 |
| 2003/0172002 | A1 * | 9/2003 | Spira et al. ................ 705/27 |
| 2003/0208394 | A1 | 11/2003 | Burris et al. |
| 2004/0049715 | A1 | 3/2004 | Jaw |
| 2004/0073505 | A1 * | 4/2004 | Wright ....................... 705/36 |
| 2004/0117236 | A1 | 6/2004 | Subramanian et al. |
| 2004/0167677 | A1 | 8/2004 | Weiss |
| 2004/0186605 | A1 | 9/2004 | Wu et al. |
| 2004/0236450 | A1 | 11/2004 | Bryant et al. |
| 2004/0267394 | A1 | 12/2004 | Kempf et al. |
| 2004/0267395 | A1 | 12/2004 | Discenzo et al. |
| 2005/0234579 | A1 | 10/2005 | Asmundsson et al. |
| 2006/0241986 | A1 | 10/2006 | Harper |
| 2006/0259173 | A1 | 11/2006 | Chin et al. |

OTHER PUBLICATIONS

Stephen W Griffith. Optimization software helps earn highest possible profits. Wood Technology. San Francisco: Apr. 1999. vol. 126, Iss. 3; p. 16, 4 pgs.*

Roemer, et al. "Advanced Diagnostics and Prognostics for Gas Turbine Engine Risk Assessment," 2000 IEEE Aerospace Conference Proceedings, vol. 6, pp. 345-353.

European Search Report dated Dec. 28, 2005 for European Application Serial No. EP02017924.8, 3 pgs.

Friend, Richard. "A Probabilistic, Diagnostic and Prognostic System for Engine Health and Usage Management," 2000 IEEE Aerospace Conference Proceedings, vol. 6, pp. 185-192.

Panahi, et al. "DSPs Excel in Motor Control Applications", Published online at [http://www.edn.com/archives/1997/081597/17df_04.htm] on Aug. 15, 1997, retrieved Aug. 6, 2009. 7 pages.

Discenzo, Fred M. "Next Generation Pump Systems Enable New Opportunities for Asset Management and Economic Optimization", Proceedings of the 19th International Pump Users Symposium, pp. 9-16, 2002.

EP Search Report for European Patent Application No. 04022971.8-1239 / 1521152 dated Aug. 4, 2009, 3 pages.

OA dated Sep. 17, 2008 for U.S. Appl. No. 10/674,966, 28 pages.
OA dated May 11, 2009 for U.S. Appl. No. 10/674,966, 97 pages.
OA mailed Apr. 21, 2004 for U.S. Appl. No. 10/214,927, 6 pages.
OA mailed Aug. 10, 2007 for U.S. Appl. No. 10/674,966, 19 pages.
OA mailed Feb. 21, 2008 for U.S. Appl. No. 10/674,966, 21 pages.
OA mailed Jan. 29, 2007 for U.S. Appl. No. 10/674,966, 14 pages.
OA mailed Mar. 24, 2006 for U.S. Appl. No. 10/674,966, 15 pages.
OA mailed Aug. 10, 2006 for U.S. Appl. No. 10/674,966, 16 pages.
OA mailed Oct. 5, 2005 for U.S. Appl. No. 10/674,966, 15 pages.
OA mailed Aug. 3, 2005 for U.S. Appl. No. 10/970,229, 5 pages.
OA mailed Mar. 14, 2005 for U.S. Appl. No. 10/970,229, 8 pages.
OA mailed Nov. 24, 2009 for U.S. Appl. No. 10/674,966, 48 pages.
OA dated Mar. 29, 2011 for U.S. Appl. No. 12/242,544, 42 pages.
OA dated Apr. 12, 2011 for U.S. Appl. No. 12/856,304, 52 pages.
European Search Report dated Oct. 10, 2011 for European Application No. 09171632.4-2221 / 2172887, 8 pages.
OA dated Sep. 15, 2011 for U.S. Appl. No. 12/242,525, 46 pages.
OA dated Sep. 12, 2011 for U.S. Appl. No. 12/242,529, 40 pages.
OA dated Oct. 14, 2011 for U.S. Appl. No. 12/242,544, 37 pages.
OA dated Nov. 14, 2011 for U.S. Appl. No. 12/242,546, 46 pages.
OA dated Feb. 15, 2012 for U.S. Appl. No. 12/242,525, 42 pages.
OA dated Mar. 23, 2012 for U.S. Appl. No. 12/242,529, 54 pages.
Sridhar Mahadevan, Nicholas Marchalleck Tapas K Das and Abhijit Gosavi. Self_Improving Factory Simulation using Continuous_time Average_Reward Reinforcement Learning. Department of Computer Science and Engineering University of South Florida. p. 1-9.
OA dated Jun. 20, 2012 for U.S. Appl. No. 12/242,546, 47 pages.
OA dated Jun. 4, 2012 for U.S. Appl. No. 12/242,544, 31 pages.
OA dated Sep. 21, 2012 for U.S. Appl. No. 12/242,525, 58 pages.
OA dated Nov. 6, 2012 for U.S. Appl. No. 12/242,544, 25 pages.
Office Action dated Feb. 21, 2013 for U.S. Appl. No. 12/242,525, 60 pages.
Office Action dated Jul. 24, 2013 for U.S. Appl. No. 12/242,525, 57 pages.

* cited by examiner

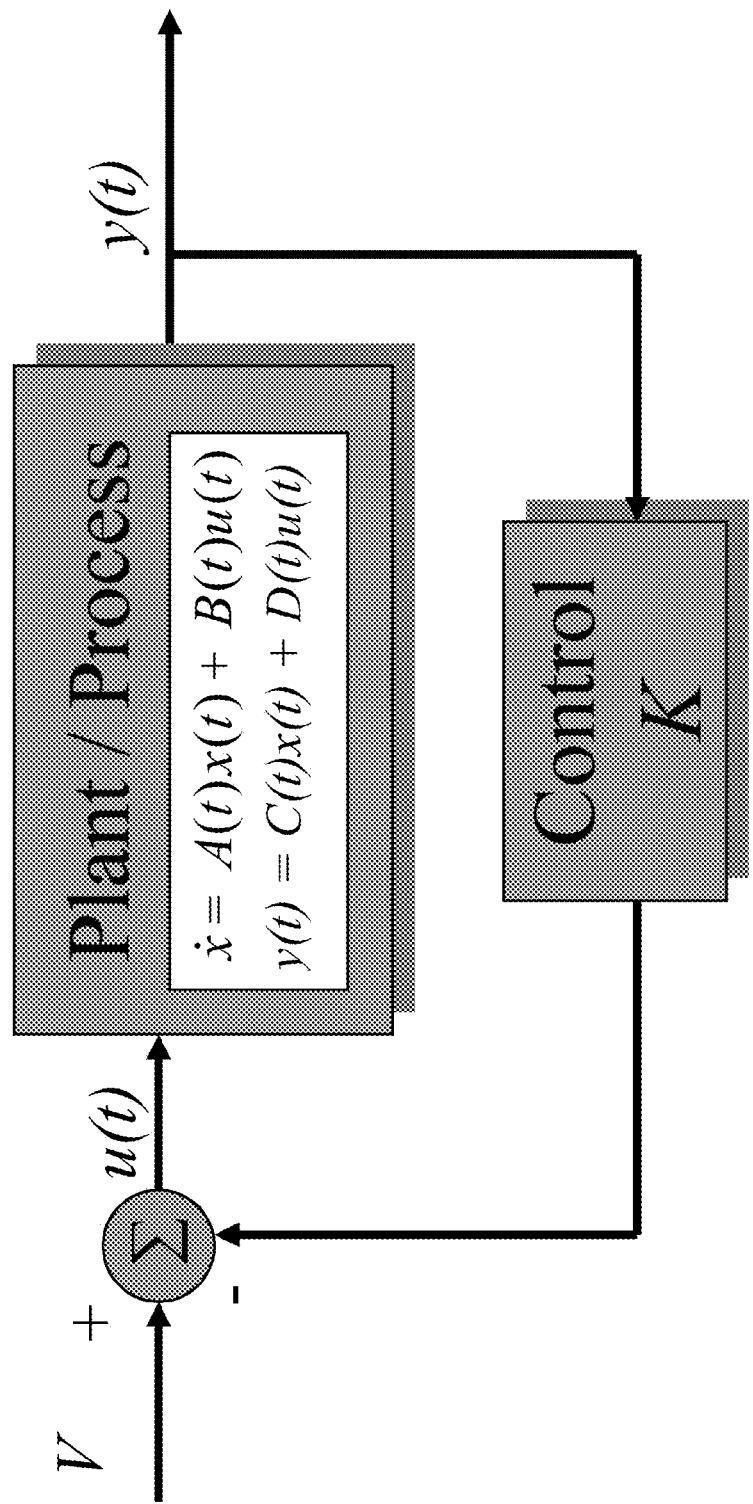

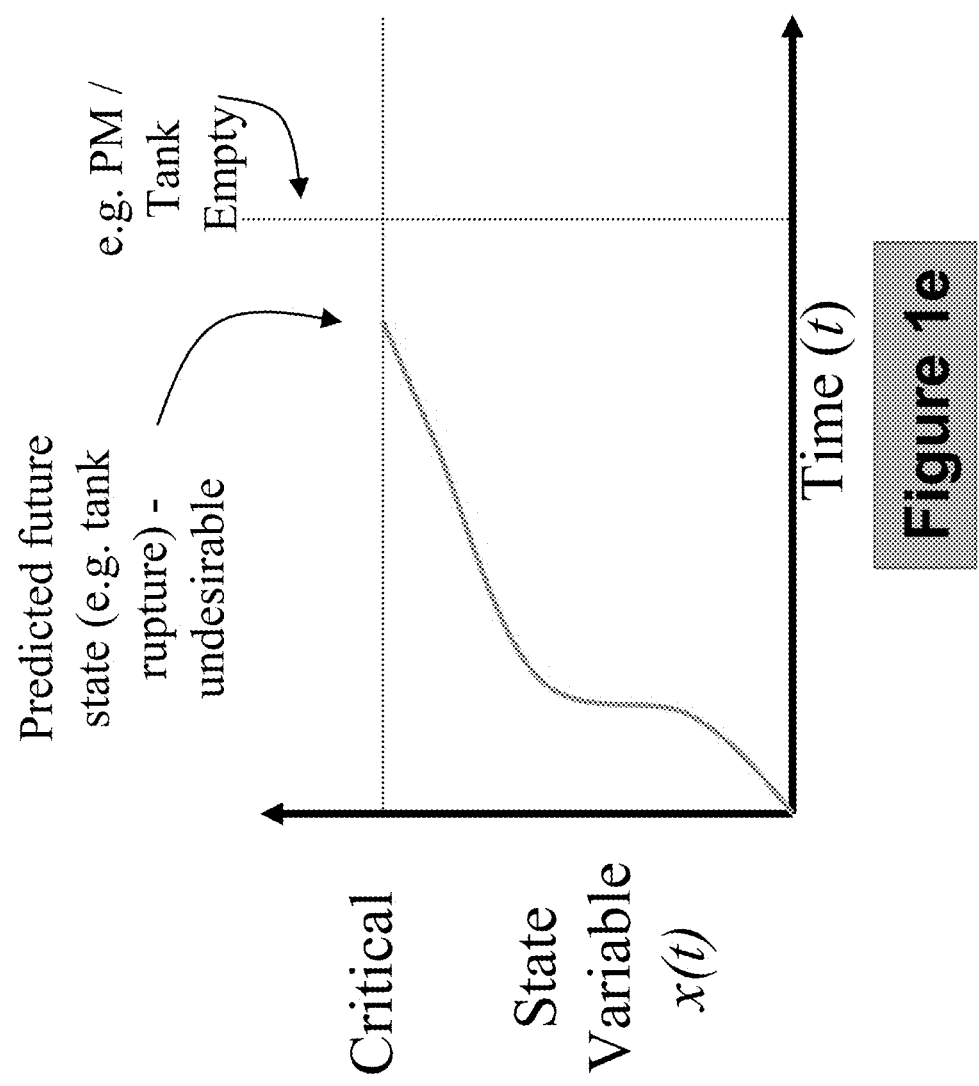

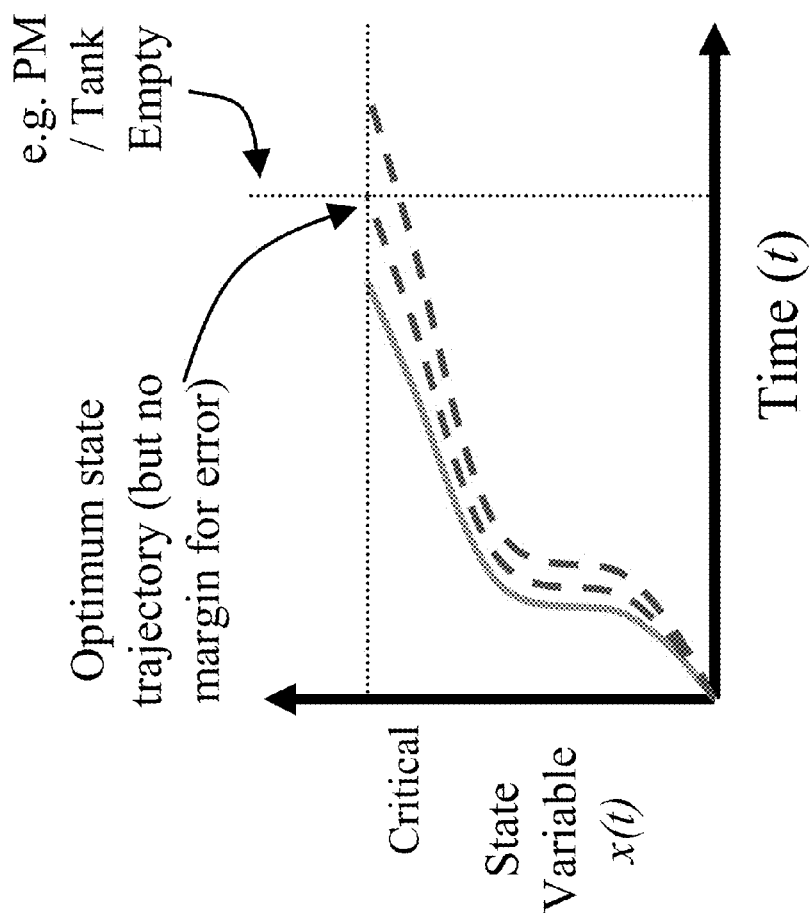

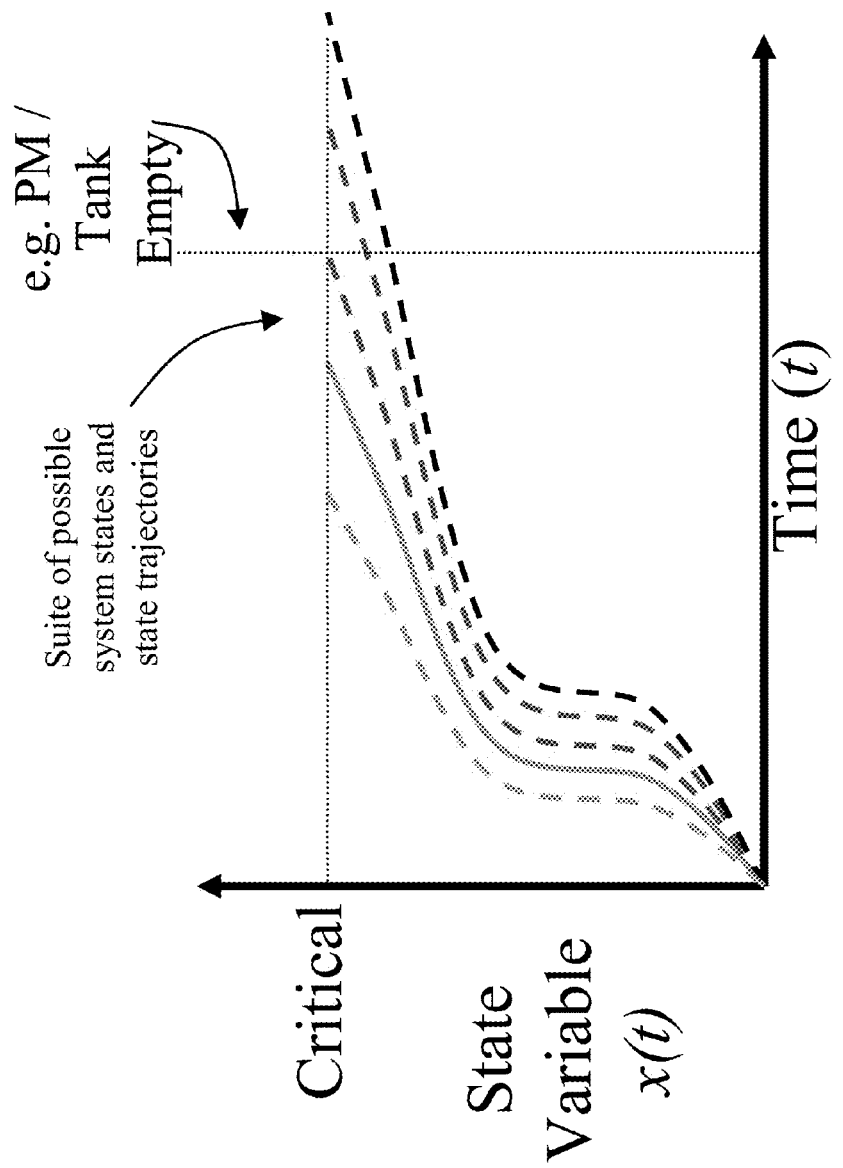

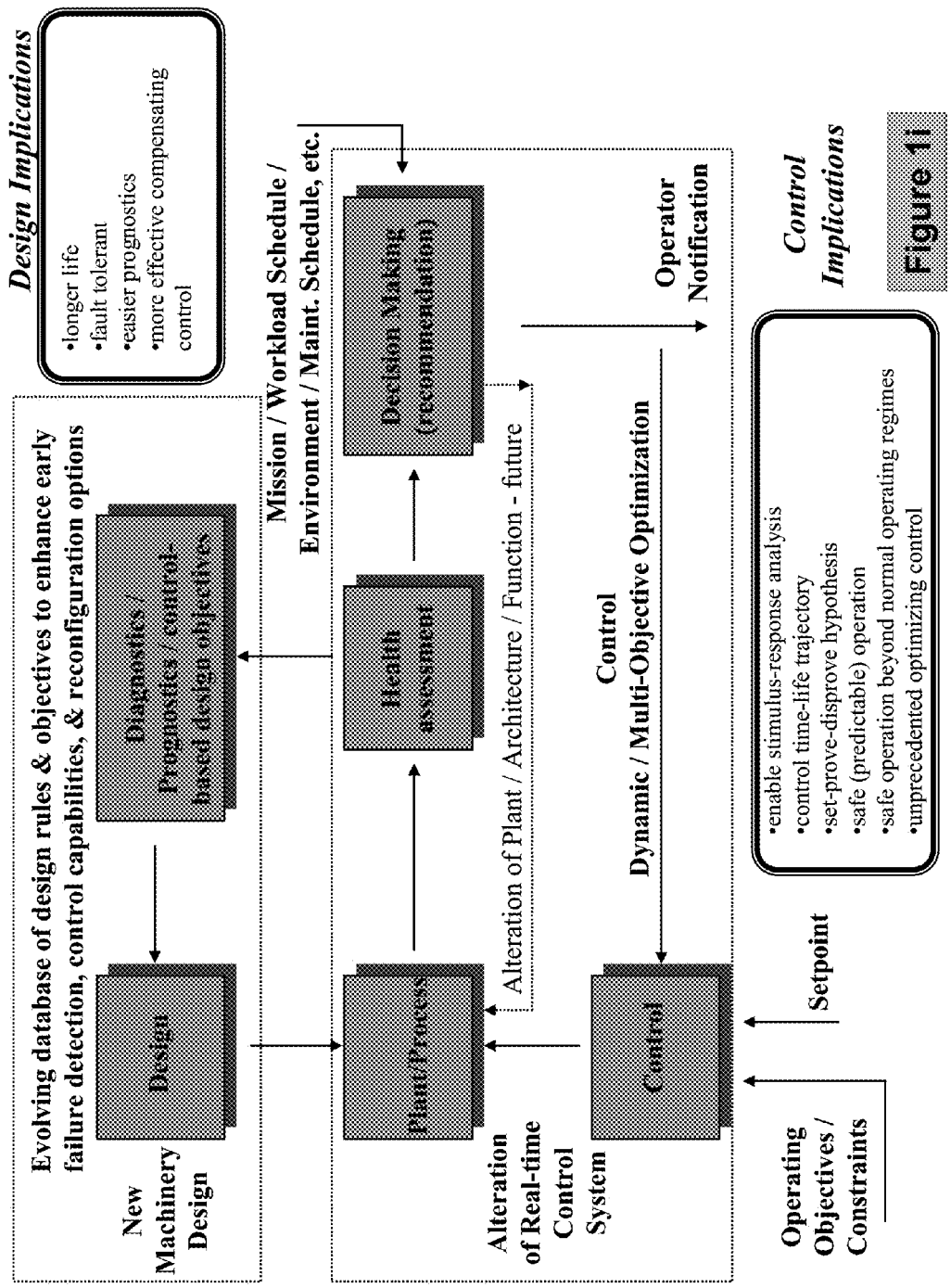

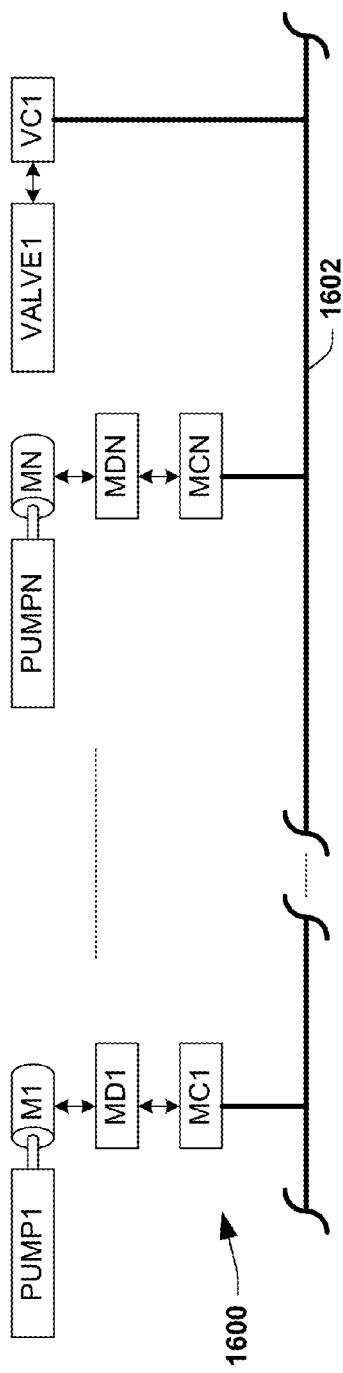
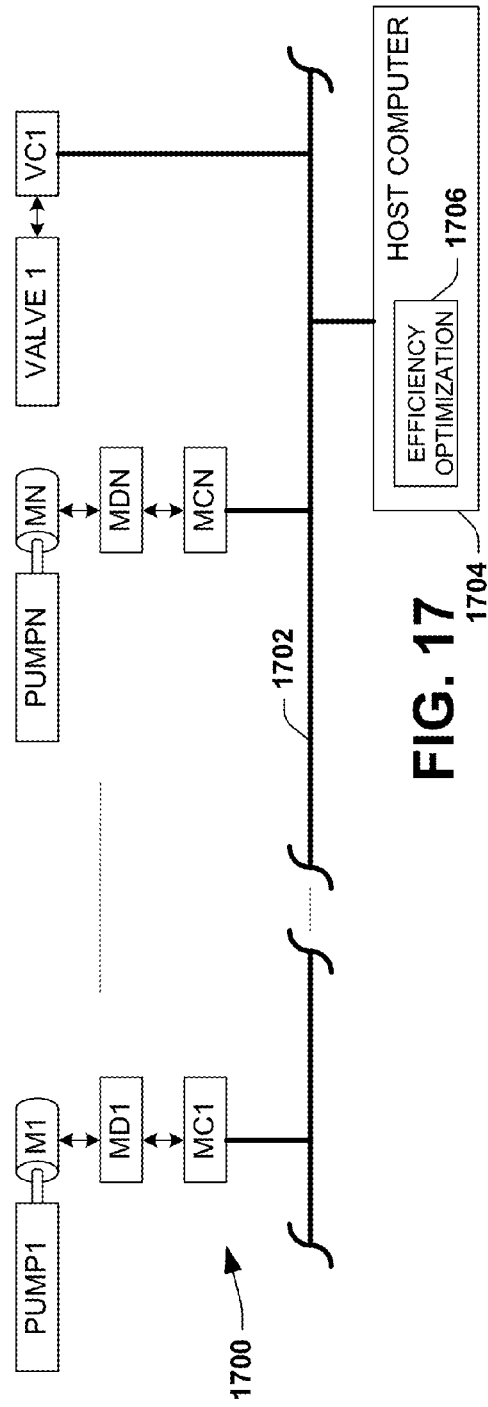

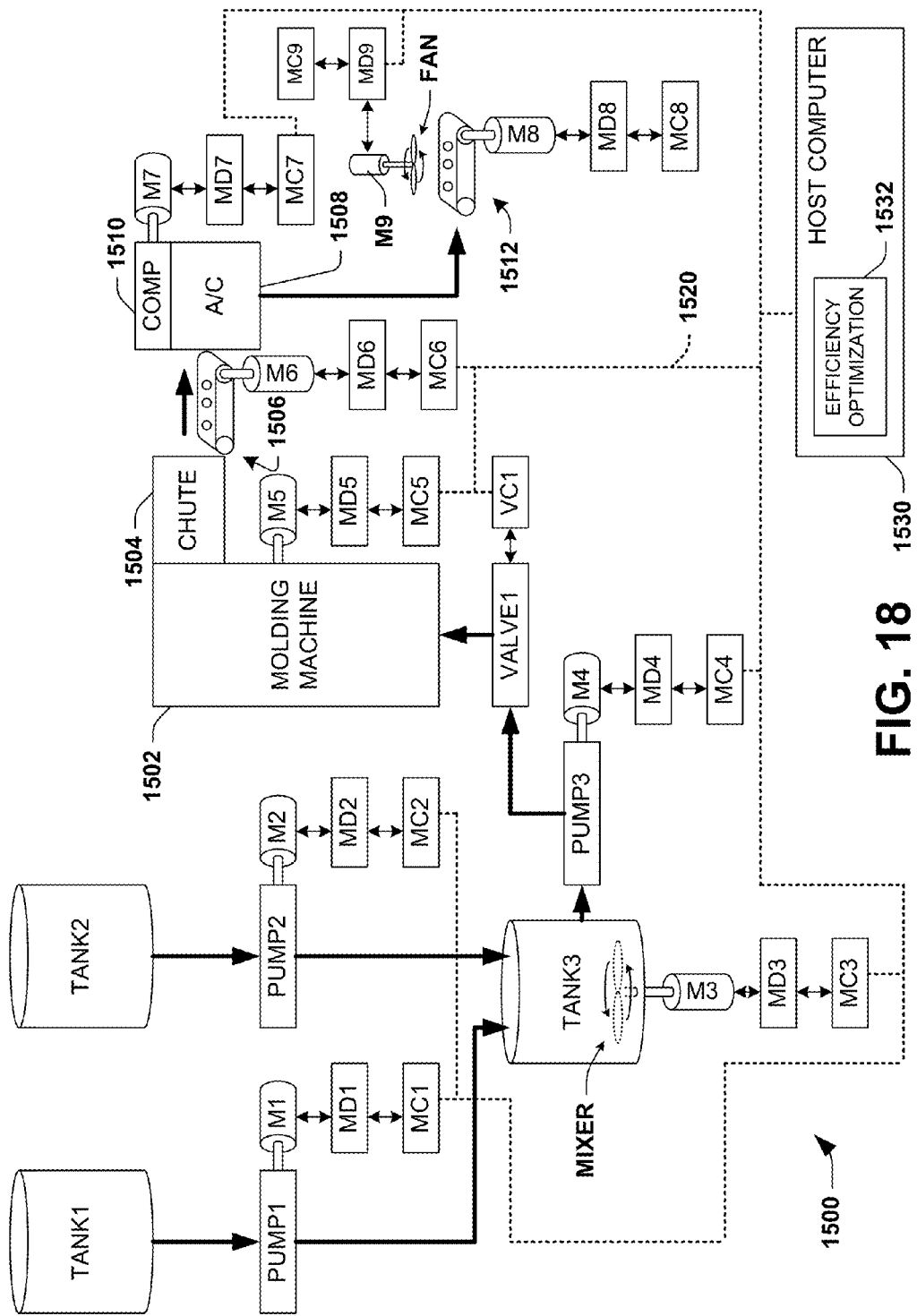

SYSTEM AND METHOD FOR DYNAMIC MULTI-OBJECTIVE OPTIMIZATION OF MACHINE SELECTION, INTEGRATION AND UTILIZATION

CROSS REFERENCE TO RELATED APPLICATIONS

This application is a continuation in part application of co-pending U.S. Ser. No. 10/674,966, entitled SYSTEM AND METHOD FOR DYNAMIC MULTI-OBJECTIVE OPTIMIZATION OF MACHINE SELECTION, INTEGRATION AND UTILIZATION, filed on Sep. 30, 2003, which is a continuation in part application of U.S. Ser. No. 10/214,927, entitled SYSTEM AND METHOD FOR DYNAMIC MULTI-OBJECTIVE OPTIMIZATION OF MACHINE SELECTION, INTEGRATION AND UTILIZATION, filed on Aug. 7, 2002, which claims the benefit of U.S. Provisional Patent Application Ser. No. 60/311,880, filed Aug. 13, 2001, entitled INTELLIGENT PUMPING SYSTEMS ENABLE NEW OPPORTUNITIES FOR ASSET MANAGEMENT AND ECONOMIC OPTIMIZATION, and U.S. Provisional Patent Application Ser. No. 60/311,596, filed Aug. 10, 2001, entitled INTELLIGENT PUMPING SYSTEMS ENABLE NEW OPPORTUNITIES FOR ASSET MANAGEMENT AND ECONOMIC OPTIMIZATION; the disclosures of which are hereby incorporated by reference as if fully set forth herein.

TECHNICAL FIELD

The present invention relates to the art of dynamic diagnostics and prognostics of systems, machines, processes and computing devices; and more particularly the invention relates to control system and methods for selecting, controlling and optimizing utilization of machinery primarily in an industrial automation environment. The invention provides for integration of control methods and strategies with decision support and logistics systems to optimize specifically defined operational and performance objectives.

BACKGROUND

The global economy has forced many businesses to operate and conduct business in an ever increasingly efficient manner due to increased competition. Accordingly, inefficiencies that were once tolerated by corporations, due to a prior parochial nature of customers and suppliers, now have to be removed or mitigated so that the respective corporations can effectively compete in a vastly dynamic, global marketplace. Furthermore, the intense desire to operate "green" facilities that are environmentally friendly and to insure worker safety provides additional motivation to minimize waste, scrap, and insure a reliable, safe process that will not fail unexpectedly.

Many industrial processes and machines are controlled and/or powered by electric motors. Such processes and machines include pumps providing fluid transport for chemical and other processes, fans, conveyor systems, compressors, gear boxes, motion control devices, HVAC systems, screw pumps, and mixers, as well as hydraulic and pneumatic machines driven by motors. Such motors are combined with other system components, such as valves, pumps, furnaces, heaters, chillers, conveyor rollers, fans, compressors, gearboxes, and the like, as well as with appropriate power control devices such as motor starters and motor drives, to form industrial machines and actuators. For example, an electric motor may be combined with a motor drive providing variable electrical power to the motor, as well as with a pump, whereby the motor rotates the pump shaft to create a controllable pumping system.

The components parts used to build such motorized systems (e.g., pumps, motors, motor drives . . . ) are commonly chosen according to specifications for a particular application or process in which the motorized system is to be employed. For instance, a set of specifications for a motorized pumping system may include fluid properties (e.g. viscosity, specific gravity), suction head available, flow rates or discharge pressures or ranges thereof, which the system must accommodate for use in a particular application. In such a case, the pump is chosen according to the maximum and minimum flow and head required in the application, and the motor is selected based on the chosen pump hydraulic power requirements, and other electrical and mechanical considerations. The corresponding motor drive is selected according to the motor specifications. Other pumping system components may then be selected according to the chosen motor, pump, motor drive, control requirements, and sensor input which may include motor speed sensors, pressure sensors, flow sensors, and the like.

Such system design specifications are typically driven by maximum operating conditions, such as the maximum flow rate the pumping system is to achieve, which in turn drives the specifications for the component parts. For instance, the motor may be selected according to the ability to provide the necessary shaft speed and torque for the pump to achieve the maximum required flow rate required for the process. Thus, the typical motorized system comprises components rated according to maximum operational performance needed. However, the system may seldom, if ever, be operated at these levels. For example, a pump system rated to achieve a maximum flow rate of 100 gallons per minute (GPM) may be operated at a much lower flow rate for the majority of its operating life.

In facilities where such motorized systems are employed, other operational performances characteristics may be of interest, apart from the rated output of the motorized system. For instance, the cost of operating a pumping system is commonly of interest in a manufacturing facility employing the system. The component parts of such a pumping system typically include performance ratings or curves relating to the efficiency of the component parts at various operating conditions. The energy efficiency, for example, may be a measure of the transferred power of the component device, which may be expressed as a percentage of the ratio of output power (e.g., power delivered by the device) to input power (e.g., power consumed by the device). These performance curves typically include one or more operating points at which the component operates at maximum efficiency. In addition to the optimal efficiency operating point, the components may have other operating points at which other performance characteristics are optimal, such as expected lifetime, mean time between failures (MTBF), acoustic emissions or vibration output, time between expected servicing, safety, pollution emissions, or the like.

While the operating specifications for the components in a motorized (e.g., pumping) system may provide for component device selection to achieve one or more system operational maxima (e.g., maximum flow rate for a pumping system), other performance metrics (e.g., efficiency, cost, lifetime, MTBF . . . ) for the components and/or the system of which they form a part, are not typically optimal at the actual operating conditions. Thus, even where the efficiency ratings for a pump, motor, and motor drive in a motorized pumping system provide for maximum efficiency at or near the maximum flow rate specified for the pumping system, the efficiency of one or more of these components (e.g., as well as that of the pumping system overall) may be relatively poor for other flow rates at which the system may operate for the majority of the service life thereof. In addition, motors, pumps, and drives are sized to meet the application requirements. Each of these components have different operating characteristics such that the efficient operating point of a motor is at a different speed and load than the efficient operating point of the connected pump. Separate selection of components based on cost or individual efficiencies will result in an integrated system that is sub-optimal with regard to efficiency, throughput, or other optimization criteria.

Moreover, typically, the specification for such machines or components thereof is performed at an isolated or level of granularity such that higher-level aspects of a business or industrial concern are overlooked. Thus, there is a need for methods and systems by which efficiency and other performance characteristics associated with selecting and utilizing motorized systems and components thereof may be improved.

SUMMARY

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The subject invention provides for employing machine diagnostic and/or prognostic information in connection with optimizing an overall business operation. The scope of business operation can include plant-wide or enterprise business objectives and mission objectives such as for example that which may be required for aircraft, Naval ships, nuclear, or military systems or components.

Systems, networks, processes, machines, computers . . . employing the subject invention can be made to operate with improved efficiency, less down-time, and/or extended life, and/or greater reliability, as well enhancing systems/processes that are a superset thereof. Diagnostics and/or prognostics in accordance with the invention can be effected dynamically as well as in situ with respect to various operations/processes. Moreover, the invention provides for optimizing utilization of diagnostic/prognostic schemes via employment of a utility-based approach that factors cost associated with taking an action (including an incorrect action or no action) with benefits associated with the action (or of inaction). Moreover, for example, such action can relate to dissemination of the diagnostic/prognostic data and/or an action taken in connection with an analysis of the data. The data dissemination can be effected via polling techniques, beaconing techniques, heartbeat schemes, broadcast schemes, watchdog schemes, blackboard schemes, and/or a combination thereof. Accordingly, state information can be employed in order to determine which scheme or combination or order would lead to greatest utility in connection with desired goal(s).

The subject invention provides for addressing concerns associated with taking automated action in connection with valuable and/or critical systems or methods. For example, security issues arise with respect to permitting automated action—the subject invention provides for employment of various security based schemes (e.g., authentication, encryption, . . . ) to facilitate maintaining control as well as access to such systems/processes. The invention can also take into consideration levels of security and criticality of processes/systems of a network. For example, automated action in connection with a critical process (e.g., power, life support, fire suppression, HVAC . . . ) can only be taken after high security measures have been applied as well as such action only being taken with a high-level confidence level (e.g., 99% probability of a correct inference) that the automated action is the correct action to take given the current evidence (e.g., current state information and predicted state).

Moreover, another aspect of the invention provides for employment of prognostics/diagnostics to optimize quality control of products to be manufactured and/or delivered. For example, inference as to future state of a component and effect of such future state on production of a product can be employed as part of a closed-loop system that provides for adjusting processing parameters in situ so as to dynamically correct for variances associated with the inferred state that could impact quality and/or quantity of the product. It is to be appreciated that such techniques can be applied as part of an enterprise resource planning (ERP) system to facilitate forecasting events/parameters (e.g., capacity, supplier throughput, inventory, production, logistics, billing, design, that might impact an enterprise. As will be discussed in greater detail infra, one particular aspect of the invention can employ technologies such as radio frequency identification (RFID) tags in connection with failure prediction, product throughput analysis, line diagnosis, inventory management, and production control among other technologies.

One particular aspect of the invention provides control systems and methodologies for controlling a process having one or more motorized pumps and associated motor drives, which provide for optimized process performance according to one or more performance criteria, such as efficiency, component life expectancy, safety, electromagnetic emissions, noise, vibration, operational cost, or the like. For example, such machine data can be employed in connection with inventory control, production, marketing, utilities, profitablility, accounting, and other business concerns. Thus, the present invention abstracts such machine data so that it can be employed in connection with optimizing overall business operations as compared to many conventional systems that employ machine data solely in connection with machine maintenance, control and possibly process control or optimal control methods.

Aspects of the subject invention employ various high-level data analysis, modeling and utilization schemes in connection with providing some of the advantages associated with the invention. For example, Bayesian Belief Networks can be employed in connection with the subject invention. A probabilistic determination model and analysis can be performed at various levels of data to factor the probabilistic effect of an event on various business concerns given various levels of uncertainty as well as the costs associated with an making an incorrect inference as to prognosing an event and its associated weight with respect to the overall business concern. Statistical, probabilistic, and evidence or belief-based, and/or various rule-based approaches can also be employed in connection with the invention. The present invention takes into consideration that the benefits of machinery monitoring and condition-based maintenance can be significantly enhanced by integrating real-time diagnostics and prognostics techniques within the framework of an automatic control system. System operation can be prescribed based on the predicted or probabalistic state or condition of the machinery in conjunction with the anticipated workload or demand or probabalistic demand and the business strategy along with other operational and performance constraints. The generated decision space may be evaluated to facilitate that suitably robust operational and/or machinery decisions are made that maximize specified business objective(s) such as revenue generation, life cycle cost, energy utilization, and/or machinery longevity. Thus the subject invention integrates diagnostics and/or prognostics with control linked with business objectives and strategies to provide unique opportunities for dynamic compensating control and ultimately for managing and optimizing system asset utilization. This may be performed in consideration for uncertainty and belief in diagnostics and prognostics, control and performance expectations, and business uncertainties and likelihoods.

In accordance with another aspect of the invention, an intelligent agent scheme can be employed wherein various machines, physical entities, software entities, can be modeled and represented by intelligent software agents that serve as proxies for the respective machines or entities. These agents can be designed to interact with one another and facilitate converging on various modifications and control of the machines of entities in connection with efficiently optimizing an overall business concern. Lower level agents can collaborate and negotiate to achieve lower level process objectives in an optimal manner and integrate this information to higher level agents. Agents, can compete with each other for limited resources and become antagonistic in order to realize critical objectives in a save, reliable, and optimum manner. Moreover, the agents can comprise a highly distributed system controlling the operation of a complex dynamic process. There may not exist a central point or control or coordination of the system. Rather information is distributed among the various agents. Groups of agents can form clusters to promote meeting operational objectives such as local agent goals as well as to promote collaboration in meeting higher-level system goals and objectives. During negotiation for services and functions, local agents can also provide "cost" information to other agents indicating efficiency, energy utilization, or robustness for example. Agents can assign functions and control modes to particular agents based on a comparison and optimization of the specified cost function or operational objective or objectives to be optimized.

Moreover, it is to be appreciated the subject invention can be employed in connection with initial specification, layout and design of an industrial automation system (e.g., process, factory) such that high-level business objectives (e.g., expected revenue, overhead, throughput, growth) are considered in connection with predicted machine characteristics (e.g., life cycle cost, maintenance, downtime, health, efficiency, operating costs) so as to converge on specifications, layout, and design of the industrial automation system so that a mapping to the high-level business objectives is more closely met as compared to conventional schemes where such layout and design is performed in more or less an ad hoc, manual and arbitrary manner. Integrating information regarding opportunities for real-time prognostics and optimizing control can influence the initial design and configuration of the system to provide additional degrees of freedom and enhance the capability for subsequent prognostics and optimizing and compensating control.

Predicted operating state(s) of the machine may be determined based on expected demand or workload or a probabalistic estimate of future workload or demand. Similarly, expected environment (e.g., temperature, pressure, vibration, . . . ) information and possible expected damage information may be considered in establishing the predicted future state of the system. Undesirable future states of the system can be avoided or deferred through a suitable change in the control while achieving required operating objectives and optimizing established operational and business objectives.

Discussing at least one aspect of the invention at a more granular level, solely for sake of understanding one particular context of the invention, control systems and methods are provided for controlling a motorized system according to a setpoint (e.g., flow rate for a motorized pump system), operating limits, and a diagnostic signal, wherein the diagnostic signal is related to a diagnosed operating condition in the system (e.g., efficiency, motor fault, system component degradation, pump fault, power problem, pump cavitation . . . ). The invention thus provides for controlled operation of motors and motorized systems, wherein operation thereof takes into account desired process performance, such as control according to a process setpoint, as well as one or more other performance characteristics or metrics, related to the motorized system and/or component devices therein, whereby improvements in efficiency and other performance characteristics may be realized with allowable process and machinery operating constraints via consideration of prognostic and optimization data.

According to one aspect of the present invention, a method is provided for controlling a motorized system. A desired operating point is selected within an allowable range of operation about a system setpoint according to performance characteristics associated with a plurality of components in the system. For example, a flow rate setpoint may be provided for a motorized pump system, and a range may be provided (e.g., +/−10%) for the system to operate around the setpoint flow value. This range may correspond to a permissible range of operation where the process equipment is making a good product. The system may be operated at an operating point within this range at which one or more performance characteristics are optimized in accordance with the invention. Thus, for example, where an allowable flow control range and setpoint provide for control between upper and lower acceptable flow rates, the invention provides for selecting the operating point therebetween in order to optimize one or more system and/or component performance characteristics, such as life cycle cost, efficiency, life expectancy, safety, emissions, operational cost, MTBF, noise, and vibration.

Where the motorized system includes an electric motor operatively coupled with a pump and a motor drive providing electrical power to the motor, the performance characteristics may include efficiencies or other metrics related to the motor, the pump, and/or the motor drive. The selection of the desired operating point may comprise correlating one or more of motor efficiency information, pump efficiency information, and motor drive efficiency information in order to derive correlated system efficiency information. The desired operating point can then be selected as the optimum efficiency point within the allowable range of operation according to the correlated system efficiency information. The efficiency of the individual component devices, and hence of the pumping system, may be associated with the cost of electrical energy or power provided to the system. Consequently, the invention can be employed to control the pumping system so as to minimize power consumed by the system, within tolerance(s) of the allowable range about the process setpoint.

The invention thus allows a system operator to minimize or otherwise optimize the cost associated with pumping fluid, where for example, the cost per unit fluid pumped is minimized. Alternatively or in combination, other performance characteristics may be optimized or accounted for in the optimization in order to select the desired operating point within the allowable range. For instance, the component performance information may comprise component life cycle cost information, component efficiency information, component life expectancy information, safety information, emissions information, operational cost information, component MTBF information, MTTR, expected repair cost, noise information, and/or vibration information. In this regard, it will be recognized that the value of one or more system performance variables (e.g., temperature, flow, pressure, power . . . ) may be used in determining or selecting the desired operating point, which may be obtained through one or more sensors associated with the system, a model of the system, or a combination of these.

Another particular aspect of the invention provides a control system for controlling a process having a pump with an associated motor. The control system comprises a motor drive providing electrical power to the motor in a controlled fashion according to a control signal, and a controller providing the control signal to the motor drive according to a desired operating point within an allowable range of operation about a process setpoint. The controller selects the desired operating point according to performance characteristics associated one or more components in the process. The system can further comprise a user interface for obtaining from a user, the setpoint, allowable operating range, component performance information, and/or performance characteristic(s), which are to be optimized.

In addition, the system can obtain such information from a host computer and/or other information systems, scheduling systems, inventory systems, order entry systems, decision support systems, maintenance scheduling systems, accounting systems or control systems among others within a larger process via a network or wireless communications. Moreover, this information can be obtained via a wide area network or global communications network, such as the Internet. In this regard, the optimization of one or more performance characteristics can be optimized on a global, enterprise-wide or process-wide basis, where, for example, a single pump system may be operated at a less than optimal efficiency in order to facilitate the operation of a larger (e.g., multi-pump) process or system more efficiently. A specific pump may provide low throughput and run inefficiently to meet minimum product requirements due to the fact that another system in the enterprise can provide additional processing at a much more cost-effective rate and will be run at maximum throughput.

Yet another aspect of the invention provides for operating a motorized system, wherein a controller operatively associated with the system includes a diagnostic component to diagnose an operating condition associated with the pump. The operating conditions detected by the diagnostic component may include motor or pump faults, or failure and/or degradation, and/or failure prediction (e.g., prognostics) in one or more system components. The controller provides a control signal to the system motor drive according to a setpoint and a diagnostic signal from the diagnostic component according to the diagnosed operating condition in the pump. The diagnostic component may perform signature analysis of signals from one or more sensors associated with the pump or motorized system, in order to diagnose the operating condition.

Thus, for example, signal processing may be performed in order to ascertain wear, failure, remaining useful lifetime, or other deleterious effects on system performance, whereby the control of the system may be modified in order to prevent further degradation, extend the remaining service life of one or more system components, or to prevent unnecessary stress to other system components. In this regard, the diagnostic component may process signals related to flow, pressure, current, noise, vibration, and temperature associated with the motorized system. The altered system control may extend the life of the machinery to maximize throughput while insuring there is not failure for a specified period of time and not longer. Having the machinery live longer than the minimum necessary will require operating the machinery at an even lower level of efficiency. For example our objective may be to maximize throughput or efficiency while just meeting the minimum required lifetime and not longer.

The aforementioned novel features of the subject invention can be employed so as to optimize an overall business commensurate with set business objectives. Moreover, as business needs/objectives change, the invention can provide for dynamic adjustment and/or modification of sub-systems (e.g., machines, business components, configurations, process steps, . . . ) in order to converge toward the new operating mode that achieves the business objective in an optimum manner. Thus, the subject invention extracts and abstracts machine data (e.g., diagnostic and/or prognostic data) and employs such data not only in connection with optimizing machine utilization at a low level, but also to maximize utilization of a machine given constraints associated with high-level business objectives. Various models including simulation models, rule-based system, expert system, or other modeling techniques may be used to establish the range of possible operating conditions and evaluate their potential for optimizing machinery operation.

It is to be appreciated that in addition to industrial applications, the subject invention can be employed in connection with commercial (e.g. HVAC) and military systems (e.g. Navy ships); and such employment is intended to fall within the scope of the hereto appended claims.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIGS. 1d-1h illustrate system optimization aspects of the subject invention.

FIG. 1i illustrates a scheme that facilitates achieving a pre-planned, optimal future state in accordance with an aspect of the subject invention.

FIG. 16 is a schematic diagram illustrating an exemplary fluid transfer system having multiple pump and valve controllers networked for peer-to-peer communication according to an aspect of the invention;

FIG. 17 is a schematic diagram illustrating another exemplary fluid transfer system having a host computer as well as multiple pump and valve controllers networked for peer-to-peer and/or host-to-peer communication according to an aspect of the invention;

FIG. 18 is a schematic diagram illustrating an exemplary manufacturing system having multiple pump and valve controllers in which one or more aspects of the invention may be implemented;

DETAILED DESCRIPTION

Figure 1A:
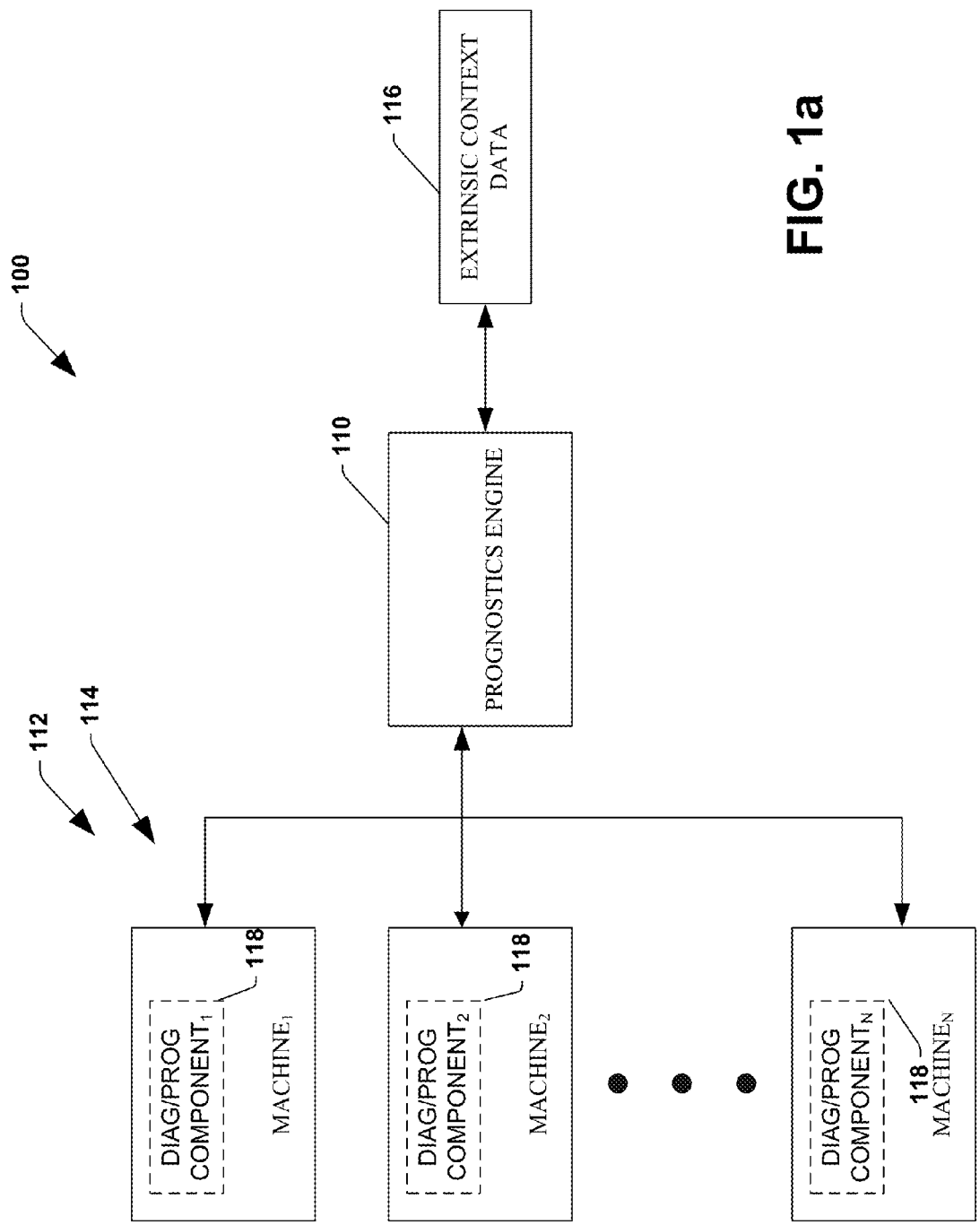
FIGS. 1a and 1b are schematic illustrations of prognostics systems in accordance with various aspects of the subject invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, a system or component state or condition, or can generate a probability distribution over states, for example. The inference can be probabilistic—that is, the computation of a probability distribution over states of interest based on a consideration of data and events and the combination of individual probabilities or certainties. For example, the probability of an observation can be combined with the probability associated with the validity of the applicable inference rule or rules. Inference can also refer to techniques employed for composing higher-level events or conditions from a set of more basic level events, conditions, observations, and/or data. Such inference results in the construction of new events, conditions, or actions from a set of observed events and/or stored event data, whether or not the events are correlated in close temporal proximity, and whether the events and data come from one or several event and data sources. Any of a variety of suitable techniques for performing inference in connection with diagnostics/prognostics in accordance with the subject invention can be employed, and such techniques are intended to fall within the scope of the hereto appended claims. For example, implicitly and/or explicitly classifiers can be utilized in connection with performing a probabilistic or statistical based analysis/diagnosis/prognosis—Bayesian networks, fuzzy logic, data fusion engines, hidden Markov Models, decision trees, model-based methods, belief systems (e.g., Dempster-Shafer), suitable non-linear training schemes, neural networks, expert systems, etc. can be utilized in accordance with the subject invention.

The subject invention provides for system(s) and method(s) relating to employing machine data in connection with optimizing an overall system or process. The machine data can be collected dynamically (e.g., in the form of diagnostic data or control data) and/or generated in the form of prognostic data relating to future machine state(s). The machine data can be collected and/or generated in real-time (e.g., in situ, dynamically, without significant lag time from origination to collection/generation). The machine data can be analyzed and the analysis thereof employed in connection with optimizing machine utilization as well as other business components or systems (e.g., accounting, inventory, marketing, human resources, scheduling, purchasing, maintenance manufacturing . . . ) so as to facilitate optimizing an overall business objective or series of objectives or concerns.

The invention provides methods and systems for controlling a motorized system in order to achieve setpoint operation, as well as to optimize one or more performance characteristics associated with the system while operating within specified operating constraints. The invention is hereinafter illustrated with respect to one or more motorized pump systems and controls thereof. However, it will be appreciated that one or more aspects of the invention may be employed in operating other motorized systems, including but not limited to fans, conveyor systems, HVAC systems, compressors, gear boxes, motion control devices, screw pumps, mixers, as well as hydraulic and pneumatic machines driven by motors. Further other non-motorized systems are included in the scope of this invention including but not limited to ovens, transportation systems, magnetic actuators, reaction vessels, pressurized systems, chemical processes, and other continuous processes. For example, the subject invention can be employed to facilitate prognosing wear of metal and/or semiconductor contacts, switches, plugs, insulation, windings, bushings, valves, seals, . . . so that they can be replaced or repaired prior to failure. Thus, scheduling of thermographic inspections for example can be conducted when actually required rather than on a fixed schedule. The invention can also be applied to corrosion prognostics as well as latency and/or node failure or backlog predictions for network traffic. The invention can be applied over a time horizon wherein time is factored into a utility-based diagnosis and/or prognosis in connection with the subject invention. For example, value of information, states, actions, inactions can vary as a function of time and such value densities can be considered in connection with diagnostics and/or prognostics in connection with the subject invention.

Moreover, the subject invention can be applied to commercial systems such as fleet vehicles, commercial HVAC systems, elevators . . . as well as aircrafts (commercial and military), ships (e.g., Navy warships), enterprise systems, resource planning systems, mission performance and strategy planning, and a wide variety of other applications herein prognoses can facilitate improvement of efficiency and/or optimization.

In addition, the attached figures and corresponding description below illustrate the invention in association with optimizing system and/or component efficiency, although it will be recognized that other performance characteristics of a motorized system may be optimized individually or in combination, which performance characteristics may include, but are not limited to, life cycle cost, efficiency, life expectancy, safety, throughput, emissions, operational cost, MTBF, noise, vibration, energy usage, and the like. Furthermore, the aspects of the invention may be employed to provide for optimization at a higher system level, wherein a process comprises a plurality of motorized systems as part of an overall automation system such that one or more performance characteristics of the entire process are optimized globally. Moreover, as discussed herein aspects of the invention can be employed in connection with optimizing many higher level systems (e.g., business-based system).

The higher-level system optimization may prescribe not operating at an optimum efficiency point with regard to energy utilization. Rather, a more important, over-arching objective such as maximizing revenue generation can supercede more narrow, limited scope objectives of achieving lowest energy usage or extending machinery lifetime. The subject invention employs a performance driven approach to leverage off developments in diagnostic and prognostic algorithms, smart machines and components, new sensor technologies, smart sensors, and integrate these technologies among others in a framework of an enterprise-wide asset management (EAM) system. The combination of optimizing methods and processes in the framework of an EAM system comprise an Asset Optimization System.

In addition to maintenance and repair costs, consideration for issues such as operational impact, business strategy, and supply chain (e.g., connected supplier-manufacturer-customer) issues are also considered. There are several compelling business drivers that often make cost-effective machinery reliability not only economically sound, but also a business imperative. These recent business drivers include greater concern for protecting the environment, ultimate concern for worker safety, connected (e.g. virtual) organizations, make-to-order operating strategy, pay-for-performance (e.g., power-by-the-hour), containing warranty costs, and competitive time-based performance with greater scrutiny and expectations in a rapidly expanding e-business world.

Although, the subject invention is primarily described in connection with motors and pumps, it is emphasized that the subject invention applies directly to other commercial and industrial process machinery/systems. These systems could include for example a plant HVAC system, a conveyor system, a semi-conductor fab line, chemical processing (e.g. etching processes) or other continuous process or non-motor driven machinery. Providing overall asset optimization as proposed herein can require integrating and optimizing other non-motor components in a plant. The scope of the subject invention as defined by the hereto appended claims is intended to include all such embodiments and applications.

FIG. 1a illustrates a prognostics system 100 in accordance with one particular aspect of the invention. A prognostics engine 110 is coupled to a network 112—the coupling can be effected via hard-wire, wireless, Internet, optics, etc. The prognostics engine receives data relating to machines 114 or processes that are part of the network. The data is dynamically analyzed within a desired context or set of rules for example, and the engine 110 predicts/infers future state(s)/event(s) relating to the devices, clusters thereof, tertiary devices (or clusters thereof), processes, and/or the entire network. The prognostic engine 110 can employ extrinsic context data as represented via block 116—it is to be appreciated that such context data (or a subset thereof) can be provided by the machines as well as such context data being a priori saved within the engine and/or a data store operatively coupled thereto. The context data 116 for example can relate to future load, future environment, possible mission scenario, expected stress, etc.

The prognostics can be done in the context of an expected future environment, stress level, or mission. Several prognostic results can be generated based on possible or probable future environment or stress conditions. The prognostic data provided by the engine 112 can be employed to take corrective action to mitigate undesirable effects associated with the predicted state. The prognostic data can also be employed to take automated action in order to optimize the network or a subset thereof. Moreover, such data can be employed for forecasting, trending, scheduling, etc. As shown, the machines 114 (or a subset thereof) can also comprise diagnostic/prognostic components 118 that can work with the prognostics engine 110 in connection with diagnosing and/or prognosing the network and/or a subset thereof.

Figure 1B:
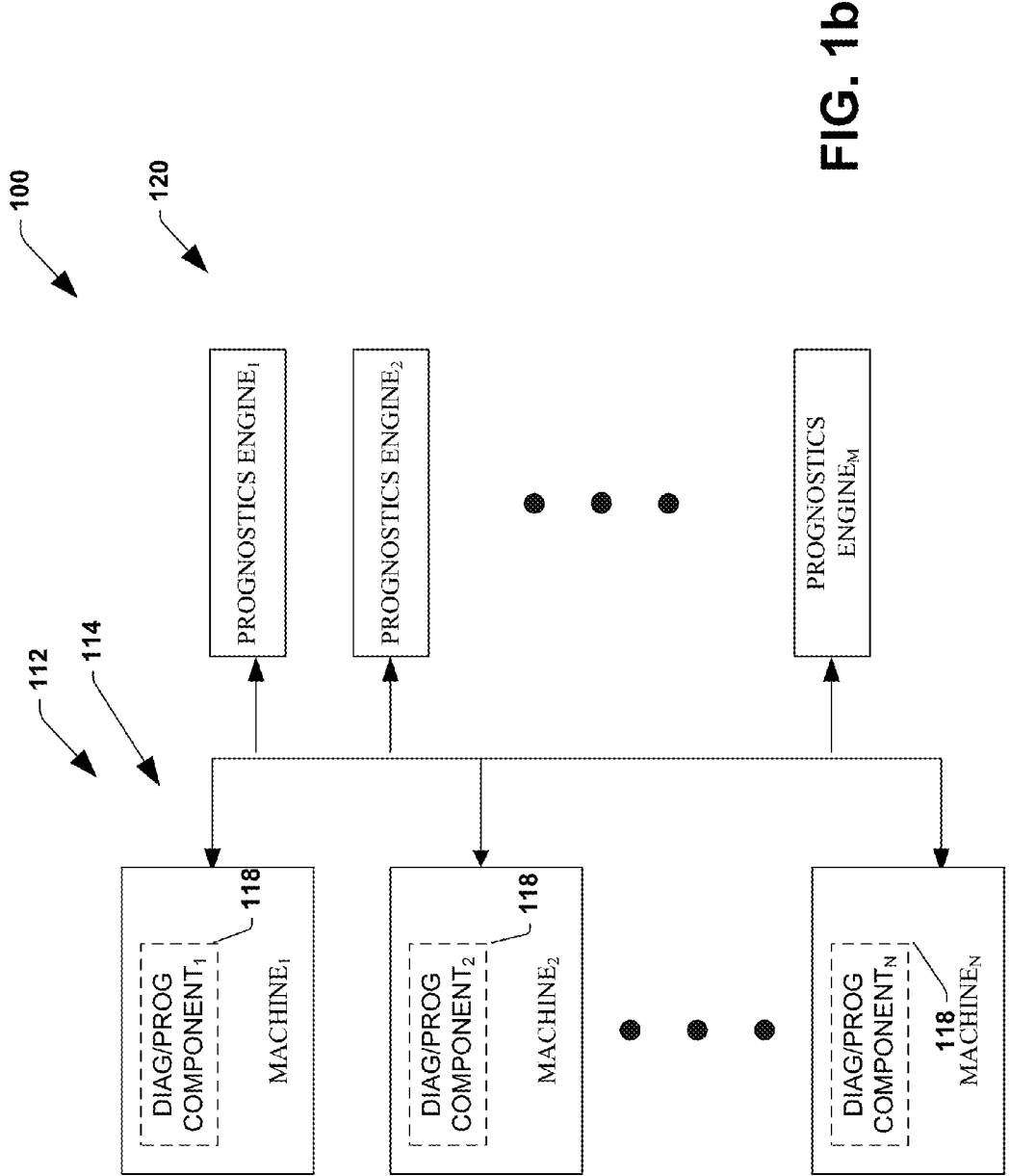

It is to be appreciated that the system can include a plurality of prognostics engines 120 as shown in FIG. 1b. The engines can serve different roles with respect to predicting various future states. Moreover, the engines can be part of a hierarchical organization wherein the hierarchy can include various levels of control and function such that one engine may be an agent of another engine. Such arrangement can provide for increasing speed of prognosis as well as isolating subsets of the system for any of a variety of reasons (e.g., security, process control, speed, efficiency, data throughput, load shedding . . . ).

As depicted in FIG. 1a, the invention can take the form of a distributed prognostic system such that individual components can respectively include prognostic engines that receive and analyze state information with respect to the individual device(s). Accordingly, the devices can communicate with one another and prognostic information regarding device(s) can be shared as part of a collaborative effort to improve accuracy of the aggregate system prognostics. It can also be utilized to improve operations of an overall system. It is to be appreciated that not all components of a network need to be intelligent (e.g., comprise prognostics components), and that certain devices can serve as an intelligent node with respect to other less intelligent devices wherein the node and the other devices form a cluster. The respective intelligent device can receive, monitor, and make predictions as to future state of the cluster or subset thereof. It is to be appreciated that the intelligent nodes need not be fixed to a particular set of non-intelligent components, and that as part of a distributed intelligent system, clusters can be dynamically generated based on current state of a larger group of components and state of the system as well as current and/or future needs/concerns.

Similarly, a group of intelligent system components can dynamically re-configure based on the current system state or a predicted or possible future system state. For example, a dynamic re-configuration may enable the intelligent system components to more quickly or reliable detect and respond to a system disturbance or fault that may possible occur in the future. Accordingly, for example, in a critical event situation, intelligent nodes can collaborate, negotiate use of resources, alter function and control of intelligent components and share resources (e.g., processing resources, memory resources, transmission resources, cooling capability, electrical power, . . . ) in order to collectively detect, isolate, mitigate impact, circumvent and maintain critical services, and restore functionality in an optimal manner. Of course, a utility-based analysis can be employed in accordance with the invention wherein cost of taking certain actions given evidence can be applied against benefit of such action. Similarly, the cost—benefit of taking no action may be analyzed. In addition, the probability of certain events, failures, environments, and cost impact may be evaluated in the context of uncertainty or probability. The resultant potential benefit from various prescribed actions is established in a probabilistic content or as a probability density value function. The resulting analysis and action planning provides a basis for prescribing an operational plan and series of decisions that will maximize system performance, business benefit, or mission success with the highest probability.

In accordance with an alternative aspect of the invention, intelligent components can broadcast state/event change information about themselves or a cluster related thereto in a heartbeat type manner so that information is disseminated upon change of state. Such beacon-type scheme can facilitate optimizing network processing and transmission bandwidth as compared to a polling scheme, for example. Moreover, as part of an intelligent system, the broadcasting of data can be effected such that devices that are or might be effected by such change of state are notified while other devices do not receive such broadcast. The broadcast can be daisy-chained wherein one change of state can effect state of other devices, which change of state effects even other devices, and thus the change of state info. can be part of a domino type data dissemination scheme. It is to be appreciated that polling may also be desired in certain situations and the invention contemplates polling in addition to broadcast.

Figure 1C:
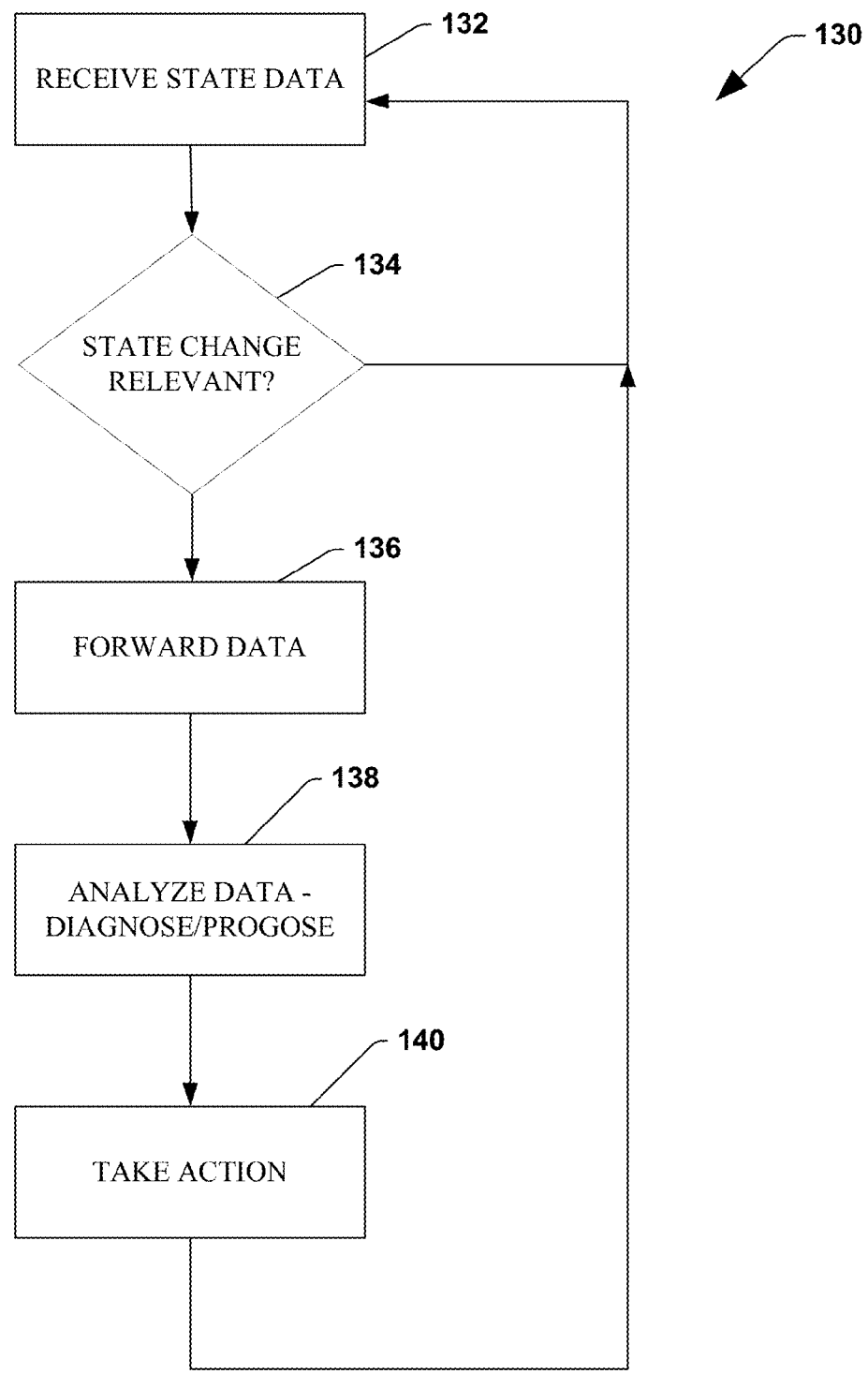
FIG. 1c is a flow diagram illustrating state management in accordance with a an aspect of the subject invention.
Figure 1F:
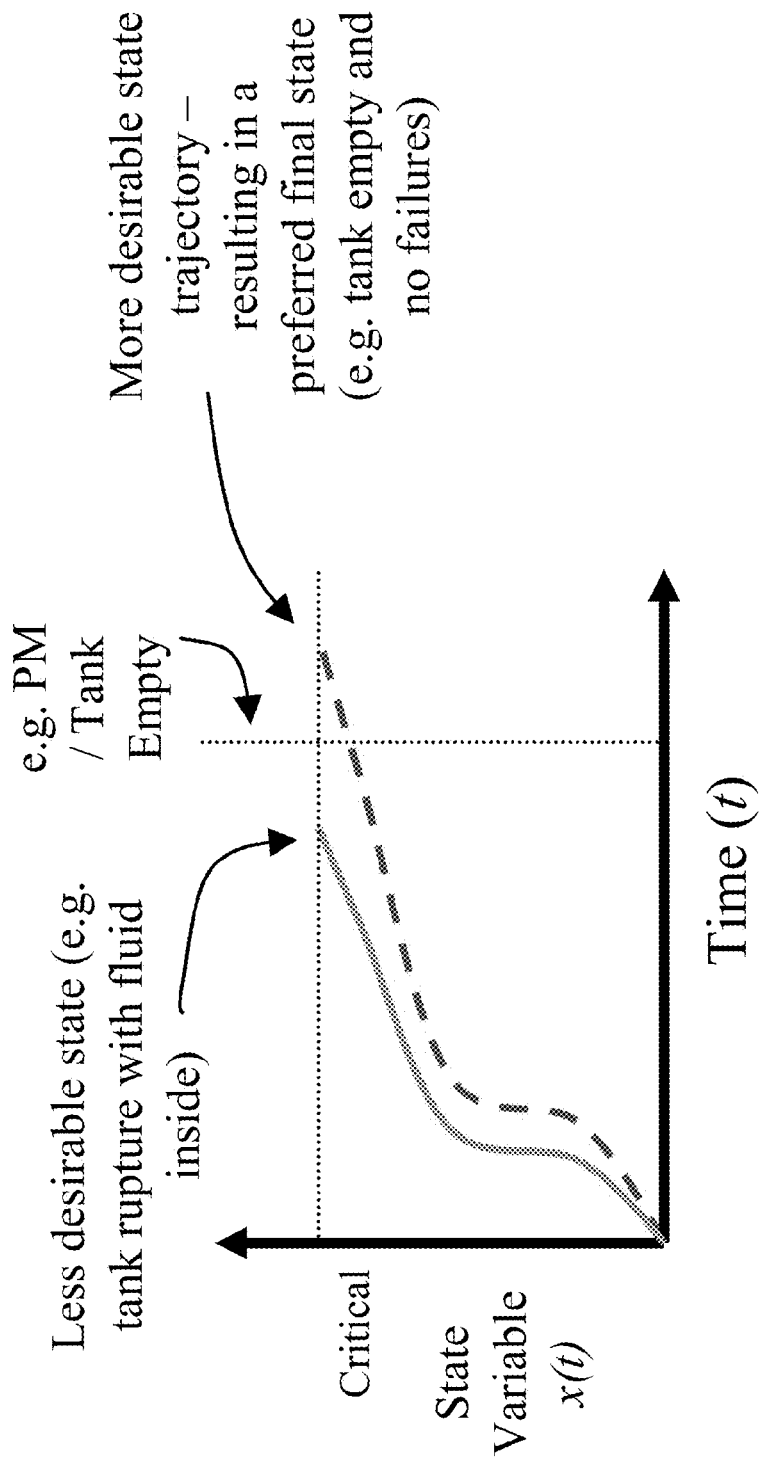

FIG. 1c illustrates a high level methodology 130 relating to conveyance of state information. At 132 state data (e.g., change of state information) is received. The state data can be received by a component of the device wherein the change took place, or a node of a cluster may receive data relating to change of state about and/or within the cluster . . . . At 134 it is determined if such change of state is potentially relevant to the device, cluster, network, tertiary devices, processes, applications, individuals, entities, etc. If the data is relevant, at 136 the data is forwarded to where the state change data might be relevant. If the data is not relevant, the process returns to 132 here change of state is further monitored. At 138, the state change data is analyzed in connection with making a diagnosis and/or prognosis. At 140, appropriate action is taken in accordance with the analysis.

It is to be appreciated that other methodologies may be employed in accordance with the subject invention. For example, at 132 the received state change data can be in the form of a bit or flag being set, and such information could be transmitted upon the change, or cached or queued until appropriate to transmit. It is also to be appreciated that any suitable data format (machine code, binary, hexadecimal, microcode, machine language, flags, bits, XML, schema, fields, . . . ) and/or transmission protocol/scheme/medium (http, TCP, Ethernet, DSL, optics, RF, Internet, satellite, RF, . . . ) for carrying out the functionalities described herein can be employed and such formats and protocols are intended to fall within the scope of the hereto appended claims.

It is to be appreciated that a blackboard scheme may also be employed in certain situations. In the blackboard scheme, an agent or cluster will post a message or condition to the blackboard along with appropriate source and context information. Other system components or agents may query the blackboard to determine if any relevant information is posted. It is also to be appreciated that an agent registry scheme may also be employed in certain situations. A registry scheme requires distributed agents to periodically register information such their current operation, capabilities, capacities, and plans with a separate resource facility. Operating as a "yellow pages" this registry is available to other system agents who require additional facilities or capabilities to meet current requirements. This registry is also available to assist agents and agent clusters in negotiation and action planning to address future possible scenarios. For example, the registry may be used to establish a future configuration and operating scenario from a set of possible contingency plans that will provide a less disruptive or dangerous configuration in the event a recently detected weakened component should fail. The weakened component may have indicated its degraded state through a broadcast message as described above or by updating the local cluster register.

Furthermore, a combination of broadcast, polling, blackboard, or registry update schemes can be employed in connection with the invention (e.g., as part of an optimization scheme) for conveyance of state change information.

Component, device, subsystem, or process health or prognostic information may be communicated in an explicit message using the communication mechanism and architecture described above. Alternatively, the machinery current condition and prognostic information may be embedded in the communications message. The machinery health information may be embedded in particular message segments reserved for machinery health information. Diagnostic and prognostic status bits may be defined and used by any intelligent machine on the network. The bits may be set by the intelligent machine based on the machine's continuous health self-assessment. Alternatively, adjacent intelligent components or collaborating agents may report another agent or component is ineffective in performing its function or perhaps is no longer able to function or no longer reachable on the network.

Other schemes for encoding machinery diagnostic and prognostic health information may be employed such as encoding this information in the message header, or in the text of the message. Encryption schemes that hide the encoded health information may be employed. This can provide for lower message overhead and increase security and message reliability. Alternatively, the characteristics of the message such as message length, time of transmission, frequency of message transmission, or scope of destination may convey device health and/or prognostic information.

Instead of or in addition to providing state/event change information about itself or the cluster it belongs to, related information regarding future states or events may be provided. This information provided may include an array with each element comprised of three or more values. The values for each entry may be the future state or event, the probability or likelihood of the event occurring and the expected time or condition in the future that this event may occur with the specified certainty.

It is to be appreciated that although the subject specification primarily described the invention within the context of prognosis, the invention is intended to encompass diagnostics as part of or in addition to performing prognostics.

Various artificial intelligence schemes/techniques/systems (e.g., expert systems, neural networks, implicitly trained classifiers, explicitly trained classifiers, belief networks, Bayesian networks, naïve Bayesian networks, HMMs, fuzzy logic, data fusion engines, support vector machines, . . . ) can be employed in connection with making inferences regarding future states in accordance with the subject invention. As such an AI component in accordance with the subject invention can facilitate taking a probability-based or statistics-based approach to performing utility-based prognoses in accordance with the subject invention. It is to be appreciated that the other embodiments of the invention can perform automated action based on predicted state via simple rules-based techniques (e.g., look-up table), for example, to mitigate processing overhead. Moreover, a combination thereof can be employed as part of an optimization scheme.

Turning to FIGS. 1*d-h*, the subject invention also contemplates a closed-loop system that employs prognostics. A prognostics engine can be used to predict future states or events relating to a system. The predicted state or events can be, for example, quality of a product, production throughput, possible line failure, machine temperature, bearing failure, order arrival, feed stock quality, etc. The system can employ such prognostic information to dynamically modify the system and/or process (e.g., continuously cycling through the prognostics loop) until convergence is achieved with respect to desired predicted future state(s). Thus, prognostics in accordance with this aspect of the invention can be employed as part of an in situ monitoring and modification scheme to facilitate achieving a desired result. It is to be appreciated that the state of the system will often dynamically change, and the subject embodiment can be employed as part of a continuous closed-loop system to not only converge on a desired state (including predicted future state), but also to maintain such state, and mitigate the system from entering into an unstable or undesired current or predicted future state. Thus, the system can serve as a self-diagnosing and correcting system.

A prediction or prognosis can indicate the expected future state of the system or possible future states of the system with defined probabilities based on the likelihood or probability of other outside influencing factors. If the expected future state (or possible future states) is acceptable, the system or plant may be monitored and controlled to insure the expected state (or one of the possible expected states) are realized. If the expected future state is unacceptable (e.g., tank rupture) then configuration or operating changes may be defined that will put the system state trajectory on a more safe or desirable path. Since a large suite of more desirable trajectories and future state outcomes are possible, the most desirable, greatest benefit, most valuable, and highest probability states may be selected. A closed loop monitoring and control system will insure the system is progressing toward the previously selected optimum or most desirable state. Unexpected disturbances or new factors may cause the system to re-adjust the state trajectory or alter the control as necessary. A goal can be to define possible or likely future states, select critical states to avoid and identify more desirable/optimum states. Then identify what may be very slight control changes early to drive specific state variable(s) on a prescribed (more desirable) trajectory subject to input constraints and process constraints. A feedback mechanism including regular prognostics and control alteration can insure that the system in on the correct, more desirable trajectory resulting in achieving the pre-planned, optimal state in the future as described in FIG. 1*i*.

RFIDs can also be employed in accordance with a particular aspect of the invention. The RFIDs, can provide for component tracking and monitoring such that the progostics system, for example, as described above can also participate in tracking and locating devices within a system or process and optimize taking automated action in connection therewith. For example, if a portion of a production line is predicted to go down within a few seconds, components (produced in part) upstream from the line about to go down can be quickly rerouted by the system as part of an automated corrective action in accordance with the subject invention. Accordingly, the RFID tags on the components can facilitate quickly identifying current and predicted future location of thereof so as to optimize the above action. It is to be appreciated that any suitable scheme (e.g., global positioning system, RF-based, machine vision, web-based . . . ) can employed with such aspect of the subject invention. It is to be appreciated that many conventional GPS-type system(s) are limited with respect to indoor tracking, and in such situations, wireless based schemes can be employed to determine and/or infer location of components.

A security component can be employed with prognostics in connection with the subject invention. The inventors of the herein claimed invention contemplate the potential dangers associated with taking automated action based on inferred/predicted future state. Critical portions of a network, system and/or process can be vulnerable to malicious and/or erroneous action. Accordingly, security measures (e.g., data encryption, user authentication, device authentication, trust levels, SOAP protocols, public/private keys and protocols, virus control . . . ) can be employed to mitigate undesired action and/or prognoses being performed in connection with the subject invention. Accordingly, schemes for weighing evidence, data integrity, security, confidence, pattern recognition, etc, can be employed to facilitate that received data and prognoses with respect thereto are accurate and reliable. Any suitable scheme for effecting such measure can be employed in connection with the invention, and are intended to fall within the scope of the hereto appended claims. Moreover, another aspect of the invention can provide for an override component that prevents a recommended automatic action being taken given the cost of making an incorrect decision (e.g., turning off power, initiating fire suppression, starting a ballast pump, turning off life support . . . ).

Furthermore, if desired, certain aspects of a system or process can be isolated (e.g., firewall) such that prognostics and automated action in connection therewith cannot be taken on such isolated section. For example, certain tasks may be deemed so critical that only a trusted and authenticated human can take action in connection therewith. For example, on a submarine, HVAC and power control may be deemed so critical that at a certain part of control thereof, automated action is turned over to a human. Likewise, such aspects of the subject invention can be employed to mitigate undesired chain reactions (e.g., stock market crash of 1980s wherein computers flooded the market with sell orders, East Coast blackout of 2003 wherein a substantial portion of an integrated power grid crashed as part of a load-shedding chain reaction . . . ). However, it is to be appreciated that prognostics in accordance with the subject invention can facilitate avoidance of entering into a chain reaction type situation by making inference at a granular level and taking remedial action to mitigate a low-level undesired state situation blossoming into a larger, potentially catastrophic situation.

Accordingly, the invention contemplates performing a utility-based approach in connection with a security-based approach to facilitate taking optimal/appropriate actions given particular state(s) and context thereof. Furthermore, some critical action such as turning off a pump, may be deemed particularly sensitive and potentially dangerous. Before this action is automatically invoked based on prognostics, it may be required that two or more, independent system components (e.g. agent clusters) may corroborate the expected or potential future state and independently establish that the optimum course of action is to turn off the pump or machinery. One of the several corroborating but independent system components may be a human.

Another aspect of the subject invention analyzes not only state information with respect to components, but also state information with respect to extrinsic factors (e.g., ambient temperature, dust, contaminants, pressure, humidity/moisture, vibration, noise, radiation, static electricity, voltage, current, interference (e.g., RF), . . . ) that may effect future state of components. Accordingly, by predicting future states as to such extrinsic factors and taking action in connection with controlling such factors, various components can be protected from entering into undesired future states. For example, many failures of machines can be attributed to environmental influences (e.g., contamination) that can contribute to failure of the machine. By monitoring and controlling such influences in a dynamic and proactive manner, machine failure can be mitigated.

Figure 1J:
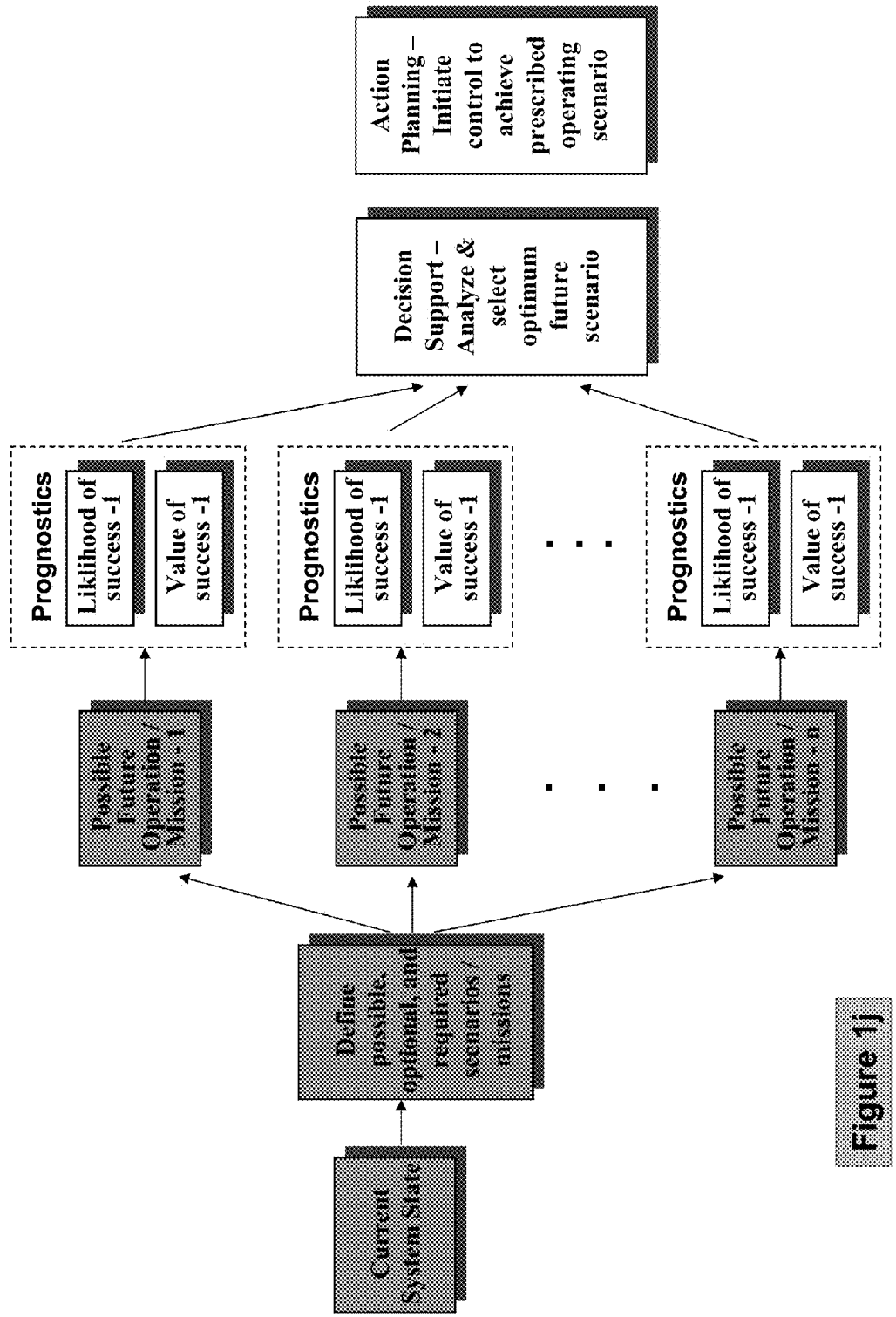
FIG. 1j, illustrates another aspect of the subject invention relating to establishing potential future state of a system/process.

Referring to FIG. 1j, another aspect of the subject invention is to establish the potential future state of the system given particular operating scenarios, process runs, or mission scenarios. A suite of possible operating conditions can be mapped against the present condition of the system and system components to determine the likely outcome of possible operating profiles or missions. If the outcome from some possible operating scenarios is undesirable (e.g., catastrophic machinery failure) then this future operating scenario may be avoided. For example, a process run involving a high-temperature and high pressure reaction or military mission over hostile territory of lengthy duration may indicate likely gearbox or engine failure before successful completion. Performing an analysis of the outcome of potential operating decisions or "what-if" scenarios can provide a basis for optimizing the deployment of resources and provide a superior measure of safety, security, and asset optimization.

Yet another aspect of the subject invention provides for remote data analysis and prognostics to be performed on a system. Accordingly, data relating to a system/process can be collected and transmitted (e.g., via the Internet, wireless, satellite, optical fiber . . . ) to a remote prognostic engine that analyzes the data and makes inferences as to future state of the system (or subset thereof) based in part on the data. For example, a small facility in a rural location may operate numerous motors and pumps in a harsh environment not necessarily suitable for highly sensitive processing components. Accordingly, data can be gathered at such location, and transmitted in real-time (or discrete time) and analyzed at the remote location where the sensitive processing components reside along with databases (e.g., historical data, trend data, machine data, solutions data, diagnostic algorithms . . . ) that can facilitate speedy analysis and diagnosis/prognosis of systems/machines/processes at the rural location.

Figure 1K:
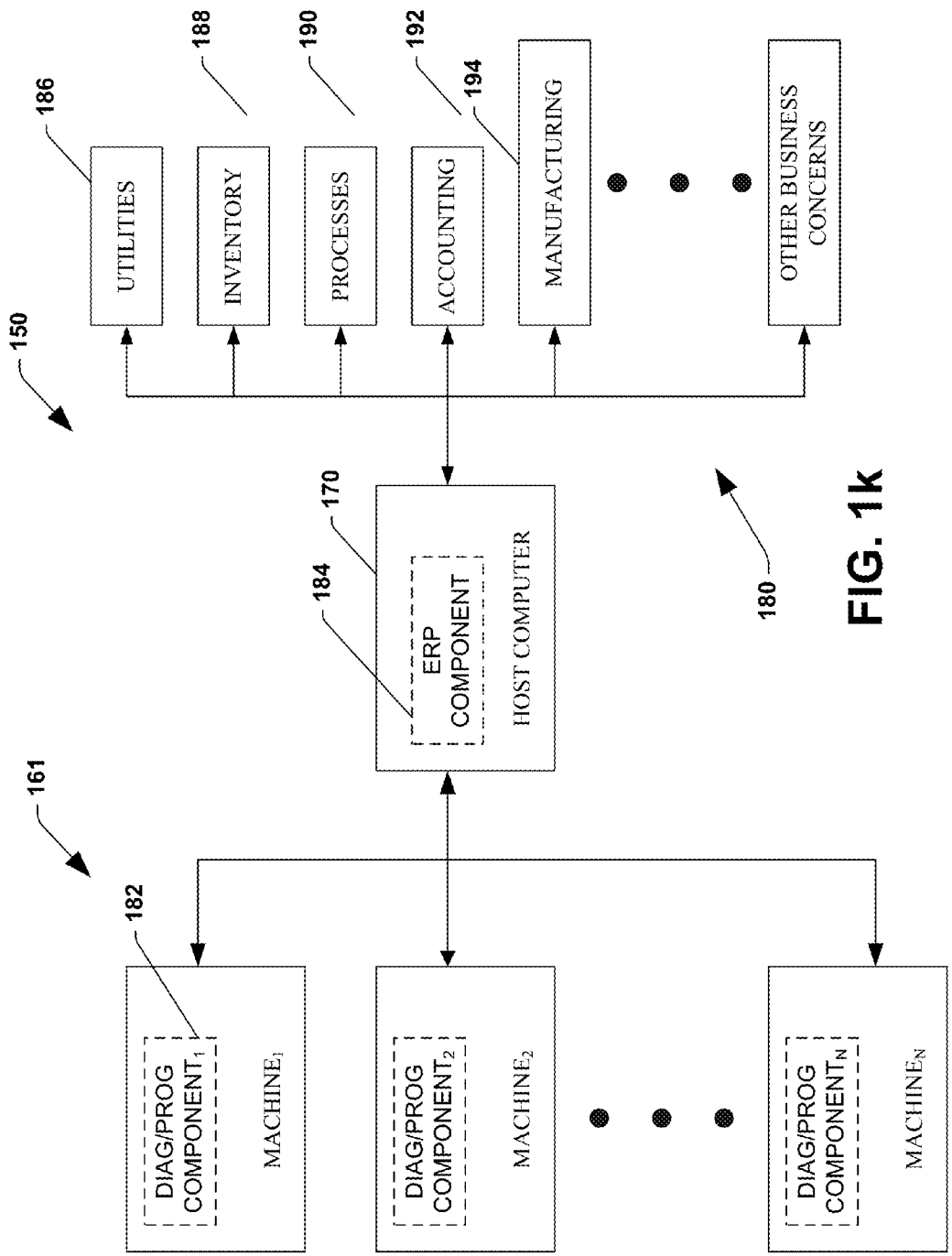
FIG. 1k illustrates an enterprise resource planning system in accordance with an aspect of the subject invention.

FIG. 1k is a high-level diagram illustrating one particular system 150 in connection with the subject invention. The system 150 includes a plurality of machines 161 (MACHINE$_1$ through MACHINE$_N$—N being an integer) at least a subset of which are operatively coupled in a manner so as to share data between each other as well as with a host computer 170 and a plurality of business components 180. The machines 161 include a respective diagnostic/prognostic component 182 that provides for collecting and/or generating data relating to historical, current and predicted operating state(s) of the machines. It is to be appreciated that the plurality of machines can share information and cooperate; and is it to be appreciated that the machines do not have to be the same. Furthermore, some of the machines 161 may comprise sub-systems or lower-level components that can have separate sensors, lifetime estimates, etc. For example a compressor may consist of a motor, pump, pressure chamber, and valves. The motor component may include smart bearings with embedded sensors to predict bearing lifetime.

The predicted operating state(s) of the machine may be determined based on expected demand or workload or a probabilistic estimate of future workload or demand. Similarly, expected environment (e.g., temperature, pressure, vibration, information and possible expected damage information may be considered in establishing the predicted future state of the system. Undesirable future states of the system may be avoided or deferred through a suitable change in the control while achieving required operating objectives and optimizing established operational and business objectives. Moreover, it is to be appreciated that data relating to subsets of the machines can be aggregated so as to provide for data relating to clusters of machines—the cluster data can provide for additional insight into overall system performance and optimization. The clusters may represent sub-systems or logical groupings of machines or functions. This grouping may be optimized as a collection of process entities. Clusters may be dynamically changed based on changing operating requirements, machinery conditions, or business objectives. The host computer 150 includes an enterprise resource planning (ERP) component 184 that facilitates analyzing the machine data as well as data relating to the business concern components 180 (utilities component 186, inventory component 188, processes component 190, accounting component 192, manufacturing component 194 . . . ). The data is analyzed and the host computer 170 executes various optimization programs to identify configurations of the various components so as to converge more closely to a desired business objective. For example, assume a current business objective is to operate in a just in time (JIT) manner and reduce costs as well as satisfy customer demand. If the inventory component 188 indicates that finished goods inventory levels are above a desired level, the ERP component 184 might determine based on data from the utility component 186 and machine components 160 that it is more optimal given the current business objective to run the machines at 60% rather than 90% which would result in machinery prognostics indicating we may extend the next scheduled maintenance down time for another four months reducing the maintenance labor and repair parts costs. This will also result in reducing excess inventory over a prescribed period of time as well as result in an overall savings associated with less power consumption as well as increasing life expectancy of the machines as a result of operating the machines as a reduced working rate.

It is to be appreciated that optimization criteria for machinery operation can be incorporated into up-front equipment selection and configuration activities—this can provide additional degrees of freedom for operational control and enhanced opportunities for real-time optimization.

Maintenance, repair, and overhaul (MRO) activities are generally performed separate from control activities. Interaction and collaboration between these functions are typically limited to the areas of operations scheduling and to a lesser extent in equipment procurement—both are concerned with maximizing production throughput of the process machinery. Information from MRO systems and machinery control and production systems are related and can provide useful information to enhance the production throughput of process equipment. The subject invention leverages off opportunities realized by closely coupling machinery health (e.g. diagnostics) and anticipated health (e.g. prognostics) information with real-time automatic control. In particular, the closed-loop performance of a system under feedback control provides an indication of the responsiveness, and indirectly, the health of the process equipment and process operation. More importantly, it is possible to change how the system is controlled, within certain limits, to alter the rate of machinery degradation or stress. Using real-time diagnostic and prognostic information the subject invention can be employed in connection with altering future state(s) of the machinery. Given a current operating state for both the machinery and the process the subject invention can drive the machine(s) 160 to achieve a prescribed operating state at a certain time in the future. This future operating state can be specified to be an improved state than would occur if one did not alter the control based on machinery health information. Furthermore, the future state achieved could be optimal in some manner such as machinery operating cost, machinery lifetime, or mean time before failure for example. The prescribed operating state of a particular machine may be sub-optimal however, as part of the overall system 150, the system-wide operating state may be optimal with regard to energy cost, revenue generation, or asset utilization.

For example, with reference to Table I below:

TABLE I

| Power Source/<br>Control Technique | Direct Line Power -<br>Flow Control with<br>Throttle Valve | Drive Power - Flow<br>Control via<br>Motor Speed |
| --- | --- | --- |
| Full Flow - Power<br>Flow: 75 gpm (flow<br>not restricted) | 1.07 kW | 1.13 kW |
| Reduced Flow - Power<br>Flow: 45 gpm<br>(restricted flow) | .881 kW | .413 kW |

The above data exhibits energy utilization from a motor-pump system under conditions of full flow and reduced flow. The flow rate conditions shown are achieved using a variable speed drive to control motor speed and therefore flow rate (column 1) and with a motor running directly from the power line with a throttling valve used to control flow rate (column 2). The estimated energy savings with Drive Power at reduced flow is 0.468 kW—a 53% energy savings in connection with Drive Power. Pumping applications which require operation at various prescribed head Pressures, liquid levels, flow rates, or torque/speed values may be effectively controlled with a variable speed motor drive. The benefits of using a variable speed motor controller for pump applications are well established, particularly for pumps that do not operate at full rated flow all the time. In fact, the variable speed drive used for testing in connection with the data of Table I has a user-selectable factory setting optimized for fan and pump applications although these optimized settings were not employed for the energy savings reported herein. The scope of benefits beyond energy savings include improved machinery reliability, reduced component wear, and the potential elimination of various pipe-mounted components such as diverters and valves and inherent machinery protection such as from over-current or under-current operation. Pumps which typically operate at or near full synchronous speed and at constant speed will not realize the energy savings as we have demonstrated in Table I. Process conditions that require pump operation at different flow rates or pressures (or are permitted to vary operation within process constraints) are candidates to realize substantial energy savings as we have shown. If maximum throughput is only needed infrequently, it may be beneficial to specify the hydraulic system and associated control to optimize performance over the complete span of operating modes based on the time spent in each mode. It will be necessary in this case to specify the duration of time the hydraulic system is operating at various rating levels coupled with the throughput and operating cost at each level.

Although machine control is discussed herein primarily with respect to motor speed, the invention is not to be construed to have control limited to such. Rather, there are other control changes that can be made such as for example changing controller gains, changing carrier frequency in the case of a VFD motor controller, setting current limits on acceleration, etc. The control can be broad in scope and encompass many simultaneous parameter changes beyond just speed. Moreover, the use of models can be a significant component of control and configuration optimization. A space of possible operating conditions for selection that optimizes a given process or business performance may be determined by employing a simulation model for example. Modeling techniques can also serve as a basis for prognostics—thus, a simulation model can encompass process machinery, throughput, energy costs, and business and other economic conditions.

With respect to asset management, it is to be appreciated that the system 100 may determine for example that purchasing several smaller machines as compared to a single large machine may be more optimal given a particular set of business objectives.

It is also to be appreciated that the various machines 161 or business components 180 or a subset thereof can be located remotely from one another. The various machines 161 and/or components 180 can communicate via wireless or wired networks (e.g., Internet). Moreover, the subject invention can be abstracted to include a plant or series of plants with wireless or wired networked equipment that are linked via long distance communications lines or satellites to remote diagnostic centers and to remote e-commerce, distribution, and shipping locations for dynamic logistics integrated with plant floor prognostics and control. Thus, optimization and/or asset management in connection with the subject invention can be conducted at an enterprise level wherein various business entities as a whole can be sub-components of a larger entity. The subject invention affords for implementation across numerous levels of hierarchies (e.g., individual machine, cluster of machines, process, overall business unit, overall division, parent company, consortiums . . . ).

Figure 2:
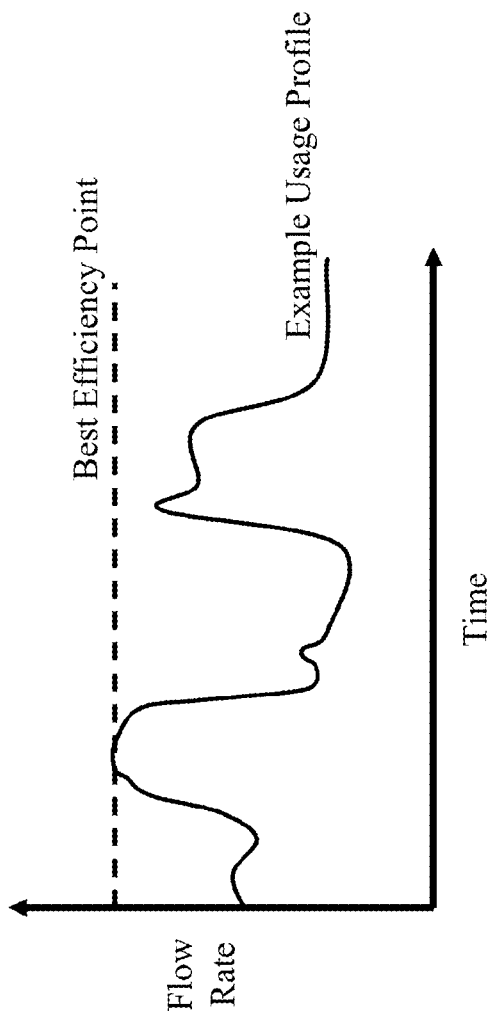
FIG. 2 illustrates exemplary operating levels of a pump system over time in accordance with the subject invention.

FIG. 2 illustrates operating levels over time of an exemplary pump system. The few, rare excursions at maximum flow result in hydraulic losses and energy losses during most of the operating time at lower flow rates. Integrating the losses under a peak efficiency curve provides an estimate of aggregate losses (and saving opportunity) for a target pump applications. Aggregate pump level usage information is represented in a very concise manner by Frenning, et al. (2001) in a duration diagram. This diagram shows the number of hours per year needed at various flow rates and provides a means to evaluate potential performance and energy benefits through up-front system design and control specification. Beyond these established benefits, there are important novel benefits associated with integrating diagnostics and prognostics information with established automatic motor control methods as discussed herein.

It is to be appreciated that the subject invention employs highly sophisticated diagnostic and prognostic data gathering, generation and analysis techniques, and should not be confused with trivial techniques such as automatic disconnect based on an excessively high current or temperature to be integrated diagnostics (e.g., something is wrong) and control (e.g., automatic contact closure). For the purpose of establishing an intelligent system for pump applications as described above, we do not consider such machinery protection with bang-bang, on-off control to be integrated diagnostics and control. Diagnostic information as employed by the subject invention can be information regarding a condition of system components or operating conditions that will accelerate wear and hasten failure of critical system elements. For example, information which identifies a level of degradation of a bearing element, the degree of insulation capability lost, the amount of time motor windings were operated at elevated temperature or that cavitation is occurring is useful diagnostic information. Such information can be combined to automatically alter prescribed control action, within allowable limits, to maintain useful operation and potentially reduce stress and degradation rate(s) of weakened components. The ultimate effect is to defer, under controlled conditions, eventual machinery failure.

Feedback control for pumping applications will often have one or more process variables such as flow rate, head pressure, or liquid level sensed by a transducer and converted to a digital signal. This digitized signal is then input to a control computer where the sensed digitized value is compared with the desired, setpoint value as discussed in greater detail infra. Any discrepancy between the sampled value and the setpoint value will result in a change in the control action to the motor-pump system. The change to the motor-pump system may be a new commanded valve position for a motor-operated valve or a new commanded setpoint speed for a variable speed motor application.

Feedback control systems as described above are termed error-nulling processes. We may represent the feedback controlled pumping system as a lumped parameter linear system. The most general state space representation of a linear, continuous time dynamical system can be provided as:

$$\dot{x}=A(t)x(t)+B(t)u(t)$$

$$y(t)=C(t)x(t)+D(t)u(t) \qquad (1)$$

Here x(t) is the state vector representation of the system, u(t) is the vector of real-valued inputs or control variables, and y(t) is the vector of system real-valued outputs. Matrices A, B, C, and D represent the plant or process state transitions, control input transition, state output process, and direct input-output (e.g. disturbances) process respectively. It is possible to incorporate diagnostic information into this controller by altering the controller based on assessed equipment health. For example, if the diagnostic analysis indicates that motor windings are beginning to heat up we may alter the controller to reduce the gain used to determine system input changes. This will result in a system with less stress on the motor windings but at the expense of slightly less system response. We may employ other techniques to shift losses from weakened components to stronger system elements. If it is determined through vibration analysis or current signature analysis techniques that operation is at a critical or resonant frequency, we may alter system speed to avoid such critical frequencies that may accelerate wear of bearing components.

As another example, if we detect that cavitation is occurring in the pump based on computed pump parameters and pump curves, we may reduce motor speed to eliminate the degrading cavitation condition. In particular, we may reduce speed to the point that adequate net positive suction head available (NPSHA) is equal to the net positive suction head required (NPSHR). As operating conditions changes and NPSHA increases, then motor speed may be automatically increased to the point that maximum flow is one again achieved while NPSHR<=NPSHA. A more detailed example of an integrated diagnostic system with compensating control is described below in the case study.

It is significant to note that in the absence of downstream transducers for pressure and speed, the existence of many pumping problems can be determined using only sampled motor current. For example, with pumping systems, motor speed can be determined from motor current. The existence of cavitation can be determined from a single phase of motor current during pump operation. Such observation is significant since pump curves are not required to perform this diagnosis and the results are potentially more accurate since what is being sensed is a specific feature indicative of cavitation rather than utilizing pressure, flow, and pump nominal curves. Changes in viscosity, chemical composition, and pump geometry such as from wear, will alter the accuracy of the pump curves. MCSA techniques promise to be more accurate and less invasive than more traditional pressure-flow measurements with pump nominal design information.

Through various diagnostic means such as described above it is possible to determine that an undesirable operating state is occurring or that certain degraded components will result in early machinery failure. Important benefits are possible by automatically altering the control to avoid the higher-stress operating and control modes or to avoid stressing weakened or degraded components and thereby extend the useful operating life of machinery.

Prognostics & Control

Although process optimization has been employed for many years (e.g. dynamic optimization) such as for continuous chemical processing applications, unique and important benefits are possible by utilizing machinery diagnostics and prognostic information to prescribe an optimum control action dynamically. The benefits of integrated diagnostics and control may be significantly expanded by utilizing information describing the rate of degradation and remaining useful life of machinery under various possible operating conditions. This permits changing the operating mode to achieve a designated operating lifetime. Alternatively, the control can be specified to minimize energy consumption and maintenance costs or to maximize revenue generation. In extreme conditions, the control may specified to achieve performance beyond the normal operating envelope to protect the environment, avoid costly losses, or protect worker safety while insuring that failure will not occur during these extreme operating conditions. Prognostics with control provides the foundation for overall process optimization with regard to objectives such as efficiency, business strategies, maintenance costs, or financial performance.

Implementing variable speed motor control for pumping applications can provide direct savings in reduced energy consumption as described herein. Additional benefits are possible by treating drive-motor-pump-hydraulics as an integrated system. Combining individual efficiency curves of a motor, pump, and drive permits generating a composite system performance profile. This aggregate system model can be used to diagnose the system as an integrated collection of coupled elements and to prescribe a preferred operating state of the system.

In connection with the subject invention it is proposed to extend the control model for the variable speed motor controller by incorporating three additional elements in the control model.

The three elements that augment the control model are:
Specification of the allowable range of operation
Diagnostic & prognostic information, and
Specification of optimal system operation, processing objectives and business objectives The first element in the control model is the capability to permit operation within a range of process (state) variables. For example, although a desired (e.g., setpoint) flow may be 100 gpm, however the system may effectively run anywhere between 60 gpm and 110 gpm. The specification of the allowable range of operation may include data related to the sensitivity, accuracy, or marginal nature of the operating bound. Probabilistic and time-dependency information may also be included in the boundary specification.

The second element in the extended control model is information relating to the health of the process machinery and its operation along with information on the future health of the machinery such as rate of degradation and remaining useful life. For example, one may determine that the elevated temperature rise in the motor windings will reduce insulation life by ½ or that the detected level of cavitation will accelerate seal failure by 10 fold.

The third element in the extended control model is an analytic representation of the operating objectives of the process or plant along with any additional operating constraints. The representation of the operating objectives of the process provides a quantifiable measure of the "goodness of operation" and may include critical performance criteria such as energy cost and process revenues. This permits establishing an objective function that may subsequently be optimized through suitable control changes. Additional operating constraints may include data such as noise level, maximum process completion time. An objective function specifying the process and business benefits may be optimized via dynamic changes in the control action subject to not violating any of the process operating constraints.

We can utilize established life expectancy models in conjunction with classical control techniques to control the residual lifetime of machinery. For example, crack growth models based on cyclic loading provide a probabilistic model that can be embedded in a simulation model to determine future stress due to vibration, temperature gradient, and pressure. The Forman deterministic crack growth failure model provides a basis for altering the stress and rate of crack growth directly from changes in the control. The altered control then provides a quantitative measure of the change in crack growth rate. This information can be used to control the expected remaining lifetime of degraded components and insure that failure does not occur before a tank is emptied or a scheduled PM or machinery overhaul occurs.

The subject invention's focus of prognostics and distributed control will enable future plant operations to be based on proactive operation rather than reactive problem solving. Device alerts from remote intelligent devices can warn of future potential problems giving time for appropriate remedial or preventive action. Embedding operational objectives and plant performance metrics into an automated decision-making system can permit a high degree of machinery reliability and avoid the unexpected process failures that impact quality and reduce yields. Integrating prognostic information with automatic, real-time decision making provides a basis for dynamic optimization and provides unique, important benefits due to optimized plant operation.

Dynamic Optimization

Given that permissible operating modes have been suitably defined, and established a means to project into the future possible or probable operating states, and a criterion for judging preferred or optimal performance the problem can be formulated as a classical optimal control problem.

For example, if the operating objective is to minimize energy cost per gallon pumped then the objective function will include flow information, cost per kWh, and motor-drive power consumed. Dynamic changes can be made to both the motor speed and drive internal parameters to optimize the cost per gallon pumped subject to previously defined process constraints. It is significant to note that the operating example above will result in the least energy cost per gallon pumped; however, it may also result in accelerated wear or thermal degradation of critical machinery components. A more comprehensive operational model and objective function may incorporate these additional parameters if required. Additional parameters may include information such as expected failure rate and failure cost for different operating modes, machinery lifetime and capital replacement costs, and the impact on other connected machines and processes such as valves, piping, and other process machines.

One exemplary aspect of the subject invention establishes a control method that will support decision making at each decision time interval or control iteration loop. One principle of dynamic programming specifies that if the system is at some intermediate point on an optimal path to a goal then the remainder of the path must be on an optimal path from the intermediate point to the goal. This permits making optimum choices of the control variable, $u(t)$, at time t that by only considering the need to drive the system from state $x(t)$ to $x(t_f)$, the final state of the system. This approach provides an efficient technique for sequential decision making while insuring that the complete system trajectory will be optimum from time t0 to $t_f$ and we do not need to consider all possible control options at every decision point simultaneously.

The optimization problem can be formulated as:

$$\text{Min} J = S\left(x(t_f), t_f\right) + \int_{t_o}^{t_f} L(x(t), u(t), t) dt \quad (2)$$

Subject to $f(x(t), \dot{x}(t), y(t), u(t)) = 0$ where $t \in [t_0, t_f]$ with defined initial conditions, time constraints, control variable and state variable constraints. Here J represents an objective function value to be minimized (or maximized). S and L are real-valued functions with S representing cost penalty due to the stopping error at time $t_f$ (e.g. wasted fluid not pumped or discarded useful life in replaced equipment). L represents the cost or loss due to transient errors in the process and the cost of the control effort during system operation.

For example, if the value of the stopping cost function is set at S=0 and L=$u^t u$ then:

$$\text{Min} J = \int_{t_o}^{t_f} u^t u dt \quad (3)$$

Equation 3 is a measure of the control effort or energy expended for a process operating from time $t_o$ time $t_f$. This is termed the least-effort problem and in the case of a drive-motor-pumping system, results in completing a process segment (e.g. emptying a tank) at the lowest possible energy cost.

When J is differentiable, gradient search techniques can be employed to compute the desired change in control, u(t), that moves J closer to the minimum (or maximum value). The concept of the gradient is significant in that the change in the objective function we obtain from a suitable control u(t) is proportional to the gradient, grad(J). This provides a specification for the change in u needed to move J closer to the optimum. If J is convex then local optimum values are not much of concern and any optimum value obtained is a global optimum. This formulation permits a step-by-step evaluation of the gradient of J and the selection of a new control action to drive the system closer to an optimum.

Figure 3:
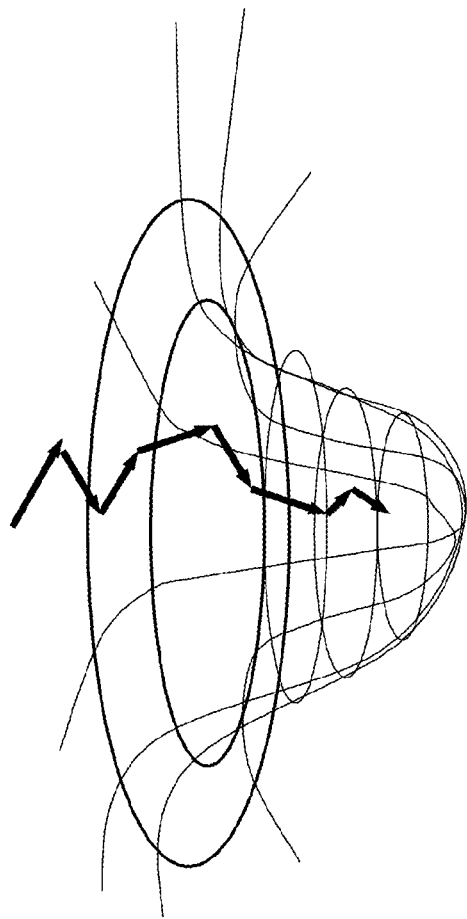
FIG. 3 graphically illustrates a gradient search technique in accordance with the subject invention.

The gradient search technique, also called the method of steepest decent is illustrated graphically in FIG. 3. Here each arrow represents a new control decision in the quest to realize a minimum value for the objective function, J. The specification of the optimal performance metric, J, can incorporate information beyond energy utilization, maintenance cost, or longevity of operation. For example, it is possible to also formulate J to include strategic business information and asset value information. In this manner selecting the sequence of optimal control actions u(t) to optimize J will drive the system to achieve optimum utilization of the assets involved.

Asset Optimization

The specification of the optimum operation of plant equipment described above provides a flexible platform to incorporate various business and operational factors. It is possible to include the cost of maintenance for various failure modes, replacement and installation costs, maintenance strategies, cost for scrap, re-work, line-restarting, and revenue generation from the specified machinery. This permits the generation and implementation of optimal asset lifetime management policies across critical plant assets. The operational success of this approach requires an effective Asset Register base, observability of key state variables, and viable process and component models. The utilization of open, industry standards for asset registry provides important capabilities for integrating operating information across a manufacturing plant and even across facilities. More recent developments have resulted in an Open Systems Architecture for Condition-Based Maintenance that provides a framework for real-time integration of machinery health and prognostic information with decision support activities. This framework spans the range from sensors input to decision support—it is open to the public and may be implemented in a DCOM, CORBA, or HTTP/XML environment.

Often complex business and operational decisions are difficult to incorporate into a single, closed-form objective function. In this case, operating decision and control objectives may be decomposed into a suite of sub-problems such that when taken together, the overall, more complex problem is solved. For example, a process can be decomposed into a pumping process, chemical reaction, and storage/batch transport problem. These decompositions can be treated as individual sub-problems and optimize each of these subject to boundary or interaction constraints between each sub-problem. Alternatively, the decomposed problem can be treated as a collection of coupled decision and seek an optimum that balances possibly conflicting objectives and establishes a compromise decision or control which is in some sense optimally global. For example, an industry-wide drive to improve capital equipment utilization and enhance RONA values may be in conflict with reducing maintenance costs and maximizing revenue generation per energy unit consumed. Established techniques for solving coupled and un-coupled optimization can be employed to facilitate overall asset optimization. The compatibility of control strategies with maintenance and scheduling strategies provides new opportunities to optimize assets utilization. Automation control actions may automatically be initiated, which reinforce and drive toward strategic business objectives established by management. In accordance with another particular example, an asset optimization system can continually monitor energy costs via the Internet and dynamically change machinery operation based on new energy costs to maximize revenue generation. If energy costs become substantially high then the criteria for energy-efficient operation can overtake the optimization criteria of maximizing production throughput.

Real Options Analysis as a New Economic Tool Linking CBM Investments to Business Strategy In connection with machine and business state prognostics, asset management and optimization in accordance with the subject invention, it is to be appreciated that preventing unexpected equipment failures can provide important operational and economic benefits. Using real options pricing to provide a more accurate value of deferring machinery repair or altering the control strategy. One aspect of the subject invention provides for automatically checking the availability, cost, and performance specifications of new components to replace healthy component. Swapping out old, less efficient components with new, more efficient components permits further optimizing process operation and optimizing overall asset utilization.

The asset optimization program in connection with the subject invention for example could launch a crawler or spider to search for potential replacement components across the Internet. The asset optimization system can for example continually monitor energy costs via the Internet and dynamically change machinery operation based on new energy costs to maximize revenue generation. If energy costs become high enough then the criteria for energy-efficient operation will overtake the optimization criteria of maximizing production throughput. Machinery failure prevention can be enhanced by implementing a condition-based maintenance (CBM) system with on-line, continuous monitoring of critical machinery. An economic analysis required to justify CBM acquisitions often follows a model used to evaluate other plant acquisitions. However, traditional machinery acquisition valuation methods do not adequately capture the operational and strategic benefits provided by CBM systems.

A financial model derived from options in financial markets (e.g. puts and calls on shares or currencies) is proposed to facilitate capturing unique and important benefits of CBM systems. In particular, a CBM system inherently provides future decision and investment options enabling plant personnel to avoid a future failure by making these subsequent investments (exercising the option). Future options enabled by an initial CBM investment provide economic benefits that are difficult to capture with traditional capital asset pricing models. Real options valuation methods are designed to capture the benefits of future investment and strategic options such as those enabled by a CBM system. Augmenting existing economic analysis methods with an option value pricing model can capture, in financial terms, the unique and important business benefits provided by CBM investments.

New developments in condition based monitoring algorithms, sensors, communications, and architectures promise to provide new opportunities for diagnostics and prognostics. CBM systems often require an incremental investment beyond what is needed for basic manufacturing and automation equipment. The acquisition of condition-based maintenance systems and components must compete with other acquisition requests to obtain capital from a limited pool of available funds. The costs associated with implementing a CBM system are often easy to obtain although they may have many components such as development, purchase, installation, support, and calibration. However, it has traditionally been difficult to accurately capture the benefits associated with a CBM investment. Augmenting existing investment analysis methods with real option valuation methods may provide a more accurate economic picture of the benefits from a CBM investment opportunity. Investment decisions are typically based on a traditional economic analysis of the funding opportunities available. Traditional funding models such the capital asset pricing model (CAPM) make assumptions regarding the investment required over time and the expected financial return over time. These cash flows are brought back to a net present value (NPV) level using an accepted discounting method and rate. The discount rate is chosen to account for the cost of capital and the inherent risk in the project. The investment analysis typically provides a basis for a go/no-go decision on resource allocation. Once approved, the funded project proceeds with cash flow proceeding as prescribed in the project plan. In this respect, many plant acquisition projects may be considered passive.

A significant and unique characteristic of a CBM investment is the subsequent operational and investment options it provides management. A CBM system does not inherently prevent a failure or automatically reduce maintenance costs. A CBM system provides the essential information that permits avoiding a failure or for minimizing maintenance or repair costs. Realizing the benefits enabled by a CBM system requires active decision making to initiate the indicated repair, operating changes, or acquisitions. Similar to financial investment models such as put and call, a CBM investment does not prevent a failure or automatically generate profit, it affords an option to take action sometime in the future (exercise an option) to realize a financial or operational benefit. The option to make future decisions may be captured in an economic model derived from financial investment futures. This technique, called real options valuation, is directed at establishing an economic value of an investment that includes the benefits (and costs) derived from potential future investments. The potential future investment options are enabled by the initial investment and they may be deferred, exercised, or canceled at some time in the future when more information in known. In this sense, real options valuation takes into account the dynamic and active role of management over the life of the investment.

The subject invention can augment the traditional economic valuation methods used for plant acquisitions with results from a real options valuation to establish the value of a CBM investment. Condition based maintenance systems provide information essential for establishing effective reliability centered maintenance programs. Information regarding the degree of machinery degradation, a diagnosis of an early stage fault, and prognostics information such as remaining useful life enable plant maintenance and operations personnel to take action to minimize maintenance expenses and operations impact. A real options approach to evaluating investments in machinery monitoring and diagnostic systems may provide insight into the future value associate with subsequent linked investment options. Investment in an initial CBM system for example can provide future, more informed options to further expand the core CBM system or to integrate the system into other business information systems. Alternatively, information from the initial CBM system can enable other operational investments that otherwise would not be available. For example, a CBM system may provide a basis for accelerating periodic maintenance, or may prescribe replacing equipment just before failure and minimizing the amount of remaining useful life that is discarded. Information from the CBM system may also provide valuable information on when to exercise the upgrade or replacement option.

The aforementioned examples and discussion are simply to convey the numerous advantages associated with the subject invention. It is to be appreciated that any suitable number of components and combination thereof can be employed in connection with optimizing the overall system 100 in accordance with the present invention. Moreover, as a result of the large number of combinations of components available in connection with the subject invention some of the combinations will have known correlations while there may exists other correlations not readily apparent but yet still have an influence in connection with optimization of the system 100. Accordingly, in connection with one particular aspect of the invention data fusion can be employed in situations in order to take advantage of information fission which may be inherent to a process (e.g., vibration in the machine 110) relating to sensing a physical environment through several different sensor modalities. In particular, one or more available sensing elements may provide a unique window into the physical environment where the phenomena to be observed is occurring (e.g., in the motorized system and/or in a system of which the motorized pumping system is a part). Because the complete details of the phenomena being studied (e.g., detecting the operating state of the system or components thereof) may not be contained within a single sensing element window, there is information fragmentation which results from this fission process. These information fragments associated with the various sensing devices may include both independent and dependent components.

The independent components may be used to further fill out (or span) the information space and the dependent components may be employed in combination to improve the quality of common information recognizing that all sensor data may be subject to error and/or noise. In this context, data fusion techniques employed in the ERP system 132 may include algorithmic processing of sensor data in order to compensate for the inherent fragmentation of information because a particular phenomena may not be observed directly using a single sensing element. Thus, data fusion provides a suitable framework to facilitate condensing, combining, evaluating and interpreting the available sensed information in the context of the particular application. It will further be appreciated that the data fusion may be employed in the diagnostics and prognostic component 132 in order to employ available sensors to infer or derive attribute information not directly measurable, or in the event of sensor failure.

Thus, the present invention provides a data fusion framework and algorithms to facilitate condensing, combining, evaluating and interpreting various sensed data. The present invention also facilitates establishing a health state of a system, as well as for predicting or anticipating a future state of the machine(s) 110 and/or the system 100 (e.g., and/or of a sub-system of which the motorized pump system 110 is a part). The data fusion system may be employed to derive system attribute information relating to any number of attributes according to measured attribute information (e.g., from the sensors) in accordance with the present invention. In this regard, the available attribute information may be employed by the data fusion system to derive attributes related to failed sensors, and/or to other performance characteristics of the machine(s) 110 and/or system 100 for which sensors are not available. Such attribute information derived via the data fusion may be employed in generating a diagnostics signal or data, and/or in performing control functions in connection therewith.

In another example, a measured attributes may comprise flow and pressure signals obtained from sensors associated with the machine 110 (e.g., pump), wherein the diagnostics system 132 provides a diagnostics signal indicative of pump cavitation according to measured flow and pressure signals. The invention thus provides for health indications relating to component conditions (e.g., wear, degradation, faults, failures, etc.), as well as those relating to process or systems conditions, such as cavitation in the pump 110. The diagnostics system 132 may comprise a classifier system, such as a neural network, detecting pump cavitation according to the measured flow and pressure signals, which may be provided as inputs to the neural network. The cavitation indication in the resulting diagnostics signal or data may further be employed to modify operation of the machine 110 and/or system 100, for example, in order to reduce and/or avoid such cavitation. Thus, an appropriate control signal may be provided by a controller to a motor drive in connection with the pump 110 in order to avoid anticipated cavitation, based on the diagnostics signal (e.g., and/or a setpoint), whereby the service lifetime of one or more system components (e.g., pump) may be extended.

In another related example, cavitation (e.g., actual or suspected) in the pump 110 may be detected via measured (e.g., or derived) current signal measurements, for example, via a sensor. The diagnostics system 132 in this instance may provide a diagnostics signal indicative of pump cavitation according to the measured current. In order to detect cavitation using such current information, the diagnostics system 132 may employ the neural network to synthesize a change in condition signal from the measured current. In addition, the diagnostics system 132 may further comprise a preprocessing portion (not shown) operatively coupled to the neural network, which conditions the measured current prior to inputting the current into the neural network, as well as a post processing portion operatively coupled to the neural network to determine whether the change in condition signal is due to a fault condition related to a motorized system driving the pump 110. In this regard, the post processing portion may comprise a fuzzy rule based expert system. In addition, the diagnostics system 132 may detect one or more faults relating to the operation of the pump 110 and/or one or more faults relating to the operation of a motor driving the pump 110 according to the measured current.

Other faults may be detected and diagnosed using the diagnostics and control system 132 of the invention. For instance, the diagnostics system 132 may be adapted to obtain a space vector angular fluctuation from a current signal (e.g., from a current sensor) relating to operation of the motor driving the pump, and further to analyze the space vector angular fluctuation in order to detect at least one fault in the motorized system. Such faults may include, for example, stator faults, rotor faults, and/or an imbalance condition in the power applied to the motor in the motorized system.

In this situation, the diagnostics/prognostic system 132 may obtain a current signal associated with the motor from the sensor, and calculate a space vector from the current signal. The diagnostics/prognostic system 132 determines a space vector angular fluctuation from the space vector, and analyzes the space vector angular fluctuation in order to detect one or more faults associated with the motor driving the pump 110. For instance, first, second, and third phase current signals associated with the motorized system may be sampled in order to obtain the current signal, and corresponding first, second, and third phase space vectors may be computed in the diagnostics/prognostic system 132.

A resulting space vector may then be calculated, for example, by summing the first, second, and third phase space vectors. The diagnostics/prognostic system 132 may then compare the space vector with a reference space vector, wherein the reference space vector is a function of a constant frequency and amplitude, and compute angular fluctuations in the space vector according to the comparison, in order to determine the space vector angular fluctuation. The diagnostics/prognostic system 132 then performs frequency spectrum analysis (e.g., using an FFT component) of the space vector angular fluctuation to detect faults associated with the motorized system. For example, motor faults such as rotor faults, stator faults, and/or unbalanced supply power associated with the pump motor may be ascertained by analyzing the amplitude of a first spectral component of the frequency spectrum at a first frequency, wherein the diagnostics/prognostic system 132 may detect fluctuations in amplitude of the first spectral component in order to detect one or more faults or other adverse conditions associated with the motorized system. In this regard, certain frequencies may comprise fault related information, such as where the first frequency is approximately twice the frequency of power applied to the motor driving the pump. Alternative to generating a full spectrum, the diagnostics/prognostic system 132 may advantageously employ a Goertzel algorithm to extract the amplitude of the first spectral component in order to analyze the amplitude of the first spectral component. The diagnostics/prognostic signal indicating such motor faults may then be employed by a controller to modify operation of the pumping system 110 to reduce or mitigate such faults. The above discussion in connection with FIG. 1 was presented at a high-level—FIGS. 9 and 20 should be referenced in connection with details regarding the motor, drivers, sensors, controllers, etc.

Figure 4:
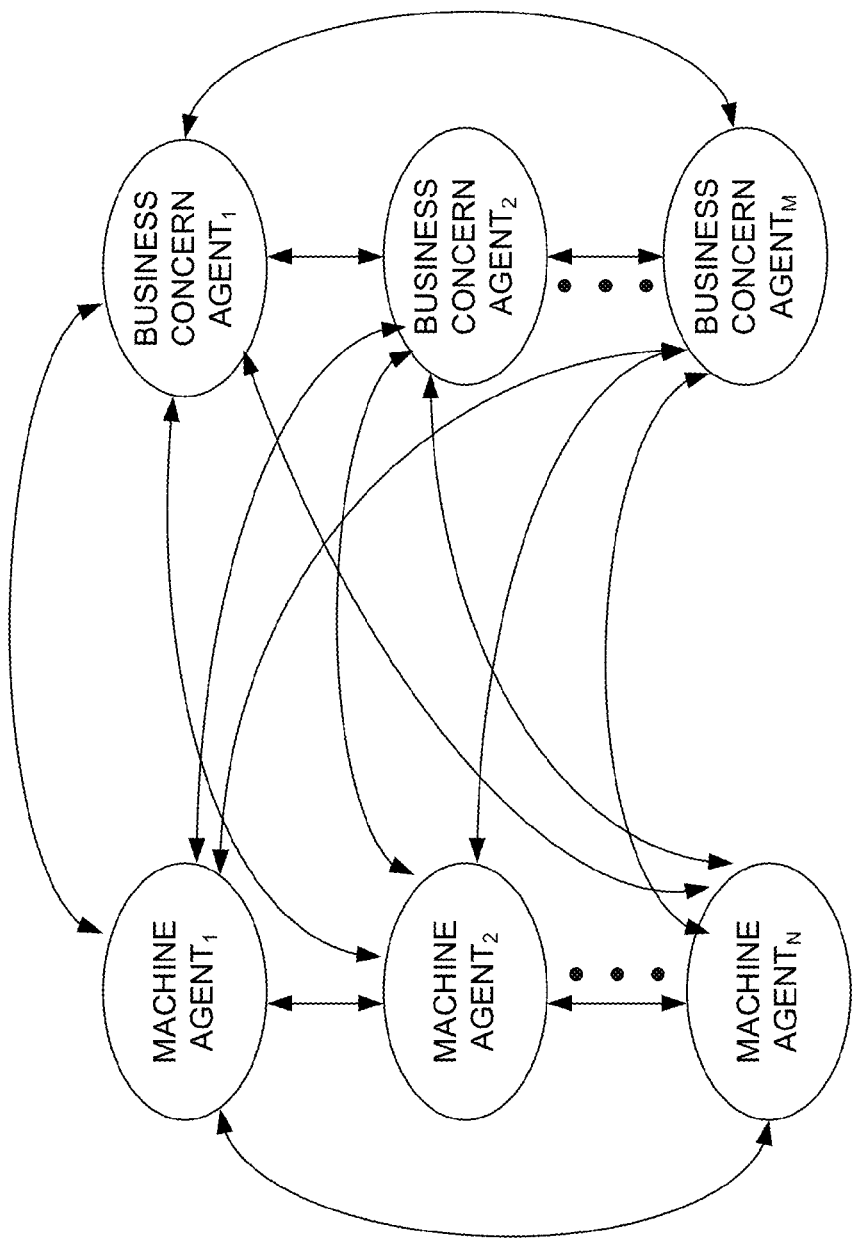
FIG. 4 illustrates an exemplary intelligent agent-based framework in accordance with the subject invention.

FIG. 4 illustrates an aspect of the subject invention wherein at least a subset of the machines or components are represented via intelligent software agents. For example, each of the respective machines 110 (FIG. 1*a*) can be represented by respective intelligent agents (MACHINE AGENT$_1$ through MACHINE AGENT$_N$—N being an integer), and various business concerns represented by respective agents (e.g., BUSINESS AGENT$_1$ through BUSINESS AGENT$_M$—M being an integer). The intelligent agents can be software models representative of their various physical or software counterparts, and these agents can serve as proxies for their counterparts and facilitate execution of various aspects (e.g., machine or component interaction, modification, optimization) of the subject invention. The agents can be designed (e.g., appropriate hooks, interfaces, common platform, schema, translators, converters . . . ) so as to facilitate easy interaction with other agents. Accordingly, rather than executing an optimization algorithm for example on a respective device directly, such algorithms can be first executed on the respective agents and than once the system 100 decides on an appropriate set of modifications the final modifications are implemented at the agent counterparts with the agents carrying the instructions for such modifications.

The proliferation of distributed computing systems and enhanced prognostic, control, and optimization techniques provides via the subject invention for changing the landscape of industrial automation systems. The aforementioned framework complements technical capabilities for asset optimization via an agent based representation. Agents may be considered autonomous, intelligent devices with local objectives and local decision making. These agents however can be part of a larger collection of agents and possess social and collaborative decision making as well. These capabilities permit localized, distributed agents to collaborate and meet new, possibly unforseen operational conditions. In addition, through collaboration, some agents may choose to operate in a sub-optimal mode in order to achieve some higher level objective such as asset optimization, process safety, or overall process energy optimization.

Figure 5:
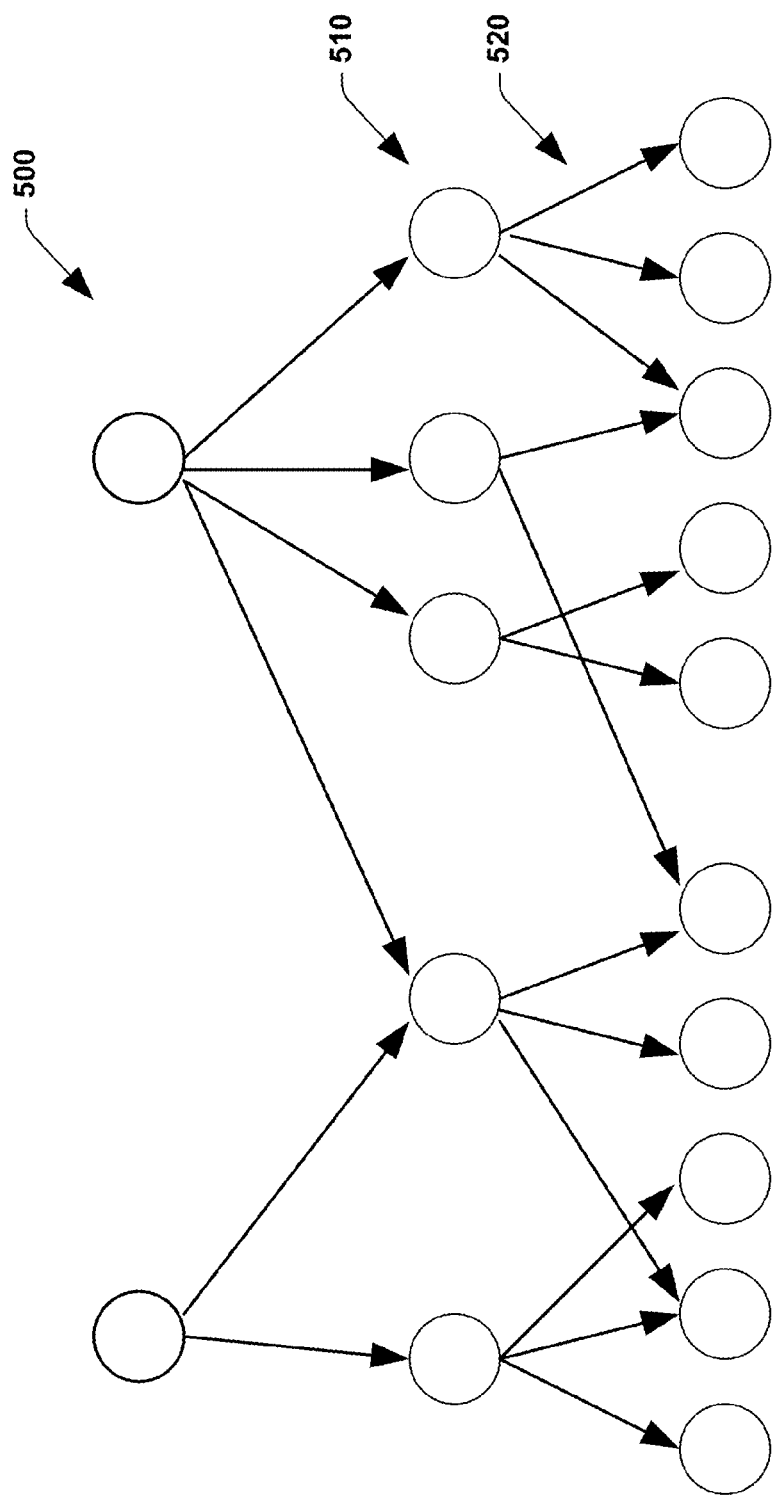
FIG. 5 illustrates an exemplary belief network in accordance with the subject invention.

FIG. 5 illustrates a representative belief network 500 that can be are used to model uncertainty in a domain in connection with the subject invention. The term "belief networks" as employed herein is intended to encompass a whole range of different but related techniques which deal with reasoning under uncertainty. Both quantitative (mainly using Bayesian probabilistic methods) and qualitative techniques are used. Influence diagrams are an extension to belief networks; they are used when working with decision making. Belief networks are employed to develop knowledge based applications in domains which are characterized by inherent uncertainty. A problem domain is modeled as a set of nodes 510 interconnected with arcs 520 to form a directed acyclic graph as shown in FIG. 5. Each node represents a random variable, or uncertain quantity, which can take two or more possible values. The arcs 520 signify the existence of direct influences between the linked variables, and the strength of each influence is quantified by a forward conditional probability.

Within the belief network the belief of each node (the node's conditional probability) is calculated based on observed evidence. Various methods have been developed for evaluating node beliefs and for performing probabilistic inference. The various schemes are essentially the same— they provide a mechanism to propagate uncertainty in the belief network, and a formalism to combine evidence to determine the belief in a node. Influence diagrams, which are an extension of belief networks, provide facilities for structuring the goals of the diagnosis and for ascertaining the value (the influence) that given information will have when determining a diagnosis. In influence diagrams, there are three types of node: chance nodes, which correspond to the nodes in Bayesian belief networks; utility nodes, which represent the utilities of decisions; and decision nodes, which represent decisions which can be taken to influence the state of the world. Influence diagrams are useful in real world applications where there is often a cost, both in terms of time and money, in obtaining information.

An expectation maximization (EM) algorithm is a common approach for learning in belief networks. In its standard form it does not calculate the full posterior probability distribution of the parameters, but rather focuses in on maximum a posteriori parameter values. The EM algorithm works by taking an iterative approach to inference learning. In the first step, called the E step, the EM algorithm performs inference in the belief network for each of the datum in the dataset. This allows the information from the data to be used, and various necessary statistics S to be calculated from the resulting posterior probabilities. Then in the M step, parameters are chosen to maximize the log posterior logP(T|D,S) given these statistics are fixed. The result is a new set of parameters, with the statistics S which we collected are no longer accurate. Hence the E step must be repeated, then the M step and so on. At each stage the EM algorithm guarantees that the posterior probability must increase. Hence, it eventually converges to a local maxima of the log posterior.

Figure 6:
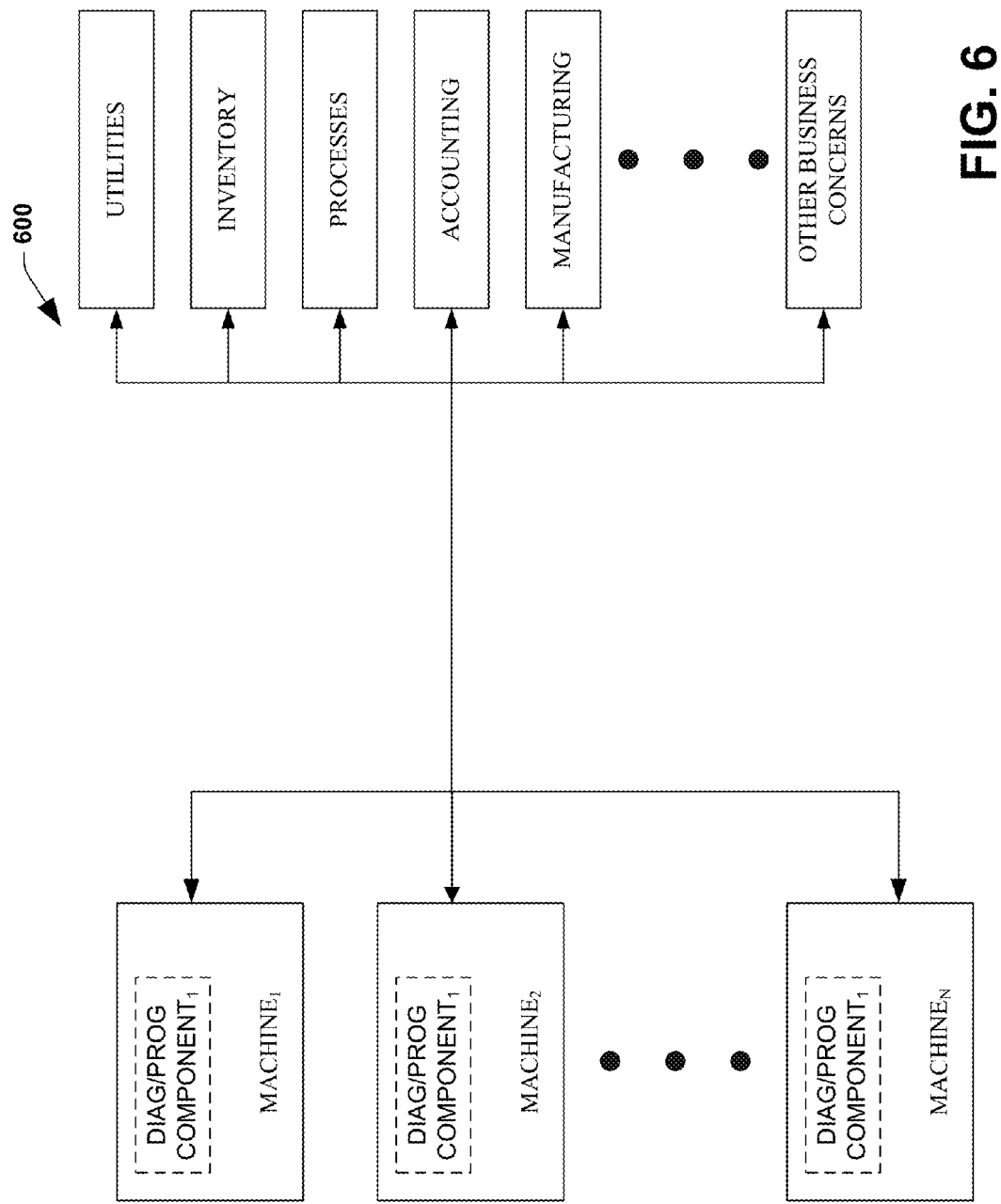
FIG. 6 is a high level illustration of a distributed system in accordance with the subject invention.

FIG. 6 illustrates an aspect of the invention in which the invention is employed as part of a distributed system 600 rather than via a host computer (FIG. 1*a*). Thus, the various components in the system 600 share processing resources and work in unison and/or in subsets to optimize the overall system 600 in accordance with various business objectives. It is to be appreciated that such distributed system can employ intelligent agents (FIG. 2) as described supra as well as belief networks (FIG. 5) and the ERP components 132 (FIG. 1*a*) and data fusion described above in connection with the system 100. Rather than some of these components (ERP, data fusion) being resident on a single dedicated machine or group of machines, they can be distributed among any suitable components within the system 600. Moreover, depending on which threads on being executed by particular processors and the priority thereof, the components may be executed by a most appropriate processor or set of processors given the state of all respective processors within the system 600.

Figure 7:
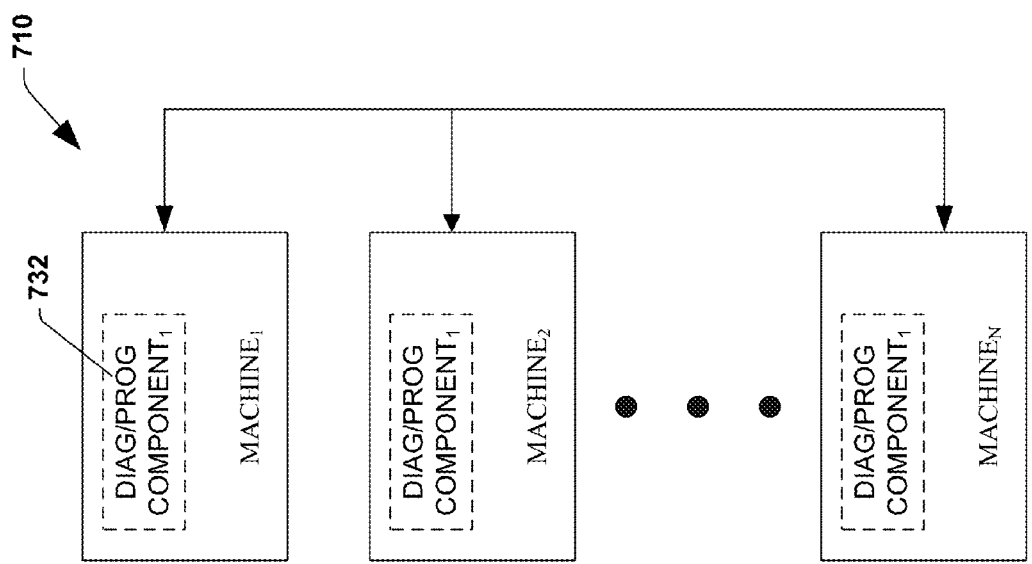
FIG. 7 illustrates a plurality of machines employing the subject invention in connection with optimization.

FIG. 7 illustrates another aspect of the subject invention wherein the invention is implemented among the respective machines 710 in connection with optimizing use thereof. For example, the diagnostic/prognostic components 732 can exchange and share data so as to schedule maintenance of a particular machine, or load balance.

Retuning back to FIG. 1*a*, the present invention can also be employed in connection with asset management. Typically diagnostics activities for many industrial and commercial organizations are conducted separate from control and process operation activities. In addition, the interface to acquire needed maintenance and repair components is often done manually. Similarly, capital acquisition of replacement equipment is also performed in a manual, batch, off-line manner. Equipment acquisition decisions are often made with a separate economic analysis including pricing analysis and consideration for capital funding available. It is difficult to incorporate dynamic operational data such as efficiency, reliability, and expected maintenance cost into this analysis. The growing presence of e-commerce and computer-accessible acquisition information is rarely utilized by computer systems. Instead, these e-commerce systems are often accessed by a human. The subject invention includes an optimization function that facilitates realization of maximum revenue from an industrial machine while mitigating catastrophic failure.

Machinery operation can be altered as needed to run less efficiently or noisier as needed to maintain useful machinery operation.

Thus the subject invention integrates the aforementioned optimization functionality with asset management and logistics systems such as e-commerce systems. Such tightly integrated approach can enable a process to predict a failure, establish when a replacement component could be delivered and installed, and automatically alter the control to insure continued operation until the replacement part arrives. For example, a needed replacement part could automatically be ordered and dynamically tracked via the Internet to facilitate continued operation. Alterations in the control could automatically be made based on changes in an expected delivery date and prognostic algorithms results. For example, a prognostic algorithm could determine a drive-end bearing system has degraded and has perhaps 500 operating hours left at the current speeds, loads, and temperatures. The correct needed replacement bearing could be automatically ordered via an e-commerce web site (e.g. PTPlace) and shipment tracked until the part arrived. The control may be automatically altered to extend the useful life of the bearing as required (e.g. reducing speed by ½ doubles the bearing life). Delays in receiving the needed replacement could cause the part to be ordered from another source and the control dynamically altered as needed. Maintenance could be scheduled to replace the part to coincide with the part arrival.

In the case of excessive maintenance costs, the optimization program could determine that continually replacing failing components is not longer an optimum strategy and could perform an economic analysis on a new more reliable component or a new machine. The new machine could provide a far more optimum solution than continually running in a degraded condition and replacing individual components. The new replacement machine (e.g. a motor) could be automatically ordered and scheduled to swap out the older, high-maintenance item. Optimization techniques that optimize the design and selection of components could be integrated with real-time dynamic optimization and integrated with internet-based product information and ordering information to provide a superior level of process optimization as compared to conventional asset management schemes.

Figure 8:
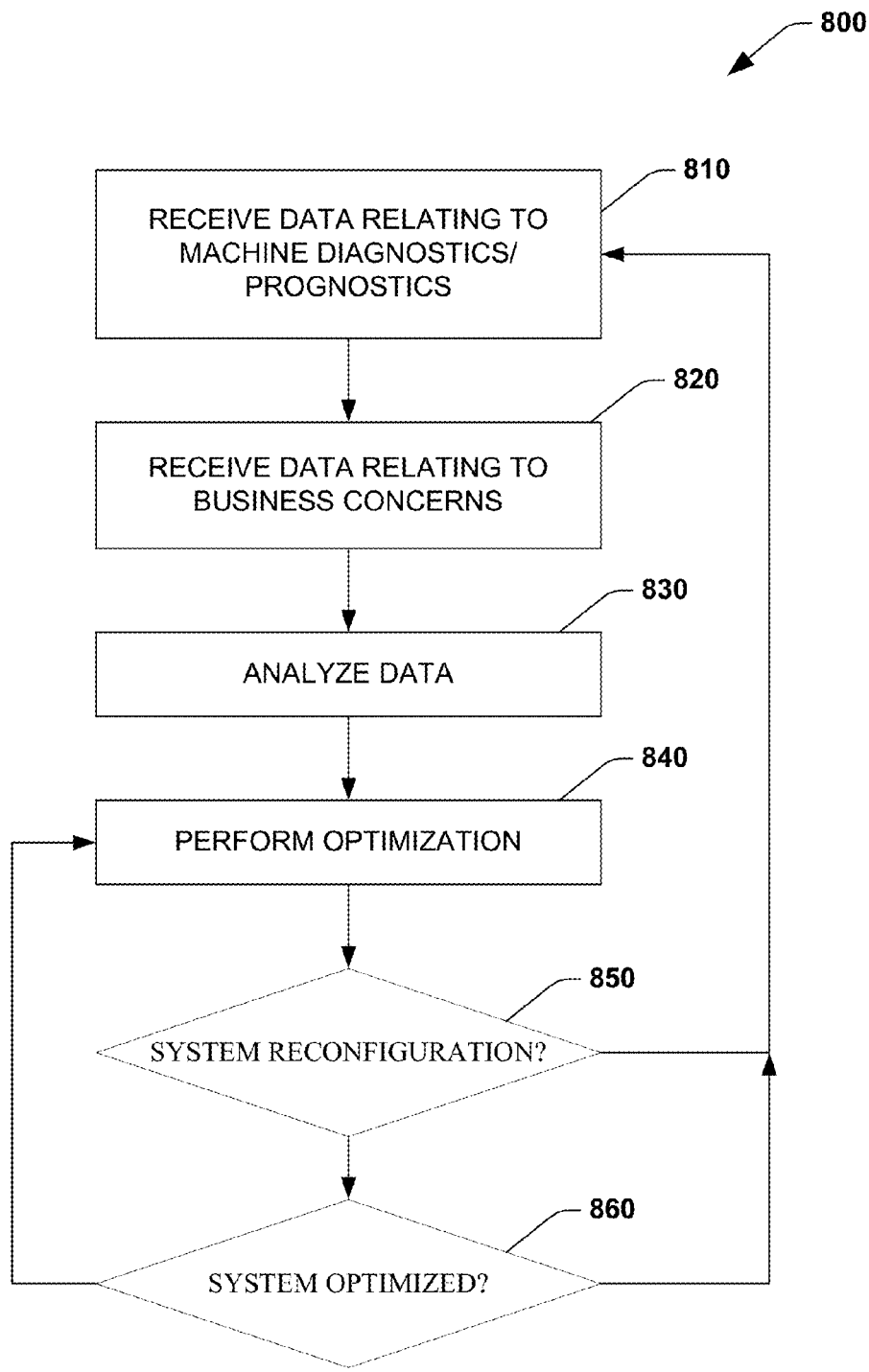
FIG. 8 is a high-level flow diagram in accordance with one particular aspect of the subject invention.

In view of the exemplary systems shown and described above, methodologies that may be implemented in accordance with the present invention will be better appreciated with reference to the flow diagram of FIG. 8. While, for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

FIG. 8 is a high-level flow diagram depicting one particular methodology 800 in connection with facilitating optimizing an industrial automation system in accordance with the subject invention. At 810, data relating to machine diagnostics or prognostics is received. The data can be collected from a historical database, collected in situ for example from operation of the various machines, collected via various sensing devices, and generated via analyzing the aforementioned collected data. The generated data can also relate to future predicted states of the respective machines and/or with respect to clusters of the machines.

The data can be obtained for example via measuring an attribute associated with a motorized system (e.g., motorized pump, fan, conveyor system, compressor, gear box, motion control device, screw pump, and mixer, hydraulic or pneumatic machine, or the like). The measured attribute may comprise, for example, vibration, pressure, current, speed, and/or temperature associated with the motorized system. The data can comprise data relating to the health of the motorized system according to the measured attribute. For example, diagnostics data can be generated which may be indicative of the diagnosed motorized system health, whereby the motorized system is operated according to a setpoint and/or the diagnostics data generated. The provision of the diagnostics data may comprise, for example, obtaining a frequency spectrum of the measured attribute and analyzing the frequency spectrum in order to detect faults, component wear or degradation, or other adverse condition in the motorized system, whether actual or anticipated. The diagnosis may further comprise analyzing the amplitude of a first spectral component of the frequency spectrum at a first frequency.

In order to provide the diagnostics data, the invention may provide the measured attribute(s) to a neural network, an expert system, a fuzzy logic system, and/or a data fusion component, or a combination of these, which generates the diagnostics signal indicative of the health of the motorized system. For example, such frequency spectral analysis may be employed in order to determine faults or adverse conditions associated with the system or components therein (e.g., motor faults, unbalanced power source conditions, etc.). In addition, the diagnosis may identify adverse process conditions, such as cavitation in a motorized pumping system.

At 820 data relating to various business concerns (e.g., inventory, revenue, marketing, accounting, utilities, cash flow, mission statements, manufacturing, logistics, asset management, layout, processes . . . ) is received and/or generated. Such data can be gathered for example from various business software packages, manually, spreadsheets, etc. Moreover, some of the data may be generated via employment of artificial intelligence systems (e.g., neural networks, belief networks, fuzzy logic systems, expert systems, data fusion engines, combination thereof).

At 830 and 840, the data is analyzed in connection with optimization software that analyzes the machine data as well as the business concern data. Such analysis can include searching for and identifying correlations amongst the data, trend analysis, inference analysis, data mining, data fusion analysis, etc. in an effort to identify schemes for reorganizing, restructuring, modifying, adding and/or deleting the various machine and business components so as to facilitate optimizing the overall business system or method in accordance with identified business objective(s).

At 850, a determination is made as to whether component or system reconfiguration may result in convergence toward optimization. If YES, the system is reconfigured in a manner coincident with a predicted configuration expected to achieve a more desired end result. If, NO, the process returns to 810.

At 860, a determination is made as to whether the system has been optimized. If NO, the process returns to 640. If YES, the process returns to 810.

Figure 9:
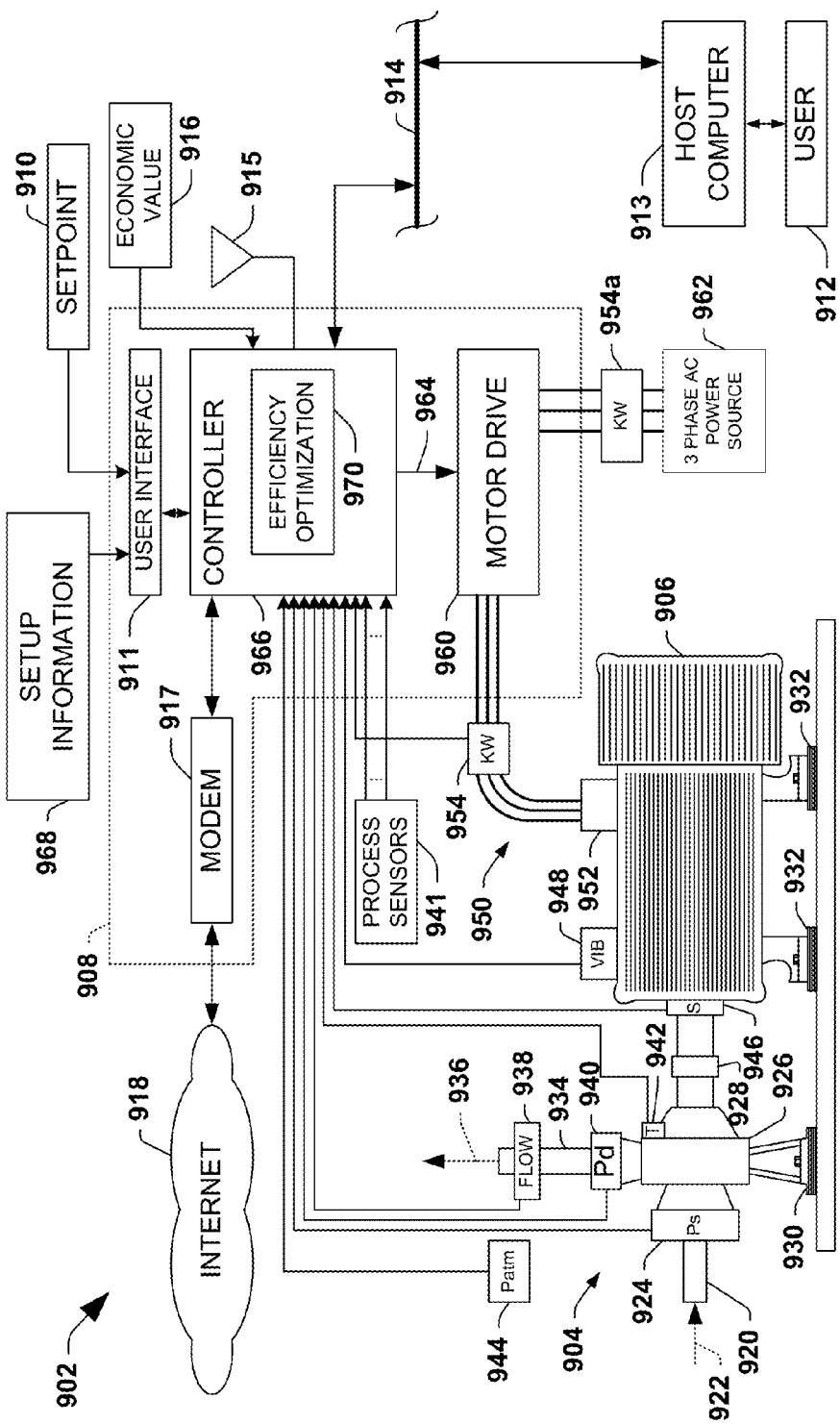
FIG. 9 is a side elevation view illustrating an exemplary motorized pump system and a control system therefore with an optimization component in accordance with an aspect of the present invention.

The following discussion with reference to FIGS. 9-20 provides additional detail as to exemplary systems and methods for collecting and analyzing machine data in connection with the subject invention. It is to be appreciated that such discussion is merely provided to ease understanding of the subject invention, and not to limit the invention to such systems and methods. In FIG. 9, an exemplary motorized pump system 902 is illustrated having a pump 904, a three phase electric motor 906, and a control system 908 for operating the system 902 in accordance with a setpoint 910. While the exemplary motor 906 is illustrated and described herein as a polyphase synchronous electric motor, the various aspects of the present invention may be employed in association with single-phase motors as well as with DC and other types of motors. In addition, the pump 904 may comprise a centrifugal type pump, however, the invention finds application in association with other pump types not illustrated herein, for example, positive displacement pumps.

The control system 908 operates the pump 904 via the motor 906 according to the setpoint 910 and one or more measured process variables, in order to maintain operation of the system 902 commensurate with the setpoint 910 and within allowable process operating ranges specified in setup information 968, supplied to the control system 908 via a user interface 911. For example, it may be desired to provide a constant fluid flow, wherein the value of the setpoint 910 is a desired flow rate in gallons per minute (GPM) or other engineering units. The setup information 968, moreover, may comprise an allowable range of operation about the setpoint 910 (e.g., expressed in GPM, percentage of process variable span, or other units), and allowable range of operation for other process and machinery parameters such as temperature, pressure, or noise emission, wherein the control system 908 may operate the system 902 at an operating point within the allowable range.

Alternatively or in combination, setup information, setpoints, and other information may be provided to the control system 908 by a user 912 via a computer 913 operatively connected to a network 914, and/or by wireless communications via a transceiver 915. Such information may be provided via the network 914 and/or the wireless communications transceiver 915 from a computer (e.g., computer 913) and/or from other controllers such as a programmable logic controller (PLC, not shown) in a larger process, wherein the setpoint 910, setup information, and/or one or more economic values 916 (e.g., related to or indicative of energy costs, which may vary with time, peak loading values, and current loading conditions, material viscosity values, and the like) are provided to the control system 908, as illustrated and described in greater detail hereinafter. The control system 908, moreover, may include a modem 917 allowing communication with other devices and/or users via a global communications network, such as the Internet 918, whereby such setpoint, setup, performance, and other information may be obtained or provided to or from remote computers or users. In this regard, it will be appreciated that the modem 917 is not strictly required for Internet or other network access.

The pump 904 comprises an inlet opening 920 through which fluid is provided to the pump 904 in the direction of arrow 922 as well as a suction pressure sensor 924, which senses the inlet or suction pressure at the inlet 920 and provides a corresponding suction pressure signal to the control system 908. Fluid is provided from the inlet 920 to an impeller housing 926 including an impeller (not shown), which rotates together with a rotary pump shaft coupled to the motor 906 via a coupling 928. The impeller housing 926 and the motor 906 are mounted in a fixed relationship with respect to one another via a pump mount 930, and motor mounts 932. The impeller with appropriate fin geometry rotates within the housing 926 so as to create a pressure differential between the inlet 920 and an outlet 934 of the pump. This causes fluid from the inlet 920 to flow out of the pump 904 via the outlet or discharge tube 934 in the direction of arrow 936. The flow rate of fluid through the outlet 934 is measured by a flow sensor 938, which provides a flow rate signal to the control system 908.

In addition, the discharge or outlet pressure is measured by a pressure sensor 940, which is operatively associated with the outlet 934 and provides a discharge pressure signal to the control system 908. It will be noted at this point that although one or more sensors (e.g., suction pressure sensor 924, discharge pressure sensor 940, outlet flow sensor 938, and others) are illustrated in the exemplary system 902 as being associated with and/or proximate to the pump 904, that such sensors may be located remote from the pump 904, and may be associated with other components in a process or system (not shown) in which the pump system 902 is employed. In this regard, other process sensors 941 may be connected so as to provide signals to the control system 908, for example, to indicate upstream or downstream pressures, flows, or the like. Alternatively, flow may be approximated rather than measured by utilizing pressure differential information, pump speed, fluid properties, and pump geometry information or a pump model. Alternatively or in combination, inlet and/or discharge pressure values may be estimated according to other sensor signals (e.g., 941) and pump/process information.

It will be further appreciated that while the motor drive 960 is illustrated in the control system 908 as separate from the motor 906 and from the controller 966, that some or all of these components may be integrated. Thus, for example, an integrated, intelligent motor may be provided integral to or embedded with the motor 906, to include the motor drive 960 and the controller 966. Furthermore, the motor 906 and the pump 904 may be integrated into a single unit (e.g., having a common shaft wherein no coupling 928 is required), with or without an integral control system (e.g., control system 908, comprising the motor drive 960 and the controller 966) in accordance with the invention.

The control system 908 further receives process variable measurement signals relating to pump temperature via a temperature sensor 942, atmospheric pressure via a pressure sensor 944 located proximate the pump 904, motor (pump) rotational speed via a speed sensor 946, and vibration via sensor 948. Although the vibration sensor 948 is illustrated and described hereinafter as mounted on the motor 906, vibration information may, alternatively or in combination, be obtained from a vibration sensor mounted on the pump 906 (not shown). The motor 906 provides rotation of the impeller of the pump 904 according to three-phase alternating current (AC) electrical power provided from the control system via power cables 950 and a junction box 952 on the housing of the motor 906. The power to the pump 904 may be determined by measuring the current and voltage provided to the motor 906 and computing pump power based on current, voltage, speed, and motor model information such as efficiency. This may be measured and computed by a power sensor 954, which provides a signal related thereto to the control system 908. Alternatively or in combination, the motor drive 960 may provide motor torque information to the controller 966 where pump input power is calculated according to the torque and possibly speed information. Alternatively, input current and possibly voltage may be measured from the power lines going from the power source 962 to the motor drive 960 using a sensor 954*a*.

Drive efficiency and/or motor efficiency equations may be used to determine the power going into the pump 904. It will be noted that either or both of the sensors 954 and 954a can be integrated into the motor drive 960.

The control system 908 also comprises a motor drive 960 providing three-phase electric power from an AC power source 962 to the motor 906 via the cables 950 in a controlled fashion (e.g., at a controlled frequency and amplitude) in accordance with a control signal 964 from a controller 966. The controller 966 receives the process variable measurement signals from the atmospheric pressure sensor 944, the suction pressure sensor 924, the discharge pressure sensor 940, the flow sensor 938, the temperature sensor 942, the speed sensor 946, the vibration sensor 948, the power sensor 954, and other process sensors 941, together with the setpoint 910, and provides the control signal 964 to the motor drive 960 in order to operate the pump system 902 commensurate with the setpoint 910 within specified operating limits. In this regard, the controller 966 may be adapted to control the system 902 to maintain a desired fluid flow rate, outlet pressure, motor (pump) speed, torque, suction pressure, or other performance characteristic.

Setup information 968 may be provided to the controller 966, which may include operating limits (e.g., min/max speeds, min/max flows, min/max pump power levels, min/max pressures allowed, NPSHR values, and the like), such as are appropriate for a given pump 904, motor 906, piping and process conditions, and/or process dynamics and other system constraints. The control system 908 provides for operation within an allowable operating range about the setpoint 910, whereby the system 902 is operated at a desired operating point within the allowable range, in order to optimize one or more performance characteristics (e.g., such as life cycle cost, efficiency, life expectancy, safety, emissions, operational cost, MTBF, noise, vibration, and the like).

Figure 10:
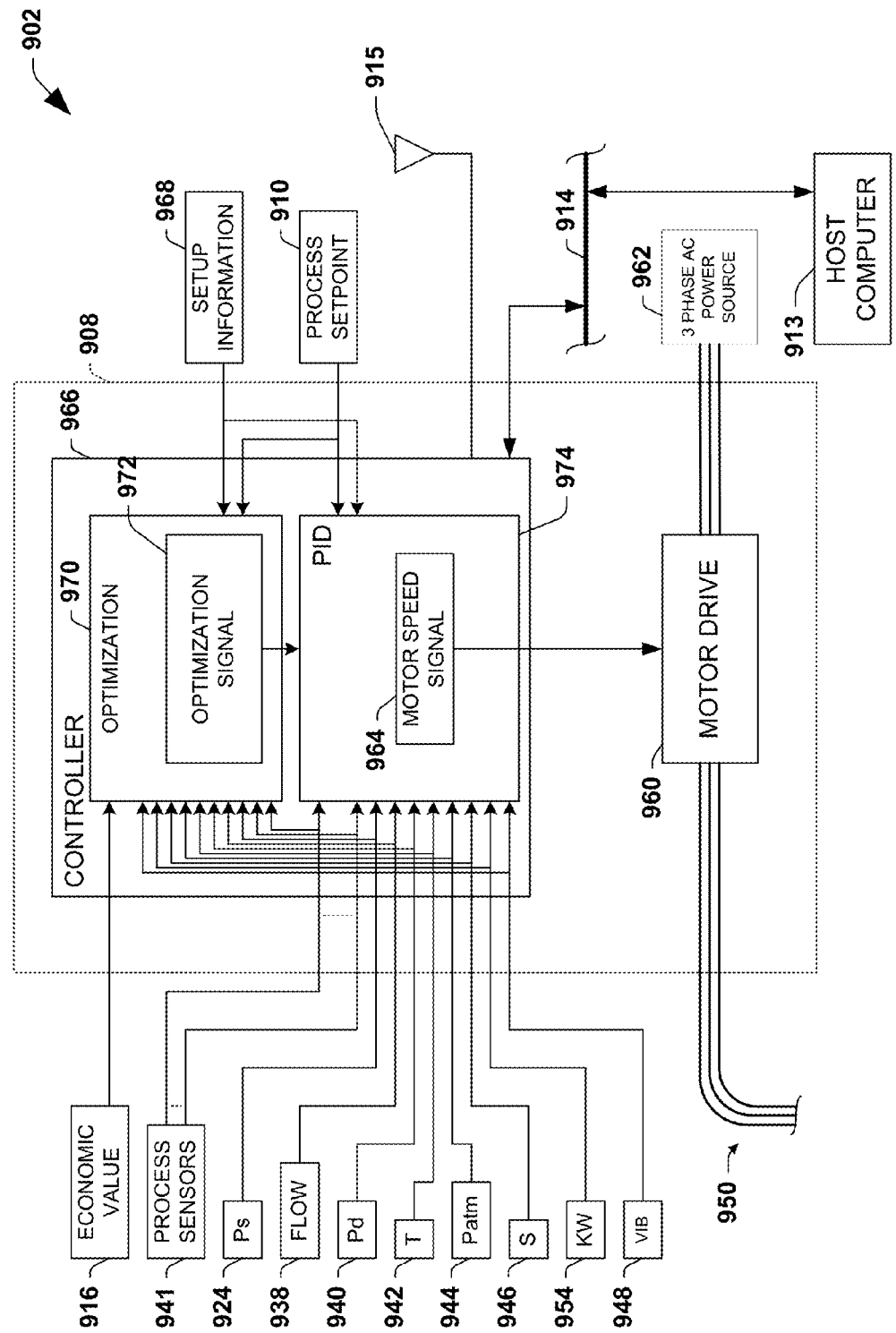
FIG. 10 is a schematic diagram illustrating further details of the exemplary control system of FIG. 9.

Referring also to FIG. 10, the controller 966 comprises an optimization component 970, which is adapted to select the desired operating point for pump operation within the allowable range about the setpoint 910, according to an aspect of the invention. As illustrated and described hereinafter, the optimization component 970 may be employed to optimize efficiency or other performance characteristics or criteria, including but not limited to throughput, lifetime, or the like. The component 970, moreover, may select the desired operating point according to performance characteristics associated with one or more components in the system 902 or associated therewith. For example, the optimization component 970 may generate an optimization signal 972 by correlating pump, motor, and or motor drive efficiency information associated with the pump 904, motor 906, and motor drive 960, respectively, to derive a correlated process efficiency associated with the entire system 902.

Such component efficiency information may be obtained, for example, from setup information 969 such as efficiency curves for the pump 904, motor 906, and drive 960 alone or in combination with such information derived from one or more of the sensors 924, 938, 940, 941, 942, 944, 946, 954, 954a, and/or 948. In this manner, the efficiency of a particular component (e.g., pump 904, motor 906, and drive 960) in the system 902 may be determined from manufacturer data, which may be supplemented, enhanced, or replaced with actual measured or computed efficiency information based on prior operation and/or diagnosis of one or more such components.

The optimization component 970, moreover, may correlate efficiency information related to the components of the system 902, along with such efficiency information related to components of a larger process or system of which the system 902 is a part, in order to select the desired operating point for optimization of overall system efficiency. Thus, for example, the controller 966 may generate the control signal 964 to the motor drive 960 according to the optimization signal 972 from the optimization component 970, based on the optimum efficiency point within the allowable operating range according to the correlated process efficiency for the system 902. Furthermore, it will be appreciated that performance information associated with components in unrelated systems may be employed (e.g., efficiency information related to motors in other, unrelated systems within a manufacturing facility) in optimizing energy usage across the entire facility.

Alternatively or in combination, the controller 966 may operate the pump within the allowable range about the setpoint 910 in order to achieve global optimization of one or more performance characteristics of a larger process or system of which the pump system 902 is a part. Thus, for example, the components (e.g., pump 904, motor 906, drive 960) of the system 902 may be operated at less than optimal efficiency in order to allow or facilitate operation of such a larger process at optimal efficiency. The controller 966 selectively provides the control signal 964 to the motor drive 960 according to the setpoint 910 (e.g., in order to maintain or regulate a desired flow rate) as well as to optimize a performance characteristic associated with the system 902 or a larger process, via the optimization signal 972. Thus, in one example flow control is how optimization is achieved in this example. It will be noted that the allowable range of operation may be provided in lieu of an actual setpoint, or the allowable range may be derived using the setpoint value 910.

In this regard, the controller 966 may provide the control signal 964 as a motor speed signal 964 from a PID control component 974, which inputs process values from one or more of the sensors 924, 938, 940, 942, 944, 946, 948, 954, and 954a, economic values 916, and the setpoint 910, wherein the magnitude of change in the control signal 964 may be related to the degree of correction required to accommodate the present control strategy, for example, such as system efficiency, and/or the error in required versus measured process variable (e.g., flow). Although the exemplary controller 966 is illustrated and described herein as comprising a PID control component 974, control systems and controllers implementing other types of control strategies or algorithms (e.g., PI control, PID with additional compensating blocks or elements, stochastics, non-linear control, state-space control, model reference, adaptive control, self-tuning, sliding mode, neural networks, GA, fuzzy logic, operations research (OR), linear programming (LP), dynamic programming (DP), steepest descent, or the like) are also contemplated as falling within the scope of the present invention.

The exemplary PID component 974 may compare a measured process variable (e.g., flow rate measured by sensor 938) with the desired operating point within the allowable range about the setpoint 910, where the setpoint 910 is a target setpoint flow rate, and wherein one or more of the process variable(s) and/or the desired operating point (e.g., as well as the allowable operating range about the setpoint) may be scaled accordingly, in order to determine an error value (not shown). The error value may then be used to generate the motor speed signal 964, wherein the signal 964 may vary proportionally according to the error value, and/or the derivative of the error, and/or the integral of the error, according to known PID control methods.

The controller 966 may comprise hardware and/or software (not shown) in order to accomplish control of the process 902. For example, the controller 966 may comprise a microprocessor (not shown) executing program instructions for implementing PID control (e.g., PID component 974), implementing the efficiency or other performance characteristic optimization component 970, inputting of values from the sensor signals, providing the control signal 964 to the motor drive 960, and interacting with the user interface 911, the network 914, modem 917, and the transceiver 915. The user interface 911 may allow a user to input setpoint 910, setup information 968, and other information, and in addition may render status and other information to the user, such as system conditions, operating mode, diagnostic information, and the like, as well as permitting the user to start and stop the system and override previous operating limits and controls. The controller 966 may further include signal conditioning circuitry for conditioning the process variable signals from the sensors 916, 924, 938, 940, 941, 942, 944, 946, 948, and/or 954.

The controller 966, moreover, may be integral with or separate from the motor drive 960. For example, the controller 966 may comprise an embedded processor circuit board mounted in a common enclosure (not shown) with the motor drive 960, wherein sensor signals from the sensors 916, 924, 938, 940, 941, 942, 944, 946, 948, and/or 954 are fed into the enclosure, together with electrical power lines, interfaces to the network 914, connections for the modem 917, and the transceiver 915, and wherein the setpoint 910 may be obtained from the user interface 911 mounted on the enclosure, and/or via a network, wireless, or Internet connection. Alternatively, the controller 966 may reside as instructions in the memory of the motor drive 960, which may be computed on an embedded processor circuit that controls the motor 906 in the motor drive 960.

In addition, it will be appreciated that the motor drive 960 may further include control and feedback components (not shown), whereby a desired motor speed (e.g., as indicated by the motor speed control signal 964 from the PID component 974) is achieved and regulated via provision of appropriate electrical power (e.g., amplitude, frequency, phasing, etc.) from the source 962 to the motor 906, regardless of load fluctuations, and/or other process disturbances or noise. In this regard, the motor drive 960 may also obtain motor speed feedback information, such as from the speed sensor 946 via appropriate signal connections (not shown) in order to provide closed loop speed control according to the motor speed control signal 964 from the controller 966. In addition, it will be appreciated that the motor drive 960 may obtain motor speed feedback information by means other than the sensor 946, such as through internally computed speed values, as well as torque feedback information, and that such speed feedback information may be provided to the controller 966, whereby the sensor 946 need not be included in the system 902. One control technique where the motor drive 960 may obtain torque and speed information without sensors is when running in a vector-control mode.

Figure 11:
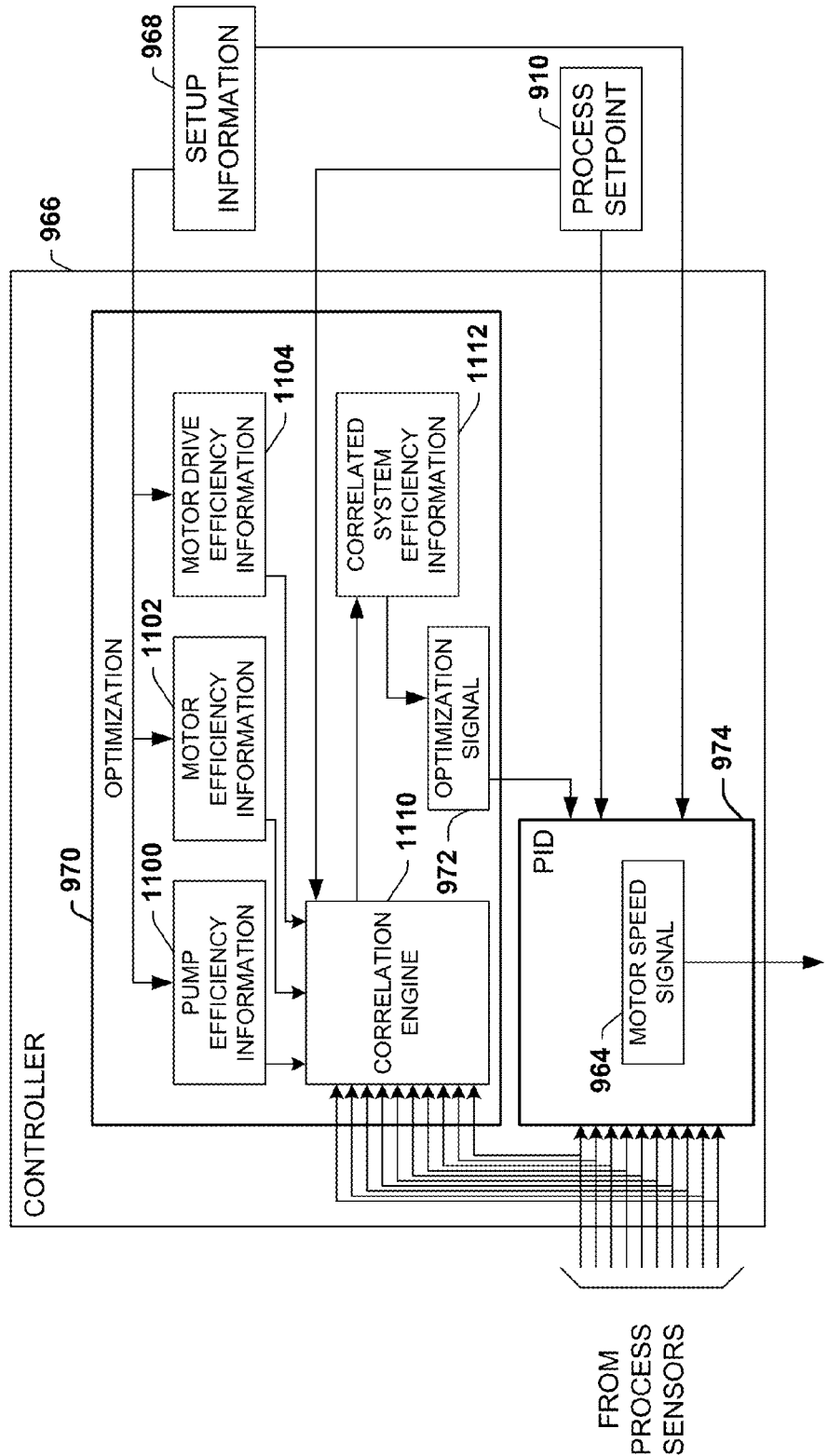
FIG. 11 is a schematic diagram further illustrating the efficiency optimization component and controller of FIGS. 9 and 10.

As further illustrated in FIG. 11, the optimization component 970 correlates component performance information (e.g., efficiency information) associated with one or more components (e.g., pump 704, motor 706, motor drive 760, etc.) in the system 702 in order to derive correlated process performance information. In addition, the component 970 may employ performance information associated with other components in a larger process (not shown) of which the system 702 is a part, in order to derive correlated performance information. It will be appreciated that the optimization component 970, moreover, may correlate information other than (or in addition to) efficiency information, including but not limited to life cycle cost, efficiency, life expectancy, safety, emissions, operational cost, MTBF, noise, vibration, and the like.

The optimization component 970 selects the desired operating point as the optimum performance point within the allowable range of operation according to the correlated process performance information. As illustrated in FIG. 9, the controller 966 may obtain pump efficiency information 900 related to the pump 704, motor efficiency information 902 related to the motor 706, and motor drive efficiency information 904 related to the motor drive 760, which is provided to a correlation engine 910 in the optimization component 970. The correlation engine 910 correlates the information 900, 902, and/or 904 according to present operating conditions (e.g., as determined according to values from one or more of the process sensors 924, 938, 940, 941, 942, 944, 946, 948, and/or 954, economic value(s) 916, setpoint 910, and allowable operating range information from setup information 968) in order to determine a desired operating point within the allowable operating range at which the efficiency of the system 902 or a larger process (not shown) may be optimal.

In this regard, the correlation engine 1110 may compute, predict, or derive correlated system efficiency information 1112 from the correlation of one or more of the pump efficiency information 1100 related to the pump 1104, motor efficiency information 1102 related to the motor 906, and motor drive efficiency information 904 related to the motor drive 960. The correlation may be accomplished in the correlation engine 1110 through appropriate mathematical operations, for example, in software executing on a microprocessor within the controller 966. Appropriate weighting factors may be assigned to the relevant information being correlated (e.g., 1100, 1102, and 1104), for instance, whereby the efficiency of the pump 904 may be given more weight than that of the motor drive 960. The invention can also be employed to provide near-optimal operation to enhance robustness (e.g., to reduce sensitivity), in order to provide better overall optimization.

The correlation engine 1110, moreover, may determine correlated system efficiency information according to the current operating conditions of the system 902, such as the process setpoint 910, diagnosed degradation of system components, etc. Thus, for example, the correlated system efficiency information 1112 may include different desired operating points depending on the setpoint 910, and/or according to the current pressures, flow rates, temperatures, vibration, power usage, etc., in the system 902, as determined by the values from one or more of the sensors 924, 938, 940, 941, 942, 944, 946, 948, and/or 954. The controller 966 then provides the control signal 964 as a motor speed signal 964 to the motor drive 960 according to the desired operating point. In addition to efficiency information (e.g., 1100, 1102, 1104) the component performance information may also comprise one or more of life cycle cost information, efficiency information, life expectancy information, safety information, emissions information, operational cost information, MTBF information, noise information, and vibration information. The correlation engine 1110 can also comprise algorithms employing temporal logic. This permits the correlation engine 1110 to establish dynamic, time varying control signals to optimize system operation over a time horizon. For example, if energy costs are to rise during peak daytime periods, the correlation engine may prescribe a slightly higher throughput during off-peak hours (e.g., less energy efficient during off-peak hours) in order to minimize operation during more costly peak energy cost periods.

Figure 12:
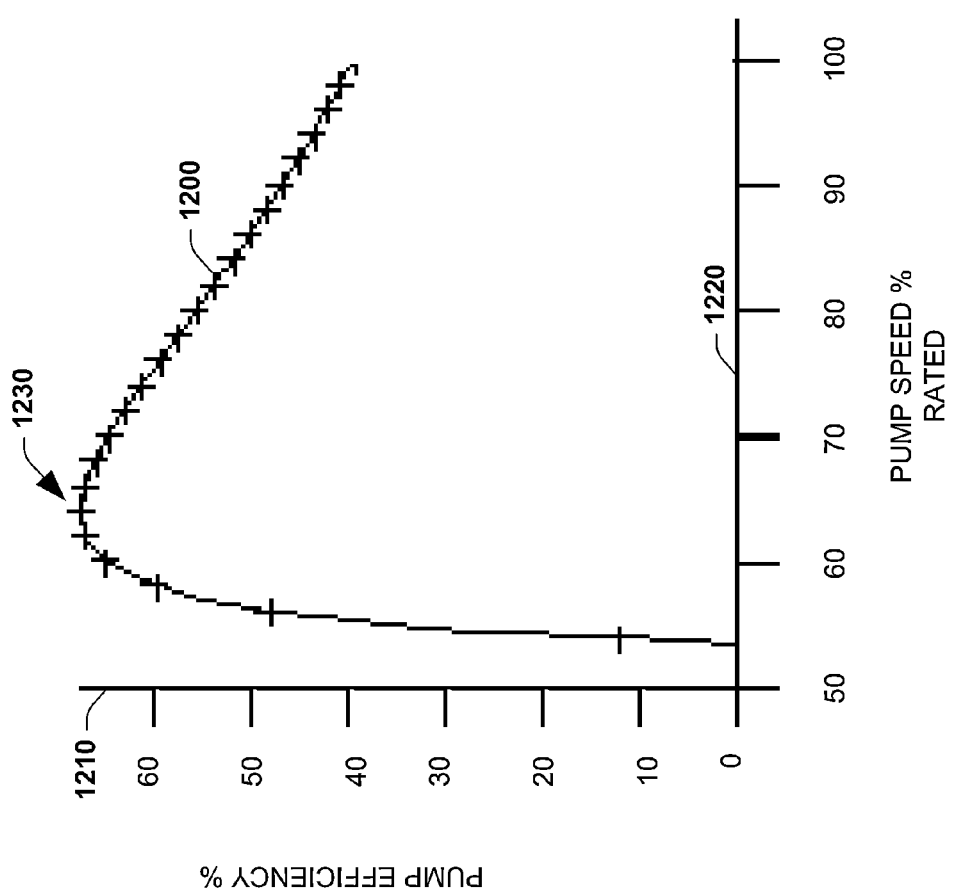
FIG. 12 is a plot showing an exemplary pump efficiency curve.
Figure 13:
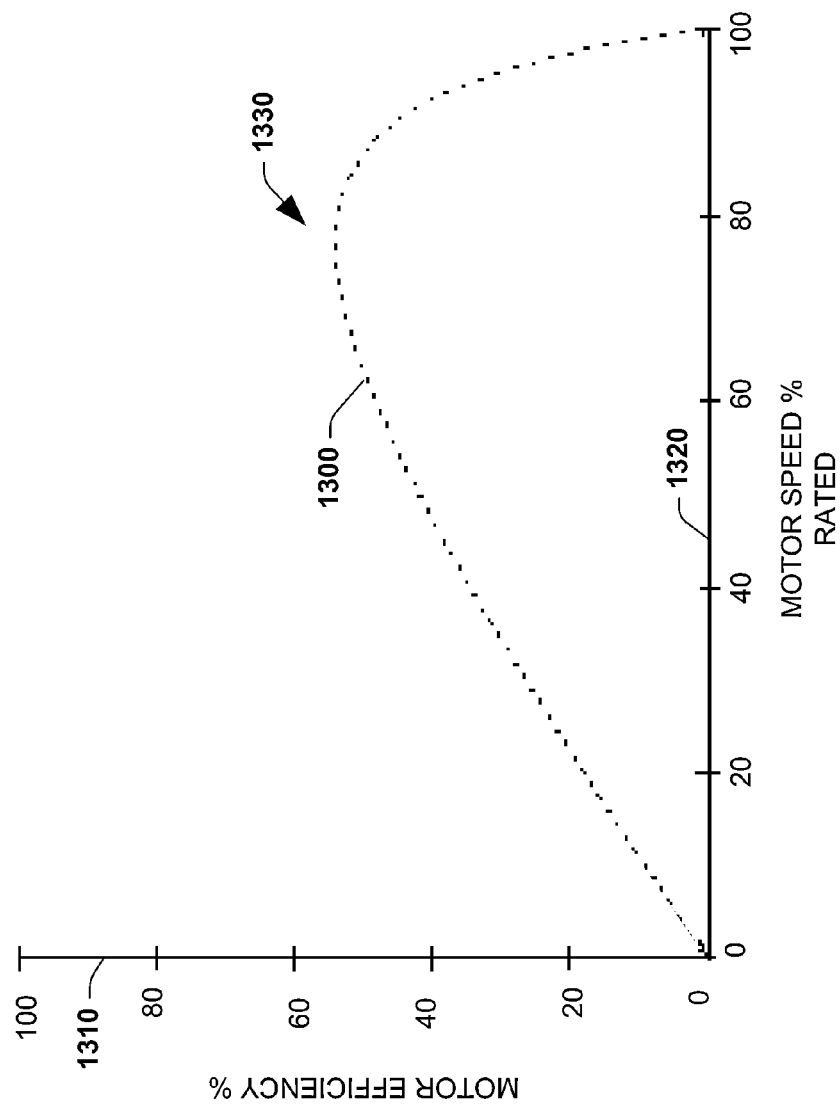
FIG. 13 is a plot showing an exemplary motor efficiency curve.
Figure 14:
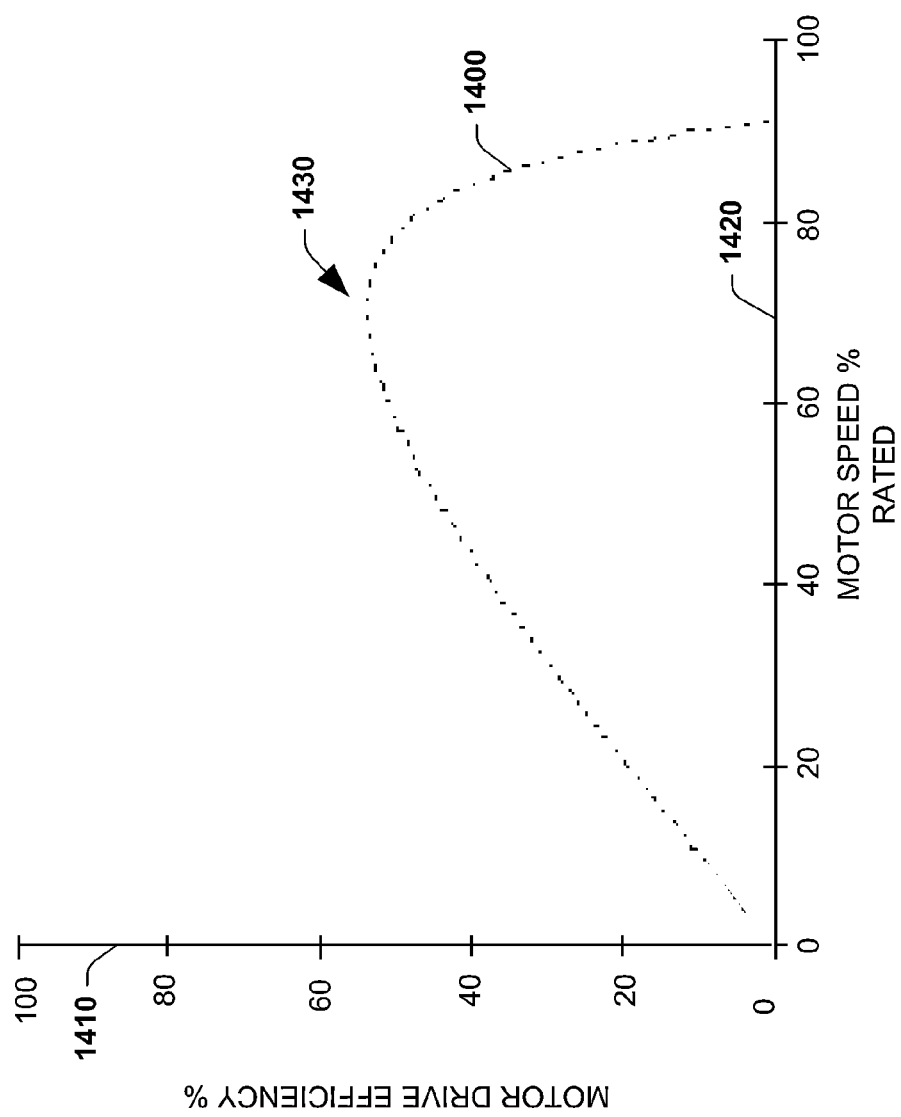
FIG. 14 is a plot showing an exemplary motor drive efficiency curve.

FIGS. 12-14 illustrate examples of component performance characteristic information, which may be correlated (e.g., via the correlation engine 1110) in order to select the desired operating point for the system 902. FIG. 12 illustrates a plot of an exemplary pump efficiency curve 1200 (e.g., related to pump 904), plotted as efficiency 1210 (e.g., output power/input power) versus pump speed 1220. The exemplary curve 1200 comprises a best operating point 1230, whereat the pump efficiency is optimal at approximately 62% of maximum rated pump speed. The pump efficiency information 1100 of the optimization component 970 may comprise one or more such curves, for example, wherein different curves exist for different flow rates, pressures, temperatures, viscosity of pumped fluid, etc. Similarly, FIG. 13 illustrates a plot of an exemplary motor efficiency curve 1300 (e.g., related to motor 906), plotted as efficiency 1310 (e.g., output power/input power) versus motor speed 1320. The exemplary curve 1300 comprises a best operating point 1330, whereat the motor efficiency is optimal at approximately 77% of maximum rated speed.

It will be appreciated from the curves 1200 and 1300 of FIGS. 12 and 13, respectively, that the optimal efficiency operating points for individual components (e.g., pump 904 and motor 906) of the system 902, or of typical motorized systems generally, may not, and seldom do, coincide. The pump efficiency information 1100 of the optimization component 970 may comprise one or more such curves 1230 of pump efficiency versus speed, for example, wherein a different curve exists for different flow rates, pressures, viscosity of pumped fluid, motor load, etc. In like fashion, FIG. 14 illustrates a plot of an exemplary motor drive efficiency curve 1400 (e.g., related to the motor drive 960 of system 902), plotted as efficiency 1410 (e.g., output power/input power) versus motor (e.g., pump) speed 1420. The exemplary curve 1400 comprises a best operating point 1430, whereat the motor drive efficiency is optimal at approximately 70% of the rated speed. The motor drive efficiency information 1104 of the optimization component 970 may comprise one or more such curves, for example, wherein a different curve exists for different flow rates, temperatures, torques, pressures, viscosity of pumped fluid, motor load, motor temperature, etc.

Figure 15:
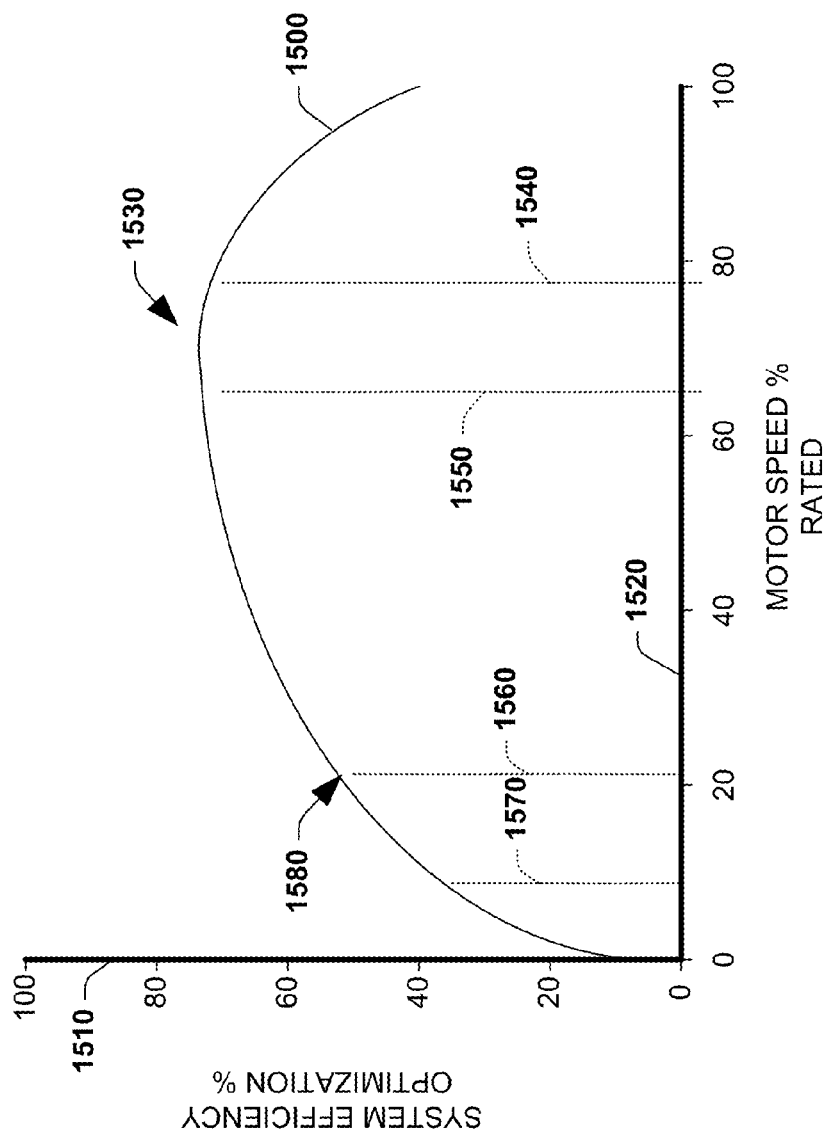
FIG. 15 is a plot showing an exemplary correlated pump system efficiency optimization curve in accordance with the invention.

The correlation engine 1110 of the efficiency optimization component 970 correlates the three curves 1200, 1300, and 1400 in order to derive correlated system efficiency information 1112. Referring now to FIG. 15, the correlation engine may correlate the curves 1200, 1300, and 1400 to derive a correlated system efficiency curve 1500 plotted as system efficiency optimization 1510 versus speed 1520. The exemplary curve 1500 comprises a peak optimization point 1530 at approximately 71% of rated speed. This composite performance characteristic curve 1500 may then be employed by the optimization component 970 in order to select the desired operation point for the system 902, which may be provided to the PID 974 via the optimization signal 972.

As illustrated in FIG. 15, where the allowable operating range includes an upper limit 1540, and a lower limit 1550 (e.g., where these limits 1540 and 1550 are scaled from process units, such as flow in GPM into speed), the optimization component 970 may advantageously select the peak optimization point 1530 at approximately 71% of rated speed, in order to optimize the efficiency within the allowable operating range. In another example, where the allowable upper and lower limits 1560 and 1570 are specified, a local optimum 1580 within that range may be selected as the desired operating point. Many other forms of performance information and correlations thereof are possible within the scope of the present invention, beyond those illustrated and described above with respect to FIGS. 12-15. The preceding discussion described sending a motor speed signal (e.g., signal 964) to the motor drive 960. Alternatively or in combination, other drive parameters (e.g., carrier frequency, control mode, gains, and the like) can be changed, enhanced, modified, etc., in accordance with the invention. This can enable even more efficient operation, for example, by changing the efficiency 1500.

Referring now to FIGS. 16-20, the optimization aspects of the invention may be employed across a plurality of controllers operating various actuators (e.g., valves, switches, and the like) and motorized systems (e.g., pumps, mixers, compressors, conveyors, fans, and the like) in a large process or system 1600, for optimization of one or more performance characteristics for unrelated motorized systems. Such sub-systems may comprise individual controllers, such as valve controllers, motor controllers, as well as associated motors and drives. As illustrated in FIG. 16, an integer number N of such individual motor controllers MC1 through MCN may be networked together via a network 1602, allowing peer-to-peer communication therebetween, wherein MC1 controls a motorized pump PUMP1 via a motor M1 and associated motor drive MD1, and MCN controls a motorized pump PUMPN via a motor MN and associated motor drive MDN. Other controllers, such as valve controller VC1 may be connected to the network 1602, and operative to control a valve VALVE1. It is to be appreciated that that the motor controller may be embedded in the motor drive such that MC1 and MD1 are one component.

The controllers MC1-MCN and VC1 may exchange information relating to process conditions (e.g., flow, pressure, power, efficiency, temperature . . . ), control information (e.g., setpoints, control outputs, alarm conditions, process limits . . . ), and performance characteristic information (e.g., related to life cycle cost information, efficiency information, life expectancy information, safety information, emissions information, operational cost information, MTBF information, noise information, vibration information, production requirements, delivery schedules, and the like). One or more of the individual controllers MC1, MCN, and VC1 may determine desired operating points for the associated sub-systems according to performance characteristic information obtained from other controllers via the network 1602, and/or from sensors associated with the individual sub-systems.

Another possible configuration is illustrated in FIG. 17, wherein a host computer 1704 is connected to the network 1702. The host 1704 may provide centralized operation of the pumps PUMP1 and PUMPN as well as of the valve VALVE1, for example, by providing setpoint information to the associated controllers MC1, MCN, and VC1. Other information may be exchanged between the computer 1704 and the various controllers MC1, MCN, and VC1 in host-to-peer fashion, such as information relating to process conditions, control information, and performance characteristic information, whereby an efficiency optimization component 1706 in the host computer 1704 may determine desired operating points for one or more of the controllers MC1, MCN, and VC1 according to one or more performance characteristics associated with the system 1700. Alternatively or in combination, one or more of the individual controllers MC1, MCN, and VC1 may determine desired operating points for the associated sub-systems according to performance characteristic information obtained from the host computer 1704, from other controllers via the network 1702, and/or from sensors associated with the individual sub-systems.

Referring now to FIG. 18, another process 1500 is illustrated for providing material from first and second tanks TANK1 and TANK2 into a mixing tank TANK3 via pumps PUMP1 and PUMP2 with associated motors, drives and controllers. The material is mixed in TANK3 via a motorized mixer with associated motor M3, drive MD3, and controller MC3. Mixed material is then provided via a motorized pump PUMP3 and control valve VALVE1 to a molding machine 1502 with an associated motor M5, whereafter molded parts exit the machine 1502 via a chute 1504 to a motorized conveyor 1506 controlled by motor M6, which transports the molded parts to a cooler device 1508 having a motorized compressor 1510. The cooled parts are then provided to a second motorized conveyor 1512 whereat a motorized fan facilitates removal of moisture from the parts.

The various motor and valve controllers MC1-MC9 and VC1 associated with the various sub-systems of the process 1500 are networked together via a network 1520 in order to provide peer-to-peer or other types of communications therebetween. One or more of these controllers MC1-MC9 and VC1 may be adapted to correlate performance characteristic information associated with component devices (e.g., motors, drives, valves) in order to determine desired operating points for one, some, or all of the sub-systems in the process 1500 in accordance with the invention.

A host computer 1532, moreover, may be provided on the network 1520, which may comprise an optimization component 1532 operative to determine desired operating points (e.g., as well as setpoints, allowable operating ranges about such setpoints, and the like) for one or more of the sub-systems in the process 1500 according to one or more performance characteristics associated with the process 1500, which may be then communicated to the various controllers MC1-MC9 and VC1 in order to optimize performance of the process 1500 in some aspect (e.g., efficiency, cost, life cycle cost, throughput, efficiency, life expectancy, safety, emissions, operational cost, MTBF, noise, vibration, and the like). Thus, in accordance with the present invention, the process 1500 may be operated to both produce molded parts from raw materials, and at the same time to optimize one or more performance metrics, such as cost per part produced. Operation of the system may be controlled such that prognostic information regarding machinery failure, expected delivery of repair parts, and expected energy costs is considered in defining an optimum operating mode. For example, if the molding machine is predicted to fail in one week, then increased work-in-process inventory may be generated while the needed repair parts are automatically ordered and delivery expedited. Alternatively a more optimum control mode may be to operate the molding machine very slow and slow down other process equipment to maintain a lower production rate but a continuous flow of finished products.

Another aspect of the invention provides a methodology by which a motorized system may be controlled. The methodology comprises selecting a desired operating point within an allowable range of operation about a system setpoint according to performance characteristics associated with one or more components in the system, and controlling the system according to the desired operating point. The selection of the desired operating point may include correlating component performance information associated with one or more components in the system in order to derive correlated system performance information, and selecting the desired operating point as the optimum performance point within the allowable range of operation according to the correlated system performance information. The performance information, setpoint, and/or the allowable operating range may be obtained from a user or another device via a user interface, via a host computer or other controller through a network, via wireless communications, Internet, and/or according to prior operation of the system, such as through trend analysis.

Figure 19:
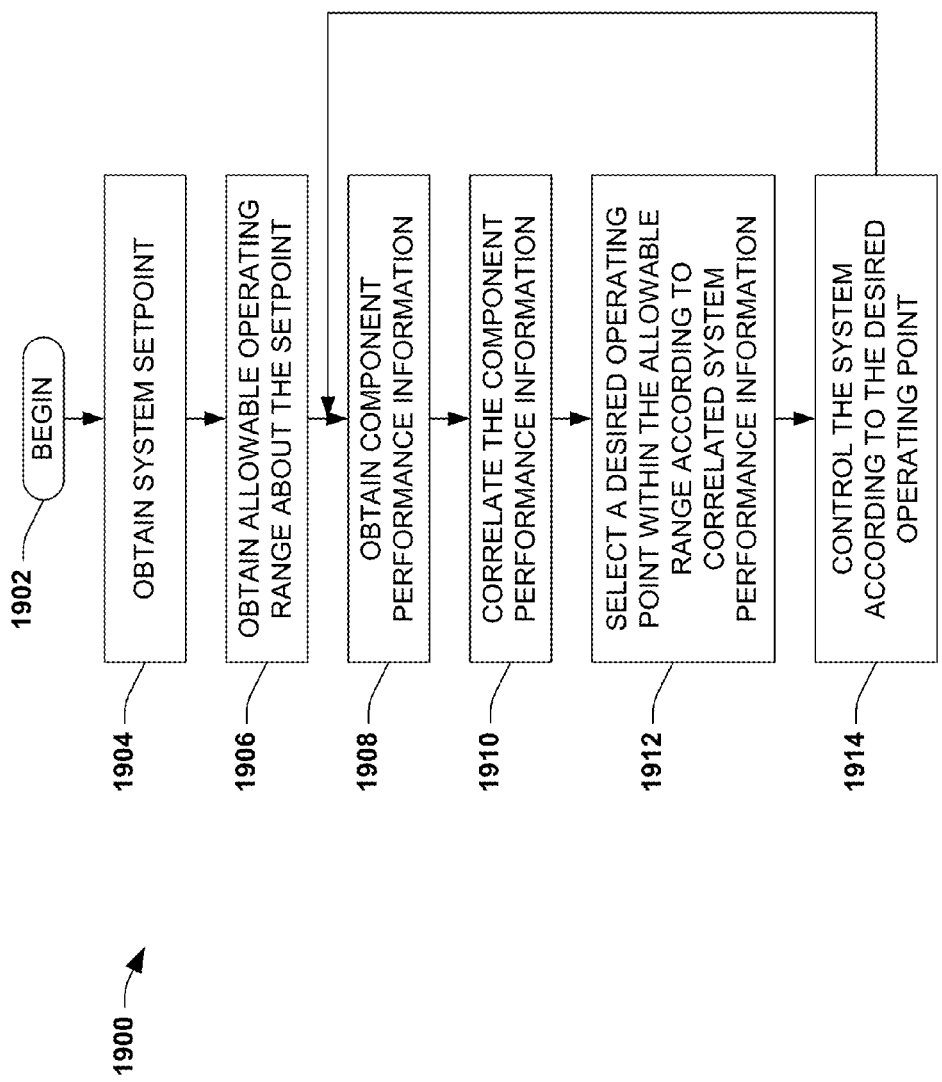
FIG. 19 is a flow diagram illustrating an exemplary method of controlling a motorized pump in accordance with another aspect of the invention.

An exemplary method 1900 is illustrated in FIG. 19 for controlling a motorized system in accordance with this aspect of the invention. While the exemplary method 1900 is illustrated and described herein as a series of blocks representative of various events and/or acts, the present invention is not limited by the illustrated ordering of such blocks. For instance, some acts or events may occur in different order and/or concurrently with other acts or events, apart from the ordering illustrated herein, in accordance with the invention. Moreover, not all illustrated blocks, events, or acts, may be required to implement a methodology in accordance with the present invention. In addition, it will be appreciated that the exemplary method 1900, as well as other methods according to the invention, may be implemented in association with the pumps and systems illustrated and described herein, as well as in association with other motorized systems and apparatus not illustrated or described, including but not limited to fans, conveyor systems, compressors, gear boxes, motion control devices, screw pumps, mixers, as well as hydraulic and pneumatic machines driven by motors or turbo generators.

Beginning at 1902, the method 1900 comprises obtaining a system setpoint at 1904, and obtaining an allowable operating range at 1906. The setpoint and operating range may be obtained at 1904 and 1906 from a user or a device such as a controller, a host computer, or the like, via a user interface, a network, an Internet connection, and/or via wireless communication. At 1908, component performance information is obtained, which may be related to components in the system and/or components in a larger process of which the controlled system is a part. Component performance information may be obtained from vendor data, from e-commerce web sites, from measured historical data, or from simulation and modeling or any combination of this these. The component performance information is then correlated at 1910 in order to derive correlated system performance information. At 1912, a desired operating point is selected in the allowable operating range, according to the correlated system performance information derived at 1910. The system is then controlled at 1914 according to the desired operating point, whereafter the method 1900 returns to 1908 as described above. Process changes, disturbances, updated prognostic information, revised energy costs, and other information may require periodic evaluation and appropriate control adjustment in order to ensure meeting optimum performance levels as the process changes (e.g., tanks empty, temperature changes, or the like) and optimizing asset utilization.

Another aspect of the invention provides for controlling a motorized system, such as a pump, wherein a controller operatively associated with the system includes a diagnostic component to diagnose an operating condition associated with the pump. The operating conditions detected by the diagnostic component may include motor, motor drive, or pump faults, pump cavitation, pipe breakage or blockage, broken impeller blades, failing bearings, failure and/or degradation in one or more system components, sensors, or incoming power, and the like. The controller provides a control signal to the system motor drive according to a setpoint and a diagnostic signal from the diagnostic component according to the diagnosed operating condition in the pump. The diagnostic component may perform signature analysis of signals from one or more sensors associated with the pump or motorized system, in order to diagnose the operating condition. Thus, for example, signal processing may be performed in order to ascertain wear, failure, or other deleterious effects on system performance, whereby the control of the system may be modified in order to prevent further degradation, extend the remaining service life of one or more system components, or to prevent unnecessary stress to other system components. In this regard, the diagnostic component may process signals related to flow, pressure, current, noise, vibration, temperature, and/or other parameters of metrics associated with the motorized system. Such a system will be able to effectively control the remaining useful life of the motorized system.

Figure 20:
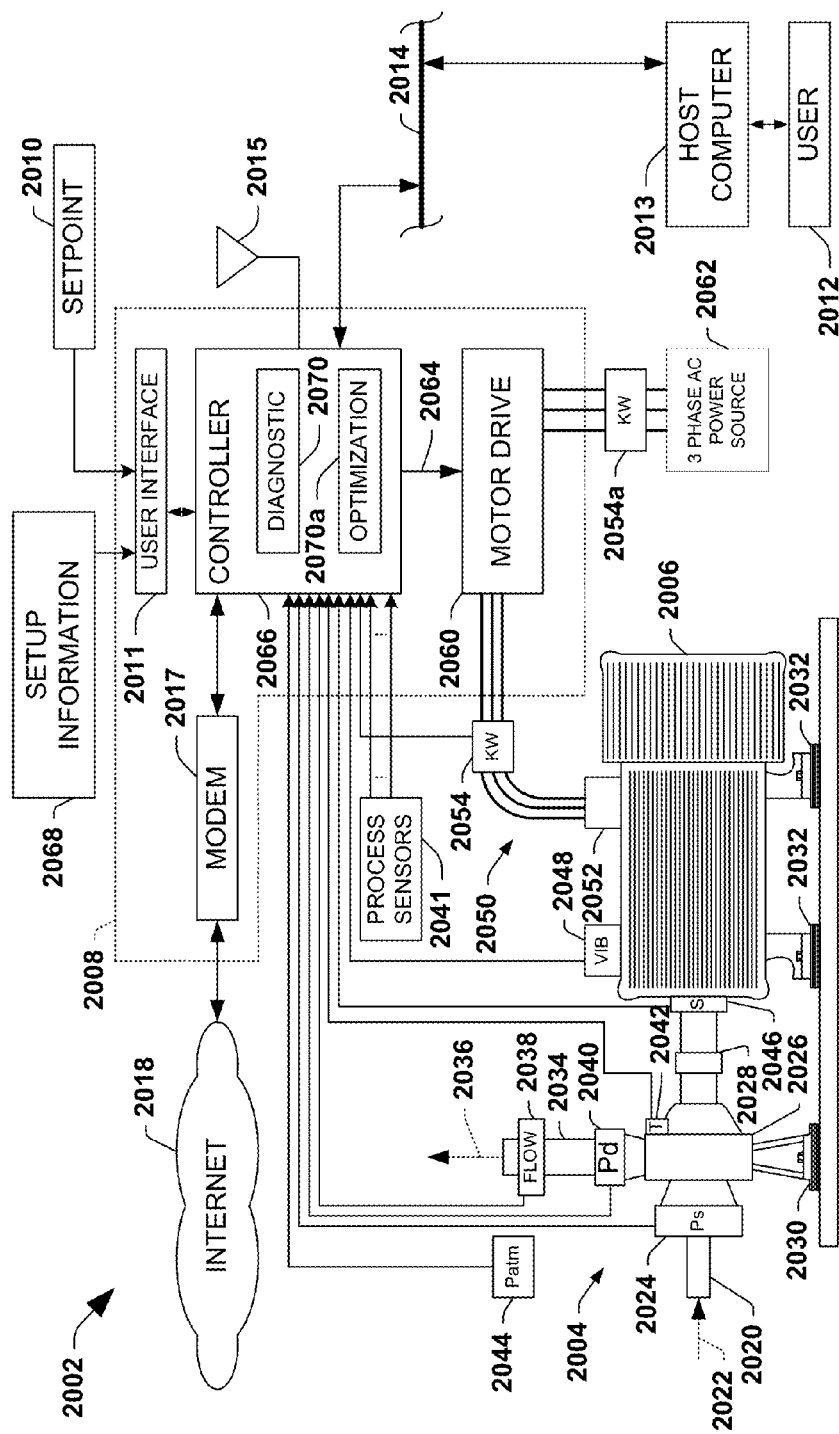
FIG. 20 is a side elevation view illustrating another exemplary motorized pump system and a control system therefore with a diagnostic component in accordance with another aspect of the invention.

Referring now to FIG. 20, another exemplary pump system 2002 is illustrated, in which one or more aspects of the invention may be carried out. The system 2002 includes a pump 2004, a three phase electric motor 2006, and a control system 2008 for operating the system 2002 in accordance with a setpoint 2010. While the exemplary motor 2006 is illustrated and described herein as a polyphase synchronous electric motor, the various aspects of the present invention may be employed in association with single-phase motors as well as with DC and other types of motors. In addition, the pump 2004 may comprise a centrifugal type pump, however, the invention finds application in association with other pump types not illustrated herein, for example, positive displacement pumps. Additionally other motor-driven equipment such as centrifugal compressors, reciprocating compressors, fans, motor-operated valves and other motor driven equipment can be operated with a controller in a dynamic environment.

The control system 2008 operates the pump 2004 via the motor 2006 according to the setpoint 2010 and one or more measured process variables, in order to maintain operation of the system 2002 commensurate with the setpoint 2010 and within the allowable process operating ranges specified in setup information 2068, supplied to the control system 2008 via a user interface 2011. For example, it may be desired to provide a constant fluid flow, wherein the value of the setpoint 2010 is a desired flow rate in gallons per minute (GPM) or other engineering units. The setup information 2068, moreover, may comprise an allowable range of operation about the setpoint 2010 (e.g., expressed in GPM, percentage of process variable span, or other units), wherein the control system 2008 may operate the system 2002 at an operating point within the allowable range.

Alternatively or in combination, setup information, setpoints, and other information may be provided to the control system 2008 by a user 2012 via a host computer 2013 operatively connected to a network 2014, and/or by wireless communications via a transceiver 2015. Such information may be provided via the network 2014 and/or the wireless communications transceiver 2015 from a host computer (e.g., computer 2013) and/or from other controllers (e.g., PLCs, not shown) in a larger process, wherein the setpoint 2010, and/or setup information are provided to the control system 2008, as illustrated and described in greater detail hereinafter. The control system 2008, moreover, may include a modem 2017 allowing communication with other devices and/or users via a global communications network, such as the Internet 2018.

The pump 2004 comprises an inlet opening 2020 through which fluid is provided to the pump 2004 in the direction of arrow 2022 as well as a suction pressure sensor 2024, which senses the inlet or suction pressure at the inlet 2020 and provides a corresponding suction pressure signal to the control system 2008. Fluid is provided from the inlet 2020 to an impeller housing 2026 including an impeller (not shown), which rotates together with a rotary pump shaft coupled to the motor 2006 via a coupling 2028. The impeller housing 2026 and the motor 2006 are mounted in a fixed relationship with respect to one another via a pump mount 2030, and motor mounts 2032. The impeller with appropriate fin geometry rotates within the housing 2026 so as to create a pressure differential between the inlet 2020 and an outlet 2034 of the pump 2004. This causes fluid from the inlet 2020 to flow out of the pump 2004 via the outlet or discharge tube 2034 in the direction of arrow 2036. The flow rate of fluid through the outlet 2034 is measured by a flow sensor 2038, which provides a flow rate signal to the control system 2008.

In addition, the discharge or outlet pressure is measured by a pressure sensor 2040, which is operatively associated with the outlet 2034 and provides a discharge pressure signal to the control system 2008. It will be noted at this point that although one or more sensors (e.g., suction pressure sensor 2024, discharge pressure sensor 2040, outlet flow sensor 2038, and others) are illustrated in the exemplary system 2002 as being associated with and/or proximate to the pump 2004, that such sensors may be located remote from the pump 2004, and may be associated with other components in a process or system (not shown) in which the pump system 2002 is employed. In this regard, other process sensors 2041 may be connected so as to provide signals to the control system 2008, for example, to indicate upstream or downstream pressures, flows, temperatures, levels, or the like. Alternatively, flow may be approximated rather than measured by utilizing differential pressure information, pump speed, fluid properties, and pump geometry information or a pump model (e.g., CFD model). Alternatively or in combination, inlet and/or discharge pressure values may be estimated according to other sensor signals (e.g., 2041) and pump/process information.

In addition, it will be appreciated that while the motor drive 2060 is illustrated in the control system 2008 as separate from the motor 2006 and from the controller 2066, that some or all of these components may be integrated. Thus, for example, an integrated, intelligent motor may be provided with the motor 2006, the motor drive 2060 and the controller 2066. Furthermore, the motor 2006 and the pump 2004 may be integrated into a single unit (e.g., having a common shaft wherein no coupling 2028 is required), with or without integral control system (e.g., control system 2008, comprising the motor drive 2060 and the controller 2066) in accordance with the invention.

The control system 2008 further receives process variable measurement signals relating to pump temperature via a temperature sensor 2042, atmospheric pressure via a pressure sensor 2044 located proximate the pump 2004, motor (pump) rotational speed via a speed sensor 2046, and vibration via sensor 2048. The motor 2006 provides rotation of the impeller of the pump 2004 according to three-phase alternating current (AC) electrical power provided from the control system via power cables 2050 and a junction box 2052 on the housing of the motor 2006. The power to the pump 2004 may be determined by measuring the current provided to the motor 2006 and computing pump power based on current, speed, and motor model information. This may be measured and computed by a power sensor 2054 or 2054A, which provides a signal related thereto to the control system 2008. Alternatively or in combination, the motor drive 2060 may provide motor torque information to the controller 2066 where pump input power is calculated according to the torque and possibly speed information and motor model information.

The control system 2008 also comprises a motor drive 2060 providing three-phase electric power from an AC power source 2062 to the motor 2006 via the cables 2050 in a controlled fashion (e.g., at a controlled frequency and amplitude) in accordance with a control signal 2064 from a controller 2066. The controller 2066 receives the process variable measurement signals from the atmospheric pressure sensor 2044 (2054*a*), the suction pressure sensor 2024, the discharge pressure sensor 2040, the flow sensor 2038, the temperature sensor 2042, the speed sensor 2046, the vibration sensor 2048, the power sensor 2054, and other process sensors 2041, together with the setpoint 2010, and provides the control signal 2064 to the motor drive 2060 in order to operate the pump system 2002 commensurate with the setpoint 2010. In this regard, the controller 2066 may be adapted to control the system 2002 to maintain a desired fluid flow rate, outlet pressure, motor (pump) speed, torque, suction pressure, tank level, or other performance characteristic.

Setup information 2068 may be provided to the controller 2066, which may include operating limits (e.g., min/max speeds, min/max flows, min/max pump power levels, min/max pressures allowed, NPSHR values, and the like), such as are appropriate for a given pump 2004, motor 2006, and piping and process conditions. The controller 2066 comprises a diagnostic component 2070, which is adapted to diagnose one or more operating conditions associated with the pump 2004, the motor 2006, the motor drive 2060, and/or other components of system 2002. In particular the controller 2066 may employ the diagnostic component 2070 to provide the control signal 2064 to the motor drive 2060 according to setpoint 2010 and a diagnostic signal (not shown) from the diagnostic component 2070 according to the diagnosed operating condition in the pump 2004 or system 2002. In this regard, the diagnosed operating condition may comprise motor or pump faults, pump cavitation, or failure and/or degradation in one or more system components. The controller 2066 may further comprise an optimization component 2070*a*, operating in similar fashion to the optimization component 70 illustrated and described above.

The diagnostic component may advantageously perform signature analysis of one or more sensor signals from the sensors 2024, 2038, 2040, 2041, 2042, 2044, 2046, 2048, and/or 2054, associated with the pump 2004 and/or the system 2002 generally, in order to diagnose one or more operating conditions associated therewith. Such signature analysis may thus be performed with respect to power, torque, speed, flow, pressure, and other measured parameters in the system 2004 of in a larger process of which the system 2002 is a part. In addition, the signature analysis may comprise frequency analysis employing Fourier transforms, spectral analysis, space vector amplitude and angular fluctuation, neural networks, data fusion techniques, model-based techniques, discrete Fourier transforms (DFT), Gabor transforms, Wigner-Ville distributions, wavelet decomposition, non-linear filtering based statistical techniques, analysis of time series data using non-linear signal processing tools such as Poincare' maps and Lyapunov spectrum techniques, and other mathematical, statistical, and/or analytical techniques. The diagnostic features of the component 2070, moreover, may be implemented in hardware, software, and/or combinations thereof in the controller 2066.

Such techniques may be used to predict the future state or health of components in the system 2002 (e.g., and/or those of a larger system of which system 2002 is a part or with which system 2002 is associated). This prognostics will enable the control to be altered to redistribute stress, to control the time to failure, and/or the remaining useful life of one or more such components or elements. It will be appreciated that such techniques may be employed in a larger system, such as the system 300 of FIG. 10, for example, wherein a known or believed good component or sub-system may be overstressed to allow another suspected weakened component to last longer.

Figure 21:
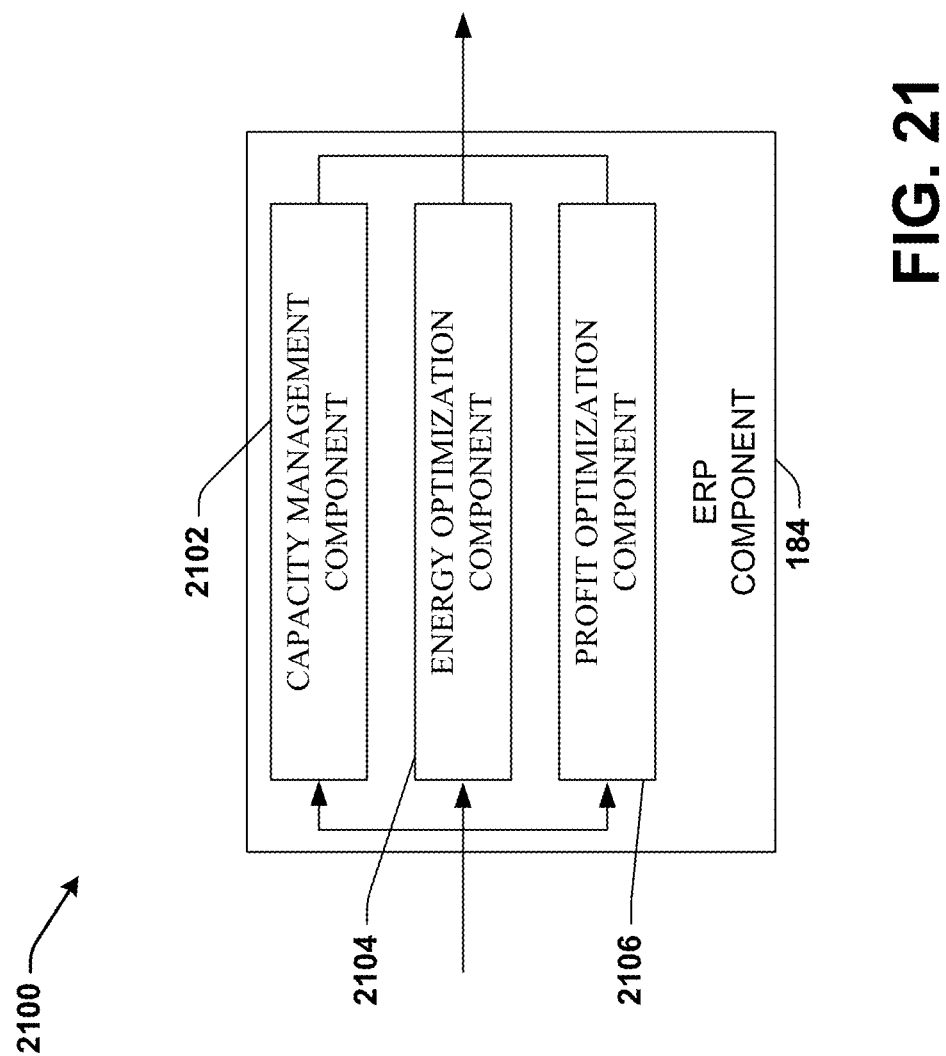
FIG. 21 provides further illustration of an enterprise resource planning component in accordance with an aspect of the claimed subject matter.

FIG. 21 provides further illustration 2100 of enterprise resource planning (ERP) component 184 that, in accordance with aspects of the claimed subject matter, can facilitate and/or effectuate utilization of predictive enterprise manufacturing intelligence (EMI) facilities in order to provide the ability to conceptualize and display current, scheduled, forecasted, potentially possible, hypothetical, and/or predicted process conditions. As illustrated, enterprise resource planning component 184 can include capacity management component 2102, energy optimization component 2104, and profit optimization component 2106. In relation to enterprise resource planning component 184 since much, though not all, of the configuration and operation of this component is substantially similar to that described in relation to FIGS. 1*a*-1*k*, and FIG. 1*k* in particular, a detailed description of such features, unless where necessary, has been omitted for the sake of brevity and to avoid needless prolixity.

Capacity management component 2102 can leverage process models to visually present real-time, dynamic comparisons of a process' theoretical capacity and its current production rate. Capacity management component 2102 can provide timely visibility into potential capacity from existing factors of production (e.g., resources employed to produce goods and/or services) thereby avoiding latency of decisions. Capacity management component 2102 can perform dynamic constraint profiling based at least in part on current and/or predicted operating conditions, and by linking into a corporate business system, can automatically quantify the potential gains of increased capacity as a result of driving production up to prevailing constraints. The potential gains can be further characterized as a probability or likelihood measure of potential economic gain.

Additionally, capacity management component 2102 can contain or utilize a built-in framework for instantaneous analysis of potential scenarios to achieve optimal capacity by product, shift, and/or diverse and disparate production site. This functionality can allow plant facility management the ability to analyze tradeoffs associated with the multiple choices available to achieve optimal production, resulting in faster and more accurate and timely capture of business opportunities from improved decision making.

As those reasonably cognizant in this field of endeavor will no doubt be aware, today production analysis is typically based on historical data and user-defined spreadsheets. In some cases, data mining tools can be employed in conjunction with real-time or near-real time data from control infrastructure, yet this technique is inherently retrospective and its value is limited to understanding what happened. In contrast, capacity management component 2102, in conjunction with various aspects of enterprise resource planning component 184, leverages predictive technologies and integrates financial variables with high fidelity models that can be utilized to control processes, to provide users the ability to understand the economic value of opportunities as these unfold, and the ability to capture profitable opportunities or shed non-profitable opportunities proactively and with a greater degree of confidence.

Moreover, as those of reasonable skill in this field of endeavor will be equally aware, production facilities can make significant investments in capital improvement projects, aiming to streamline production and identifying and resolving bottlenecks in manufacturing units using anecdotal evidence based at least in part on a plant or production facility's historical performance. Often, for example, a major capital asset is replaced with the expectation that the removal of this prevailing constraint will result in production improvements, only to learn that the achieved improvement is of minimal or marginal benefit because the available capacity to the next constraint is miniscule. Capacity management component 2102, in concert with and through utilization of the disparate and various capabilities associated with enterprise resource planning component 184, can automatically determine or identify a facility's top constraints (e.g., top 5, 10, 20, . . . , constraints) and quantifies the latent capacity available across these identified constraints, providing operations management with financial profiles of production opportunities restricted by these constraints. Capacity management component 2102 can thus allow for capital expenditure planning with a greater degree of confidence, having a thorough understanding of the potential economic improvements associated with de-bottlenecking projects.

Energy optimization component 2104 in order to present visualizations of economic optima that meet a plant or production facility's predicted energy demand can, together with modeling frameworks and disparate predictive capabilities, utilize multiple sub-models of production, utilities, and emissions integrated with a plant or production facility's (or business entities) financial system. Energy optimization component 2104 can create an integrated energy-supply model by incorporating the variable costs associated with an entities business systems, economic sub-models can be constructed for each energy-generating asset at a production facility in order to determine each asset's financial profile, taking into account their generating capacity, efficiency curves, reliability, and operating costs. Each of these asset sub-models can be combined to create a production facility's holistic energy-supply model.

Additionally, energy optimization component 2104 can create the production facility's energy-demand model by leveraging powerful optimization or predictive engines. From the created energy-demand model, sub-models of production can be developed in order to determine, at user defined time horizons, predicted energy demands based at least in part on current and prospective operating objectives. Further, energy optimization component 2104 can integrate the developed energy-supply and energy-demand models to produce an energy optimization model. The integration of the developed energy-supply and energy-demand models can be integrated using a modeling framework to solve economic supply optima and expose the most cost-effective energy-generating assets available to meet predicted demand. For enterprises that operate under green initiatives or corporate sustainability programs, energy optimization component 2104 can, for instance, integrate a model of each asset's emissions thereby ensuring that the economic optimum incorporates the environmental impact associated with meeting the production facility's energy demand. This model can be further expanded to include a probabilistic estimation components, sensitivity analysis components, and adaptive modeling components. The probabilistic component can, for example, maximize the certainty of achieving a level of economic benefit or financial return on an investment. The sensitivy analysis component can identify factors and operating strategies that while showing excellent results, can be brittle and can suffer from the effects of unmodeled disturbances or events that can potentially take place. The adaptive modeling component can continually assess the impact of historical decisions and use this information to generate model structure or parameter changes, to establish causal relationships that can exist in the model, to improve the stochastic measures assigned to outcomes, or to generate additional rules or heuristics for future economic analysis and decision making functions.

It should be noted without limitation or loss of generality that developed or created models can be integrated by energy optimization component 2104 in series, parallel, nested, or in a networked structure to provide the most efficient solution to attain an economic objective. The goal of energy optimization component 2104 is to provide timely visibility into the most cost-effective source of energy to meet the predicted demand from production, while ensuring full environmental compliance. Accordingly, energy optimization component 2104 can contain built-in decision support frameworks for instantaneous analysis of potential scenarios for decision support. Production facilities with available third party sources of energy can thus incorporate the financial parameters (e.g., scheduling production runs during lower cost off peak energy windows, etc.) of their supply contracts to support make vs. buy decisions based at least in part on the production facilities predicted demand. The system can generate a set of potential scenarios and establish their potential benefit. The system can operate in a generative mode and sequentially establish new operating scenarios in a manner that progressively provide increased economic value and return on the investment. Various search and optimization methods such as the gradient search method previously presented can be used. Further, the expected supply, demand, and economic value can be interpreted in the context of a stochastic system. Likelihood estimates can be made based at least in part on historical data or other statistical modeling schemes.

The value of utilizing energy optimization component 2104, previously described, is to meet a production facility's energy demand at the lowest possible cost while achieving production objectives and balancing environmental emissions. As will be appreciated, the high cost of energy has become the number one concern to manufactures across the globe, with no signs of abatement. Understanding the impact of energy usage at production facilities dispersed around the world must necessarily go beyond anecdotal analysis of past performance, and real-time consumption monitoring generally only allows for reactive decision making to curtail the cost of energy. Additionally, manufacturers often find themselves rushing to meet energy demands from production by sourcing energy without full knowledge of the economic impact to the organization's profitability. The environmental effects caused by surges in energy production are also typically known after the fact, risking emissions violations and possibly tarnishing the organization's corporate image with local communities, while the true cost to operations is only known once the financial books close well after the end of the fiscal month.

Through utilization of energy optimization component 2104, and in particular, by leveraging the predictive capabilities of energy optimization component 2104 and integrating financial variables into a modeling framework, energy optimization component 2104 can provide manufacturers with the ability to understand the economic balance between the energy demand necessary to meet production objectives and their production facility's energy supply capability, ensuring a greater degree of confidence in their decisions.

Moreover, by simultaneously profiling the different energy scenarios that can be present by energy optimization component 2104 manufacturers and more particularly production facility managers can proactively determine the most cost-effective asset configurations in order to achieve their production facility's energy demand while achieving production targets and still keeping environmental emissions in check. For instance, energy optimization component 2104 can be employed in campus energy management where visualizations of how many people will be in particular buildings, weather forecasting, etc., can provide rich insights into what future energy consumption will look like. Moreover, models that are developed by, or for, energy optimization component 2104, or for that matter, models constructed by, or for, other aspects of the claimed matter (e.g., capacity management component 2102 or profit optimization component 2106) can be utilized interchangeably by any other component aspect of the claimed matter, and further are dynamic in nature. The energy optimization component 2104 can be augmented with a scenario search component that can generate a series of possible operating scenarios. The resultant likely economic impact and probability of achieving this economic impact can be evaluated. Scenarios can be progressively chosen to exploit or pursue a strategy that provides a more global optimum. In addition to the expected economic benefit, also associated with each scenario is the time and cost required to realize the target scenario and the stability or brittleness of the scenario. For example, a scenario with high economic benefit may be difficult to sustain due to external disturbances or may preclude transitioning to a more optimum scenario with out additional cost, delay, or downtime. Alternatively, the scenario search method can uncover an unlikely scenario that meets all the energy and production constraints in an optimum manner. Such a strategy can involve operating the system in a unique manner that would have not been discovered by traditional production planning methods.

Profit optimization component 2106 can utilize data and information supplied by capacity management component 2102 and/or energy optimization component 2104 as well as data and information from a multiplicity of disparate other sources such as financial variables, quality components, supplier data, historical performance data, and the like. Profit optimization component 2106, based at least in part on the supplied data and information, can thereafter perform margin optimization. For instance, profit optimization component 2106, where the process involves fabricating product X, can employ information related to contracts and product schedules to analyze variable costs (e.g., energy, additives, feedstock costs, . . . ) in order to optimize profitability. It should be noted that profit optimization component 2106 can utilize financial information in a dynamic manner rather than in a static manner, and further can factor inefficiencies of equipment, equipment life-cycle, down-time, repair, retooling, labor cost, and the like. Profit optimization component 2106, like capacity management component 2102 and energy optimization component 2104, can leverage predictive technologies to optimize profits. Moreover, profit optimization component 2106 can also employ look ahead key performance indicators (KPIs) associated with a process or an enterprise's month-end or year-end goals to maximize profits. Additionally, profit optimization component 2106 can analyze historical opportunity costs as well as profit velocity (e.g., how fast a certain profit can be made and how soon it can be made) in order to learn how to drive future decision making. Furthermore, profit optimization component 2106 can also include a currency arbitrage feature that can be utilized to optimize profitability. In exercising this currency arbitrage feature, profit optimization component 2106 can consider the costs of goods and/or services available based at least in part on different world currencies, locations of availability, shipment costs, production scenarios, and the like. Furthermore, profit optimization component 2106 can include a variety financial models including option pricing models that consider making a relatively small near-term investment that provides the option of making a more substantial investment for economic benefit sometime in the future when more information is known or there is greater certainty of achieving the target return on the investment. The profit optimization component 2106 also includes a stochastic model of the operating scenario and external economic factors such as interest rate, labor rates, cost of capital, including international economic factors that will influence business. Other factors such as variability in demand and machinery reliability such as probability of failure in a given time period given a particular equipment loading rate and maintenance activity. This can permit balancing risk-benefit conditions to match the operating and investment strategy of the organization.

Figure 22:
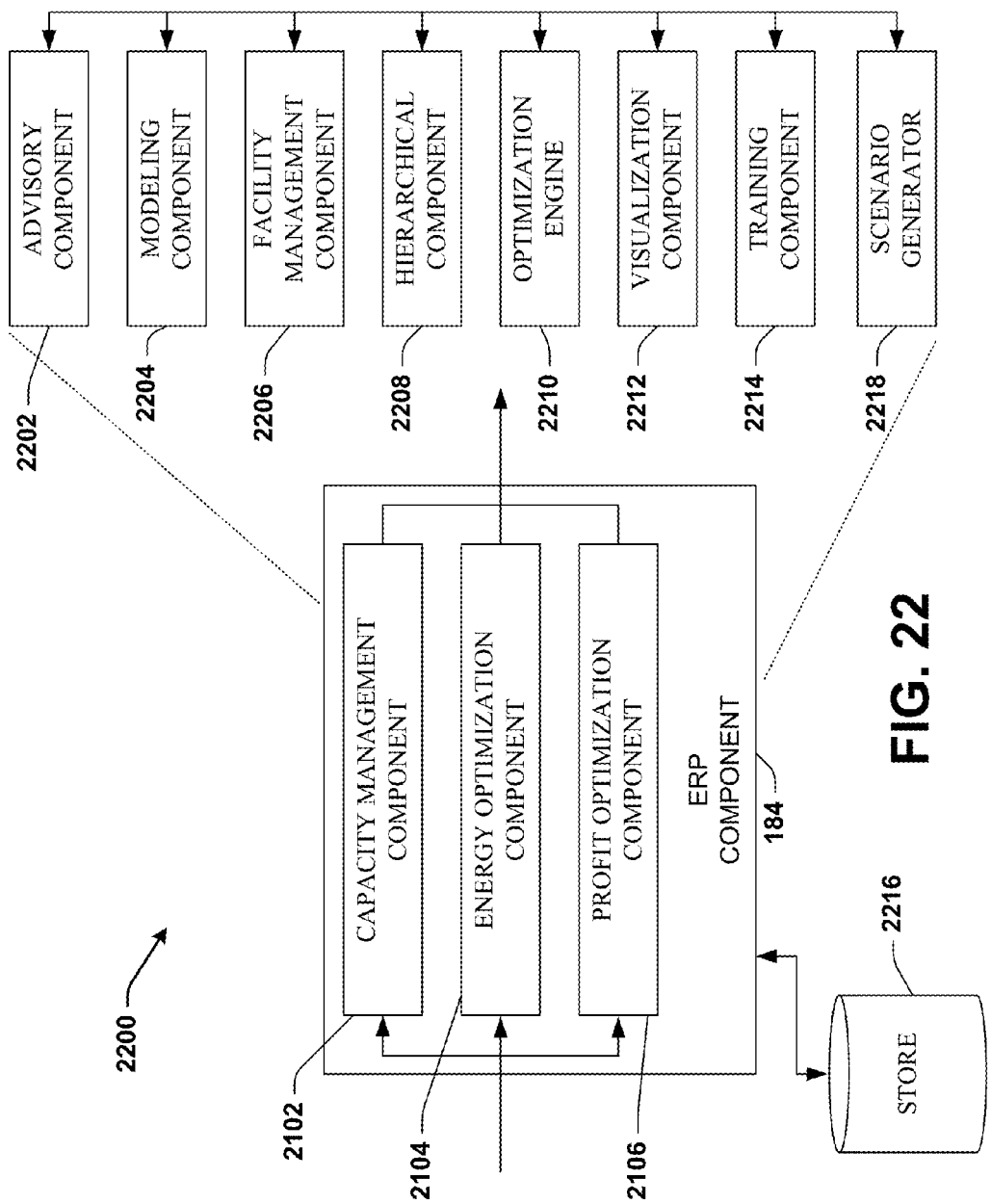
FIG. 22 provides yet further illustration of an enterprise resource planning component in accordance with various aspects of the claimed subject matter.

Turning now to FIG. 22 which further illustrates 2200 the various and disparate aspects and components that can be used in conjunction with capacity management component 2102, energy optimization component 2104, and/or profit optimization component 2106, and that are integral aspects of enterprise resource planning (ERP) component 184. As illustrated enterprise resource planning component 184 can include advisory component 2202 that can utilize a decision-support framework, such as prognostics engine 110 or optimization engine 2210 (described infra), interpolated data as a function of historical data as well as knowledge of dynamics of a system or process (e.g., model of a system or process) to create optimization visualizations. Advisory component 2202 can tie in financial information, production schedules, and the like, to quantify an enterprise manufacturing intelligence (EMI) system. Moreover, advisory component 2202 can employ drag-and-drop capability/flexibility to handle "what if" scenarios. In this manner, advisory component 2202 can be utilized by plant facility management to optimize production processes, and through facilities provided by visualization component 2212 (discussed infra) such information or input from advisory component 2202 can be used to provide visualizations of production processes. It should be noted, that advisory component 2202 can dynamically create an information model, and/or concurrently create a corresponding visualization.

Modeling component 2204 can also be included in enterprise resource planning (ERP) component 184. Modeling component 2204 can be utilized to build models or sub-models of demand and/or supply, for example, and associated sources or sinks of such demand and/or supply. Creation of such demand and/or supply models or sub-models can include utilization of cost and efficiency attributes, and the like, and can also include integrating demand models with supply models. Moreover, demand and/or supply models or sub-models can also be based on historical customer orders, order size, order accuracy (e.g., to minimize production overruns), order changes, etc. The developed or created models or sub-models can be employed to set inventory targets that can in turn drive or leverage capacity to meet demand which in turn can drive inventory management, ordering of factors of production, working capital optimization, and the like. Additionally, modeling component 2204 can also construct and utilize stochastic models that can assess the probability of achieving a stated economic return and/or one or more optimal operating strategy that satisfy all or some of the input constraints employed to develop the model.

As illustrated, enterprise resource planning (ERP) component 184 can also include facility management component 2206 which can be utilized to identify areas in a production process where inefficiencies are extant and methodologies and/or actions that can be utilized to resolve such inefficiencies. In order to facilitate its goals, facility management component 2206 can employ the predictive capabilities of prognostics engine 110 and/or optimization engine 2210 to tune the production process to lower costs and to increase profitability. The predictive values generated can optionally include associated probabilistic values such as for example, the likelihood of achieving the value and the probability of staying at the predicted value for a specified time period.

Moreover, enterprise resource planning (ERP) component 184 can include hierarchical component 2208 that can use multi-variant modeling and data mining to create hierarchical structures of a model of the production process. The hierarchical structures generated by hierarchical component 2208 can include or associate an organizational layer on top of the multi-variant model. For instance, multiple lines in a production facility can benefit from advanced process control (APC) from a model on one particular kiln or the like, and the model can be ported as a type or class and can thereafter be ported to numerous and disparate lines of production. It should be noted in this context, that Bayesian types of models can be adapted based at least in part on specific use rather than building models from scratch each time, and that utilization of such a unified model allows for plant or production process design in a manner analogous to the object oriented programming paradigm. Moreover, it should be further noted that hierarchical component 2208 can also create business system types of models. It should also be noted that the models can also include a suite of coupled sub-models that can be based on analytic approximations of the production sub-processes. Alternatively or in addition to the analytic models, production processes can be modeled as causal models and key performance values extracted from the causal or hybrid production models. The production processes can also be described by other model-free estimators such as artificial neural networks or a combination of model-based and model-free estimators.

In the context of modeling component 2204, facility management component 2206, and/or hierarchical component 2208, the value of predictive enterprise manufacturing intelligence (EMI) is typically a function of the model abstraction, and/or the plug-and-play nature of the models. Accordingly, utilization of the claimed subject matter can provide very sophisticated and unique "what if" situations that can be used to "sandbox" or prototype various production scenarios in order to maximize profits and minimize waste. A wide range of "what if" scenarios can be generated and evaluated according to a cost function or economic valuation method. Other generative and search methods such as genetic algorithms may be used to search the space of feasible scenarios to identify an optimal production scenario.

In accordance with an aspect of the claimed subject matter modeling component 2204, facility management component 2206, and/or hierarchical component 2208 can develop and employ principal component type models (e.g., models running without any inputs—the model runs and evolves over time). Such principle component type models can provide estimations of attributes that typically cannot be measured with ease and further can provide an understanding of how situations can evolve. Scenario generation and evolution can be described using a state transition model. Values can be assigned to each state corresponding to the expected return from operating in that particular production condition. State transition links can indicate the cost, risk, and probability of transitioning to a neighboring more desirable or less desirable state.

Further, in accordance with further aspects of the claimed subject matter modeling component 2204, facility management component 2206, and/or hierarchical component 2208 can in conjunction or separately utilize global type models. Global type models can be perceived as a type of dynamic modeling for use with the unified production model wherein various attributes of the model can be adjusted dynamically or in real-time. Moreover, in accordance with a further aspect of the claimed subject matter, modeling component 2204, facility management component 2206, and/or hierarchical component 2208 can utilize existing or dynamically created models to dynamically and/or automatically (e.g., recursively and/or iteratively) generate sub-models based at least in part on physical changes to a production process and/or production facility.

The claimed matter therefore can provide a scalable platform that provides for advanced process control, optimization, and/or closed-loop control systems. The matter as claimed therefore can verify and validate existing or dynamically created models that can be implemented online and which can permit a local facility control engineer to interact with the models. Additionally, by incorporating advanced process control (APC) aspects and utilizing financial information with the dynamically created models, the models so generated can allow for cross-platform sharing of sub-models so that various vertical domains can share models (e.g., through utilization of cut and paste modalities) without the necessity of domain expertise in the various areas of production or with the associated models. Furthermore, the disclosed subject matter can build in constraints that prevent invalid models from being built or created. By building rich intelligence into developed or created models, when these models are deployed they can automatically, dynamically, and continuously learn the production process being modeled and in so doing identify interdependencies or correlations to use in connection with future constraints that might arise in a production process. In addition, the claimed and disclosed matter can facilitate or actuate an inventory management aspect wherein production schedules can be employed to determine when and/or whether to order new inventory, or inventory of better or lesser quality. For example, if a production process utilizes a factor of production with ash content, it might be determined through utilization of the claimed matter that the ash content of the input is sub-optimal in which case input with a higher or lower ash content might need to be ordered so that the production process can be rendered optimal. The dynamically created models may run in parallel with the actual production process. Deviations observed between the model and the actual production process can form variances or residuals. The residuals can be analyzed and used to identify problems or faults in the equipment or the process and permit efficient problem detection and diagnosis. The analysis of residuals can also indicate faulty assumptions or gaps in the model. If faults are detected, the dynamic model can be used to define and validate an alternative compensating production process that will mitigate the effect of the failed component or process until corrective action can be taken. Given that suitable reliability and production levels are met, the new production process can then be implemented as an interim solution. Yet another role for the dynamic process model is to provide a basis for defining a new production facility or production process, The model can be used to define a new, superior model that provide improved economic return, less variability, and more robust production operation. Various potential production processes can be generated and evaluated without the constraints imposed due to existing, perhaps outdated, equipment, procedures, materials, and processes.

In a further aspect, enterprise resource planning (ERP) component 184 can include optimization engine 2210 that can be applied beyond processes or control of processes to scheduling and/or economic optimization of processes or production facilities management wherein such scheduling and/or economic optimization can be carried out in real-time. For instance, plant or process scheduling can be carried out in real-time and can be based on current data. As will be appreciated the developed model (e.g., provided by modeling component 2204) can be tightly coupled to live data and as such can be utilized to predict forward as part of the optimization process, marrying closed loop control to key performance indicators.

In facilitating its aims, optimization engine 2210, as well as any other component or aspect associated with enterprise resource planning (ERP) component 184, can utilize genetic algorithms as part of the optimization process or in building models of production processes wherein inputs and/or outputs can be selected as part of building a process type. Further, optimization engine 2210 can determine (e.g., learn) through data analysis what is to be considered as a normal mode of operation. In establishing a norm, optimization component 2210 can utilize a recorded expected behavior and compare it with actual behavior to ascertain what should be considered normal. In such a manner optimization engine 2210 can dynamically and adaptively adjust performance indicators (e.g., key performance indicators (KPIs)) to reflect the reality of a particular production process rather than vague theoretical goals. Additionally, optimization engine 2210 also has the ability to re-use key performance indicators (KPIs) and to obtain information from persisted sources (e.g., persisted or associated with store 2216) as well as acquire data from known data sources which can be leveraged in connection with leveraging non-linear prediction models. The models generated can also have a stochastic measure assigned that can indicate the likelihood or certainty of the model and the probability of achieving the expected production level or economic value.

Moreover, optimization engine 2210 can also be utilized to optimize the loading and unloading of resources. For example, optimization engine 2210 in concert with radio frequency identification (RFID) tags can be utilized to determine how best to load or unload a container with product or raw materials. Similarly, optimization engine 2210 can further be utilized to best utilize empty space (e.g., shop floor space, office space, placement of raw material bins, hazardous material handling, . . . ). These facilities of optimization engine 2210 can be effectuated through use of linear-regression modalities and/or techniques (e.g., traveling salesmen type algorithms).

Further as illustrated in FIG. 22, enterprise resource planning (ERP) component 184 can include visualization component 2212 that provides visualizations of its results (e.g., by way of automatically and/or dynamically in real-time updateable virtual instrumentation projection that allows user interaction). Visualization component 2212 can present information in a new way, providing users the ability to look into the prognosticative future and/or to proactively adjust context. For example, a production facility engineer can reconfigure a production facility (e.g., plant or factory floor) to ensure that end-product output is maximized from every aspect of production. By employing the claimed matter, and in particular, aspects of visualization component 2212, multiple dimensions involved in the production of a final product can be analyzed and negative factors mitigated and positive factors enhanced in order to ensure maximum efficiency and maximum profitability thereby minimizing inefficiencies and loss. For instance, where an alarm should have occurred but never occurred, visualization component 2212, through the facilities of other components and aspects included in enterprise resource planning (ERP) component 184, can provide an adaptive visualization of where the failure occurred. It should be noted in this context that the claimed matter automatically infers an event (e.g., alarm conditions, etc.) based at least in part on real-time input or incoming historical data rather than on human input. Moreover, visualization component 2212 can facilitate or effectuate alarm classifications thereby minimizing the occurrence of cascading alarms and in so doing facilitating a root cause analysis to identify the root cause of the alarm condition. For example, in order to identify the root cause of cascading alarms the modeling structure can be beneficial as a "hierarchical alarm tree" can be developed as a consequence of utilization of modeling component 2204 and can be utilized to prune the "hierarchical alarm tree" to ascertain the root cause of the cascading alarms. The modeling structure can include a causal modeling component and a stochastic modeling component and a state transition component.

Visualization component 2212 further allows production facility engineers or production facility managers the ability, through user adaptable dynamic real-time visualizations, to predictively identify and/or isolate and resolve problem areas before these problem areas manifest themselves in an actual production run. For instance, visualization component 2212 can be utilized to predictively visualize and resolve a production event (or non-event) that will occur in the future (e.g., 2, 12, 24, 36, 48, 128, . . . , hours into a production run). Accordingly, for example, real-time control data (e.g., from one or more industrial controller) can be utilized to automatically populate a predictive information model that can be developed by the claimed matter. The predictive information model so constructed can then be utilized to provide rich visualizations that allows for gleaning information regarding a process or production system across temporal boundaries as well as potential optimization goals. Moreover, the claimed matter can mesh real-time data with hypothetical data in order to provide dynamically adaptive, predictive models. The predicted state or states can have associated with them the probability the future condition or production event will occur and the probability it will occur at a particular time in the future. This can permit taking action such as altering the control, production rate, or equipment configuration to avoid a problematic state or undesirable production event. Visualization component 2212 can include a facility for identifying unusual or "interesting" conditions or events and highlighting these in the presentation to the operator. The criteria for classifying a condition as unusual or "interesting" can be made based at least in part on the expect value or the value of the model-predicted condition. In addition, persistent data and real-time data can be routinely screened using established data mining techniques. Unusual conditions or trends can be identified and presented using visualization component 2212. Data mining techniques such as statistical measures (e.g., principal component analysis), artificial neural networks (e.g., unsupervised Kohonen maps), and search agents (e.g., autonomous agents) can be employed to continually inspect the growing based of production and economic data.

Additionally, enterprise resource planning (ERP) component 184 can include training component 2214 that can utilize previously constructed models to dynamically simulate various outcomes in order to provide a training sandbox wherein apprentice users and/or seasoned professional production facility managers can test various plant and production configurations in order to learn the best ways of optimizing and/or maximizing a production process. Alternatively, training component 2214 can be used to inject serious fault and anomalous conditions to determine the response of the system, the operator response, and the reaction of the system to the operator's response. A sequence of stimulus-response events can be generated and evaluated. Training component 2214 can include an evaluation module that can establish the skill level of the person being trained and identifies areas of strength and weakness. Subsequent training and automatically generated scenarios can be directed at improving the weak areas identified. The training module can optionally include an expert operator module and an expert teacher module. The expert operator module represents the response an expert operator would have for different operating conditions. The expert teacher module assesses the students competencies and provides cues as needed, permits exploratory search and investigation by the student, and at the appropriate time, give the student the correct answer along with an explanation. During training, the trainee's response may be compared to the expert operator modules and the expert teacher module will establish a student model that will guide the teacher module in determining the students competency and establishing a teaching strategy (e.g., immediately correct the student, permit the student to explore the implications of an incorrect decision, provide hints or cues to the student, . . . ) and in carrying out the strategy and evaluating the students progression in learning. The training module can also include integrating real-time data to permit the student to see the result of various decisions on an actual production process.

Store 2216 can also be included with enterprise resource planning component 184. Store 2216 provides the ability to persist trajectories into a historian aspect of the claimed subject matter. The historian aspect of the disclosed and claimed subject matter permits users (e.g., plant facility managers, plant maintenance engineers, etc.) to inform the predictive and optimization aspects of the claimed matter (e.g., optimizer engine 2210 and/or prognostics engine 110) with putative conditions that the user deems necessary to a more efficient and/or streamlined operation, the optimization and/or predictive aspects can thereafter provide models with which the user can interact and interrogate and visualize (e.g., through visualization component 2212) the production process. As depicted store 2216 can include volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM) and Rambus® dynamic RAM (RDRAM). Store 2216 of the subject systems and methods is intended to comprise, without being limited to, these and any other suitable types of memory. In addition, it is to be appreciated that store 2216 can be a server, a database, a hard drive, and the like. Store 2216 can include data in compressed or encoded form and can exist in multiple distributed data stores. Data stores can reside in a computer room, server room, computer-based production machine, programmable logic controller (e.g. PLC), intelligent device, or a smart sensor node and any combination of the above. Data can be accessed virtually as if it was a central database residing in one location.

Additionally, enterprise resource planning component 184 can further include scenario generator 2218 that can automatically and/or dynamically generate and search through a wide range of plausible scenarios and can select one or more optimal operating strategies that can satisfy some or all the input constraints. In facilitating its aims scenario generator 2218 can utilize stochastic models that can assess the probability of achieving stated goals, as well as can consider temporal aspects of plausible scenarios. For example, a high-return scenario that lasts for a very short duration can be inferior to a longer term, more stable scenario that generates a slightly less economic return.

Figure 23:
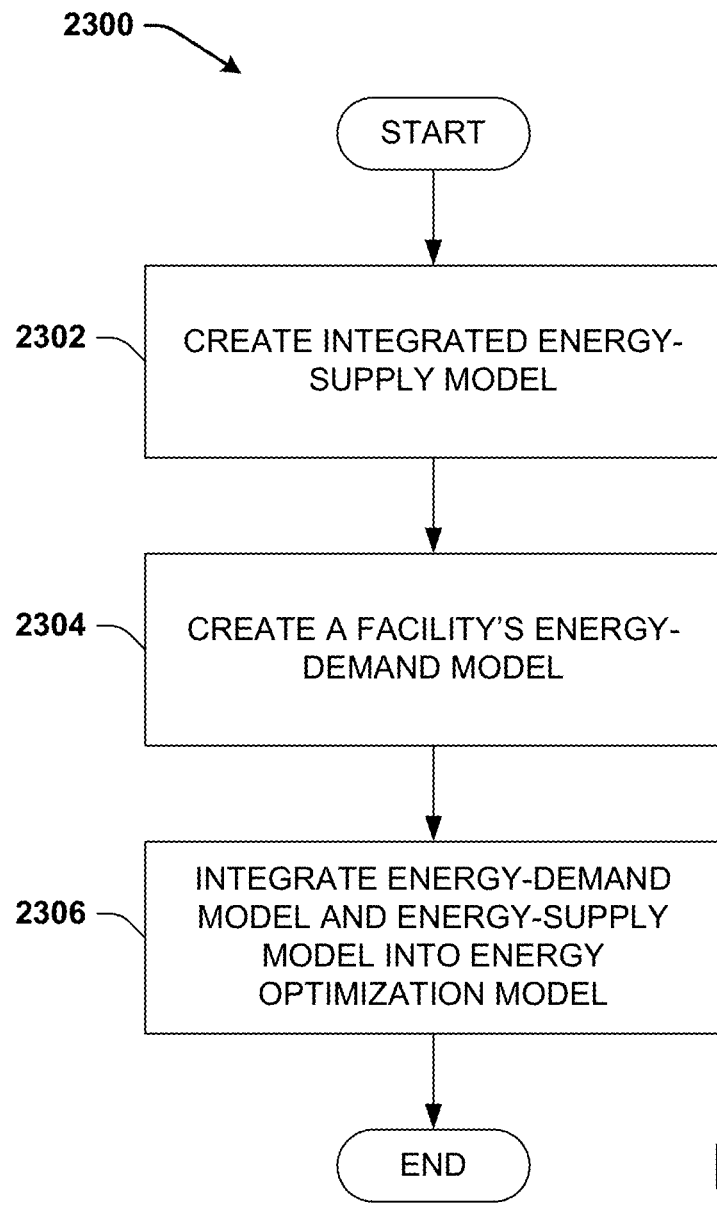
FIG. 23 depicts a method that can be utilized to provide an energy optimization model in accordance with an aspect of the claimed subject matter.

FIG. 23 provides depiction of an illustrative method 2300 that can be utilized to provide an energy optimization model in accordance with an aspect of the claimed subject matter. Method 2300 can commence at 2303 where variable costs associated with an entity's or organization's business system can be utilized to construct economic sub-models for each energy-generating asset at a production facility. The sub-models so built can be employed to determine each asset's financial profile, taking into consideration their respective generating capacity, efficiency curves, and operating costs. Other factors such as reliability, maintenance cost, and life-cycle costs can also be included. Each of these asset sub-models are then combined to create the production facility's energy-supply model. At 2304 the optimization component and/or prognostics engine of the claimed subject matter can be utilized to create a sub-model of production to determine, at a user-defined time horizon, the predicted energy demand based at least in part on current and/or future operating objective. This sub-model can be considered the production facility's energy-demand model. At 2306 the energy demand and supply models can be integrated utilizing the modeling framework of the claimed subject matter to solve for the economic supply optimum and expose the most cost-effective energy-generating asset available to meet predicted demand. This integrated demand and supply model becomes the energy optimization model. The energy demand and supply models can be integrated in series, parallel, nested, or in a networked structure to achieve the most efficient solution for an economic problem. The goal of method 2300 is to provide timely visibility into the most cost-effective source of energy to meet the predicted demand from production, while ensuring full environmental compliance. Other factors such as probability the predicted energy demand profile will exist and the expected variability in this demand, supply equipment reliability, and certainty of providing the target energy levels in the future, the estimated cost in the future to provide the target energy level, the predicted cost of energy, and the estimated cost of energy produced can also be included in the model.

Figure 24:
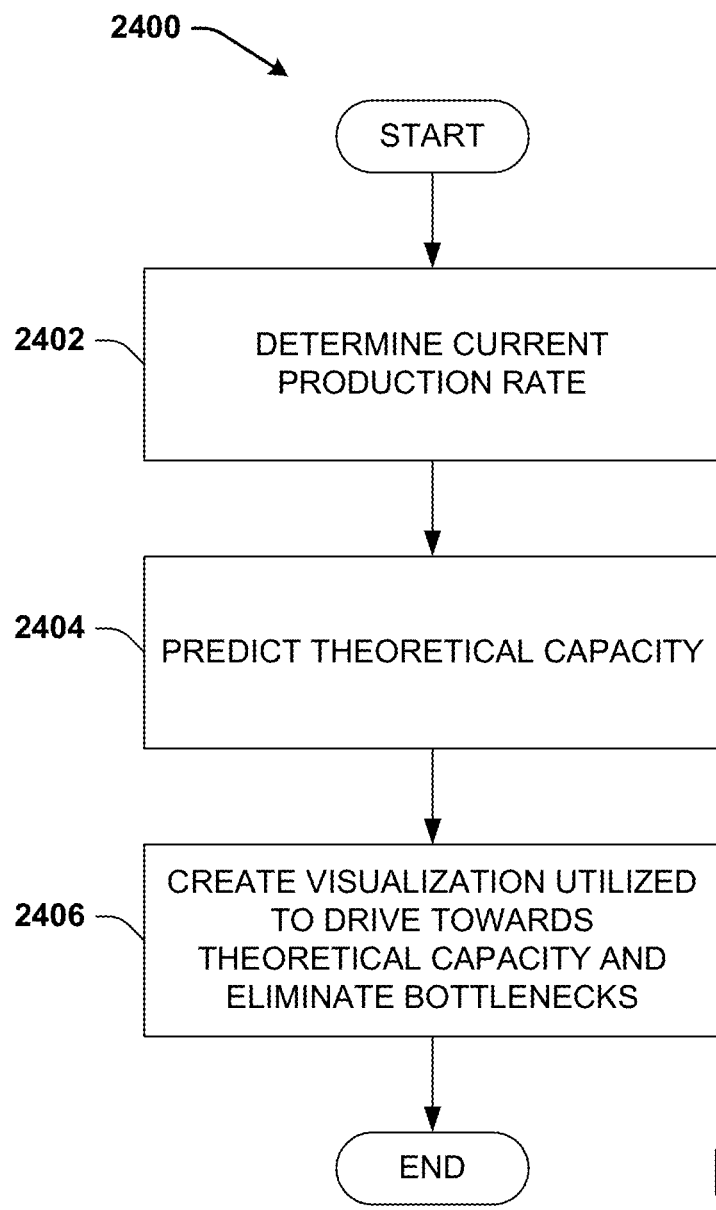
FIG. 24 depicts a method that can be utilized to provide dynamic capacity management in accordance with an aspect of the claimed subject matter

FIG. 24 exemplifies an illustrative method 2400 that can be utilized to provide dynamic capacity management in accordance with an aspect of the claimed subject matter. Method 2400 can commence at 2402 where ascertainment can be made as to the current production rate. At 2404 a prediction (e.g., utilizing the various components associated with enterprise resource planning (ERP) component) can be made. The prediction is the theoretical capacity of a facility's production. At 2406 a visualization can be generated or more specifically projected or rendered onto a display (e.g., computer monitor, and the like). This visualization can then be employed to drive towards the determined theoretical capacity as well as to identify bottlenecks to achieving the theoretic goal. Moreover, the visualization can also be utilized to identify to management historical bottlenecks and facilitate the mitigation of such bottlenecks. As will be appreciated by those of reasonable skill in the art, the visualization can also provide executives or production facility engineers the ability to redesign a system or process in order to optimize the process as well as to make smart financial decisions. The prediction of theoretical capacity in 2404 can also include a cost function that assigns a cost to produce for the various possible production levels. The cost function can include energy, support services, maintenance and reliability costs and other life cycle cost factors. This cost reflects the potential loss of efficiency and increased failure rate when running equipment at or near the theoretical limit. It may indicate that it is not economically prudent to run equipment at the theoretical maximum capacity. An economic optimization model can be used to establish an economically viable maximum capacity that may be less the physical theoretical capacity.

Figure 25:
FIGS. 25-31 illustrates various and disparate user manipulable visual instrumentations that can be rendered by the claimed subject matter
Figure 26:
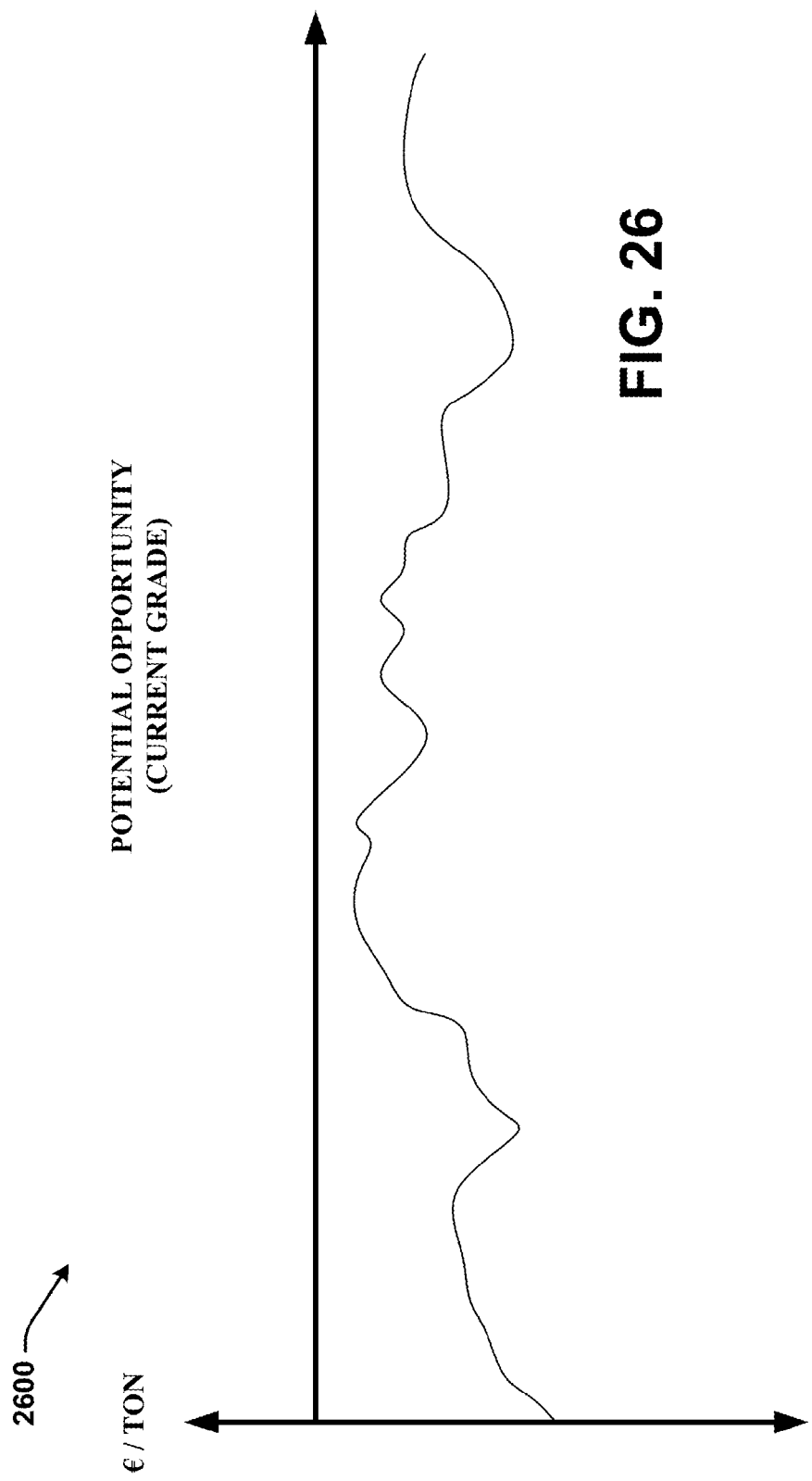
Figure 27:
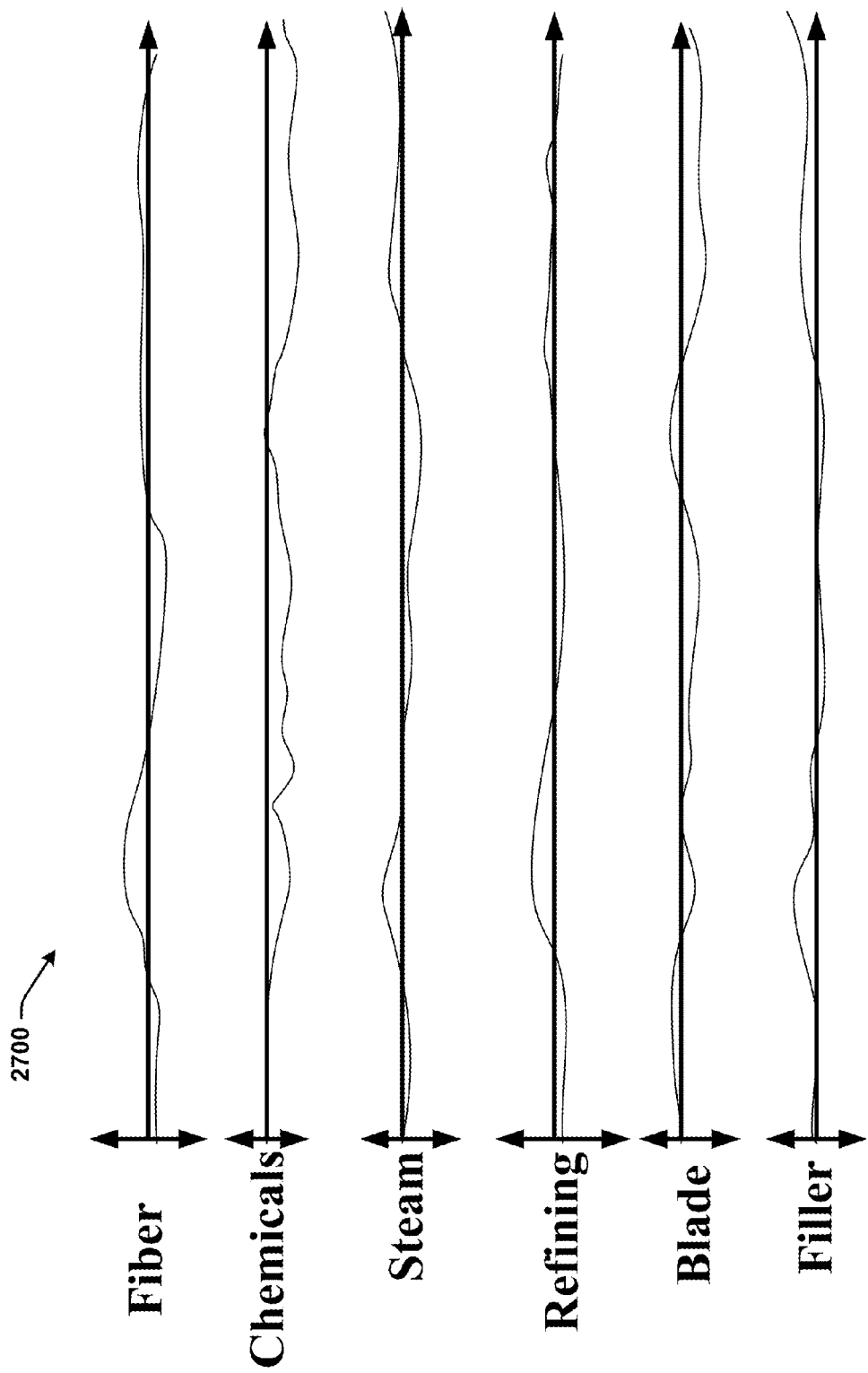
Figure 28:
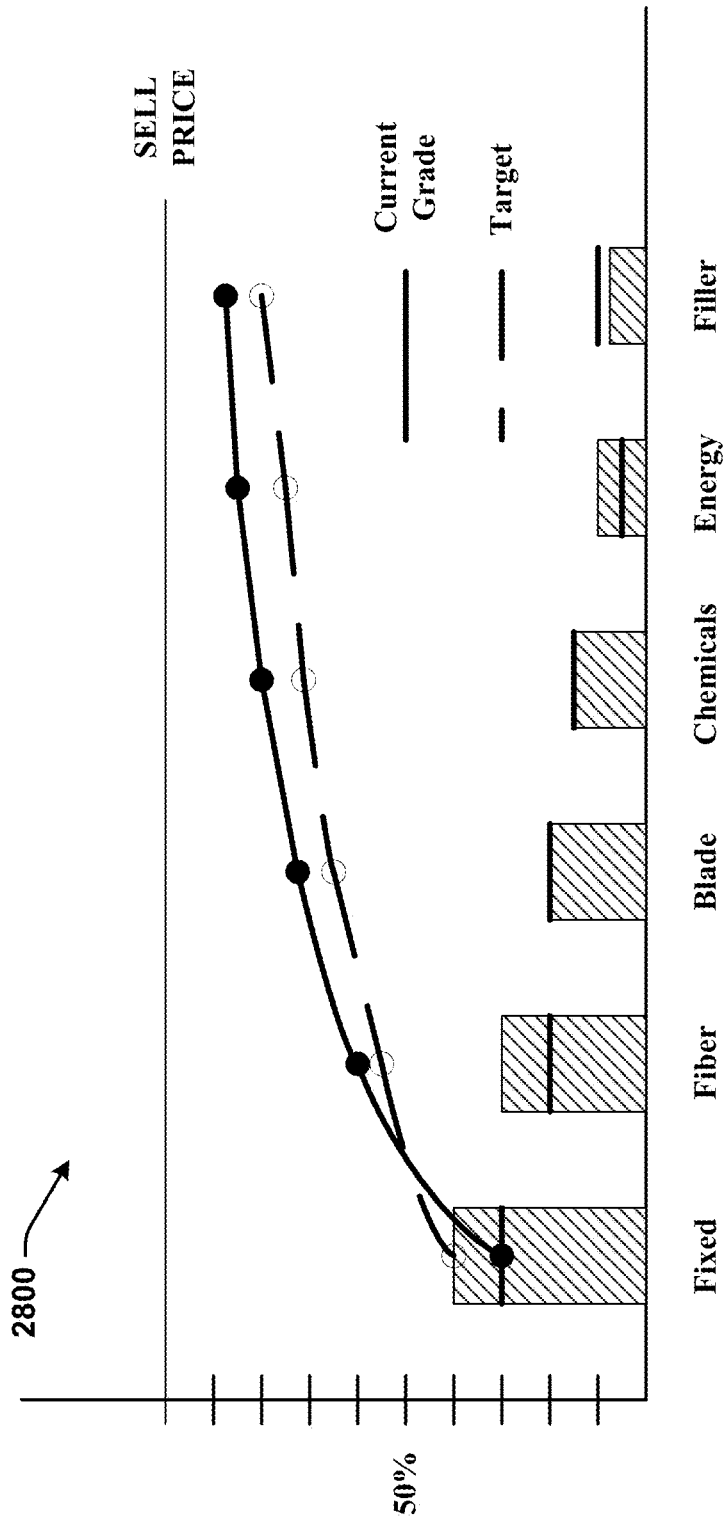
Figure 29:
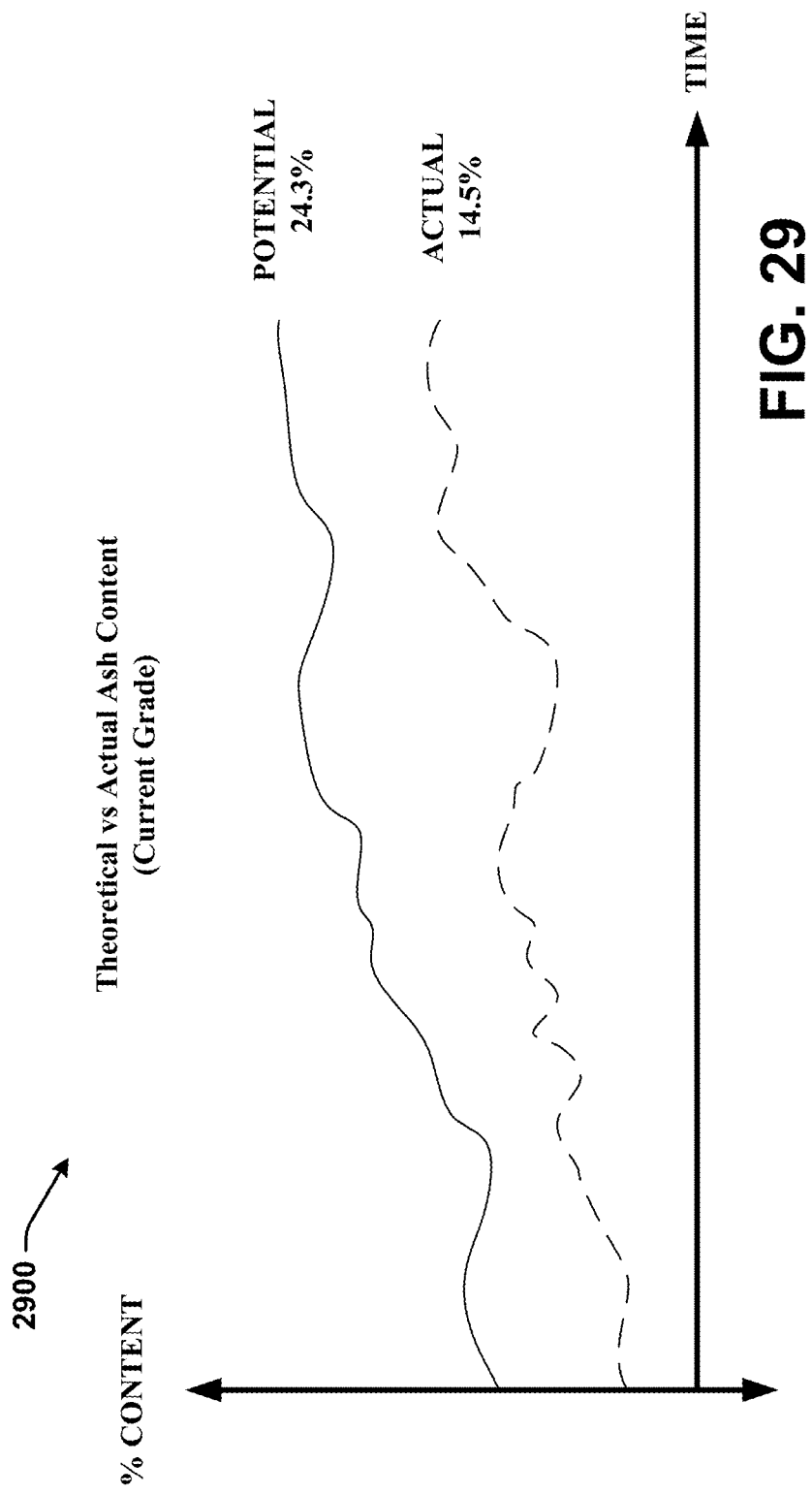
Figure 30:
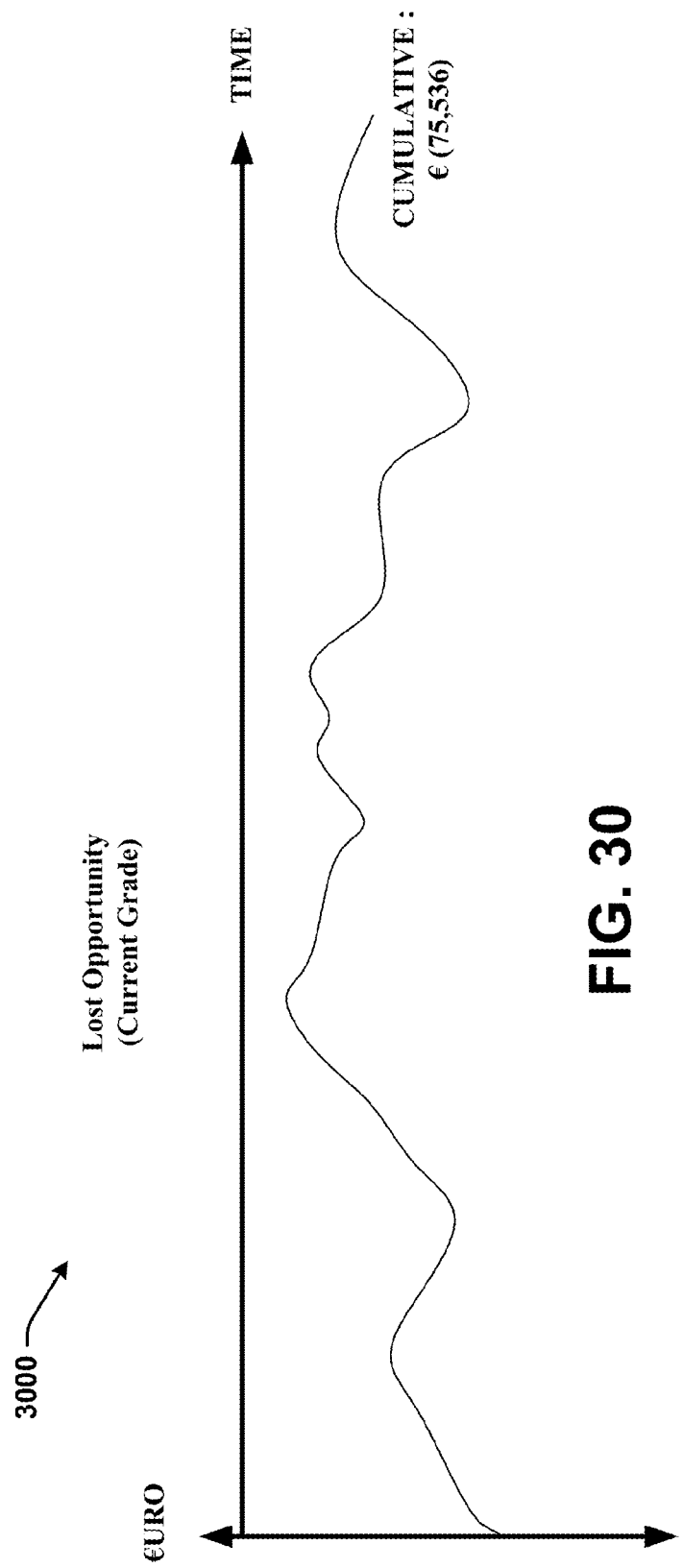
Figure 31:
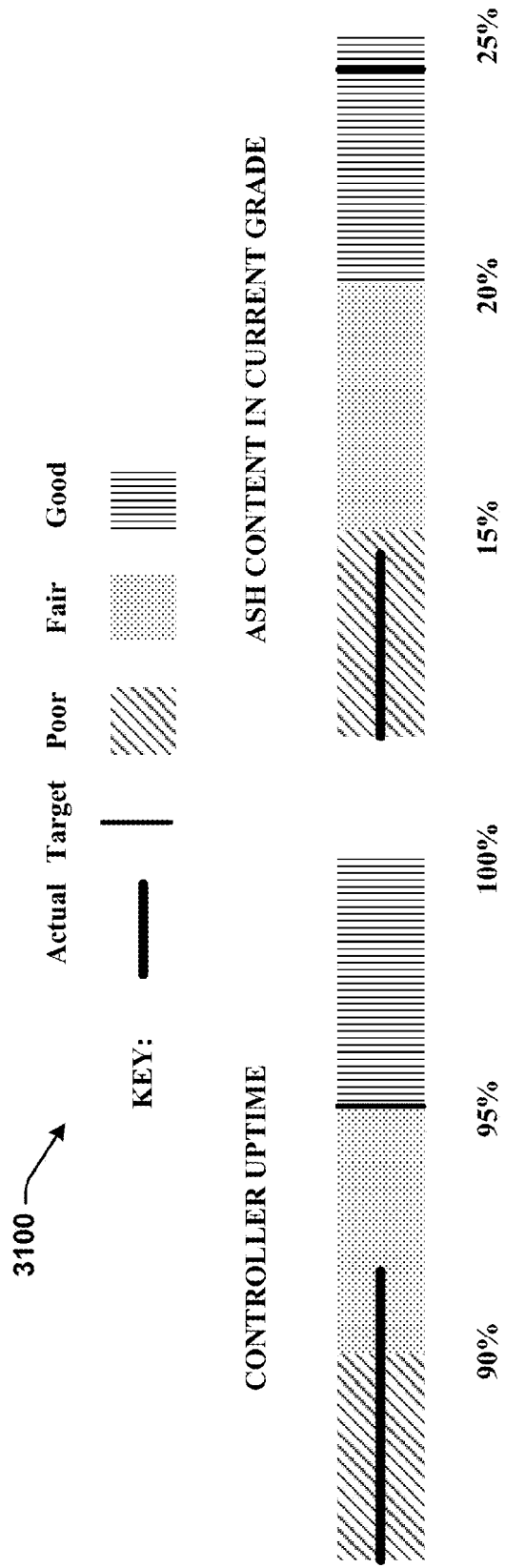

FIGS. 25-31 provide depiction of various illustrative visual instrumentations that can be generated and displayed or rendered on a display device, for example. As will be appreciated by those of ordinary skill, one or all the various and disparate visual instrumentations can be simultaneously generated and/or displayed or rendered on a particular display device. Moreover, it should also be noted that the generated and/or displayed or rendered illustrative visual instrumentation can be subject to direct user interaction (e.g., using tactile manipulation). The displays can include a combination of persistent data, real-time data, computed data, model-generated data, and user-entered data. User input permits exploratory searches and user-driven data analysis and scenario planning. As illustrated FIG. 25 provides a visual instrumentation 2500 that depicts grade profitability over a time horizon (e.g., the x-axis) measured in €uros/ton. Further FIG. 26 provides a further visual instrumentation 2600 that depicts potential opportunity over a time horizon measured in €uros/ton. FIG. 27 provides visual instrumentation 2700 of the actual production costs of various factors of production (e.g., fiber, chemicals, steam, refining, blade, filler, . . . ) measured over a time horizon. FIG. 28 provides depiction of a visual instrumentation 2800 that illustrates various factors of production, the sell price and a comparison between the current grade and a theoretical target. FIG. 29 exemplifies a further visual instrumentation 2900 that illustrates a theoretical vs. actual ash content (a factor of production). Visual instrumentation 2900 provides comparison between the actual content of ash vs. the potential content of ash over a time horizon. FIG. 30 provides another visual instrumentation 3000 that maps lost opportunity costs over time and measure in €uros. FIG. 31 illustrates a further visual implementation that depicts controller uptime and ash content in the current grade. FIG. 31 provides the actual or current quantity, a target goal and categorizations of poor, fair, and good.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts or events of the various methods of the invention.

In addition, while a particular feature of the invention may have been disclosed with respect to only one of several implementations, such feature may be combined with one or more other features of the other implementations as may be desired and advantageous for any given or particular application. As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. Furthermore, to the extent that the terms "includes", "including", "has", "having", and variants thereof are used in either the detailed description or the claims, these terms are intended to be inclusive in a manner similar to the term "comprising."

What is claimed is:

1. An apparatus operable in an industrial automation environment, the apparatus comprising:
   a memory that retains instructions that at least:
      alter profitability data representing a profitability of a production facility based on an alteration of cost data representing a variable cost associated with financial information and product schedules, wherein the cost data is based on a likelihood measure expressed as a probability of a potential economic gain and an optimization, based on an interdependency between a group of elements comprising an energy usage of the production facility, an energy cost incurred by the production facility, a revenue generated by the production facility, a product throughput of the production facility, a machine life cycle cost, and a machine longevity; and
      based on an alteration of the profitability data, project a visual instrumentation associated with a predictive visualization onto a display configured to accept a tactile user input, wherein industrial equipment associated with the production facility is adjusted to alter the profitability data based on tactile manipulation of the predictive visualization through a tactile interaction with the display; and
   a processor, coupled to the memory, configured to facilitate execution of the instructions retained in the memory.

2. The apparatus of claim 1, wherein the visual instrumentation associated with the predictive visualization provides a multi-dimensional manipulable view of at least one of a current capacity of the production facility or a future capacity of the production facility.

3. The apparatus of claim 1, the altering further comprising analyzing at least one of the financial information or the product schedules associated with a corporate entity to mitigate a negative factor associated with the financial information and the product schedules or enhance a positive factor associated with the financial information and the product schedules.

4. The apparatus of claim 1, wherein the predictive visualization facilitates failure analysis and dynamic rectification of identified failures.

5. The apparatus of claim 1, the altering further comprising inferring an event based at least in part on real-time input and historical data received from a non-human knowledge source.

6. The apparatus of claim 1, the altering further comprising generating an event classification utilized to minimize cascading events, and based at least in part on the event classification, identifying a root cause for an occurrence of an event included in the event classifications.

7. The apparatus of claim 6, the generating the event classification further comprising creating a hierarchical event tree.

8. The apparatus of claim 7, the optimizing further comprising pruning the hierarchical event tree to identify the root cause of the cascading events.

9. A method employed in an industrial automation environment, comprising:
adjusting, by a system that includes a processor, profitability data representing a production facility based at least in part on cost data representing variable costs associated with financial information and product schedules, wherein the adjusting includes identifying brittle operating strategies that are consequent on possible future unmodeled events, and wherein the brittle operating strategies are selected as a function of an optimization of an interdependency between an energy usage of the production facility, an energy cost incurred by the production facility, a revenue generated by the production facility, a product throughput of the production facility, a machine life cycle cost, and a machine longevity; and
based at least in part on the adjusting, projecting, by the system, a visual instrumentation associated with a predictive visualization including changing an operation of a motorized pump system included in the production facility as a function of receiving a tactile input relating to the predictive visualization received through a display configured to accept a direct tactile user input.

10. The method of claim 9, wherein the visual instrumentation associated with the predictive visualization provides a multi-dimensional manipulable view of at least one of a current capacity of the production facility or a future capacity of the production facility.

11. The method of claim 9, the adjusting further comprising analyzing at least one of the financial information and the product schedules associated with a corporate entity to mitigate negative factors associated with the financial information and the product schedules or enhance positive factors associated with the financial information and the product schedules.

12. The method of claim 9, wherein the predictive visualization facilitates failure analysis and dynamic rectification of identified failures.

13. The method of claim 9, the adjusting further comprising automatically inferring an event based at least in part on real-time input and historical data received from a non-human knowledge source.

14. The method of claim 9, the adjusting further comprising generating event classifications utilized to minimize cascading events, and based at least in part on the event classifications undertaking root cause analysis to identify a root cause for an occurrence of an event included in the event classifications.

15. The method of claim 14, the generating event classifications further comprising creating a hierarchical event tree.

16. The method of claim 15, the adjusting further comprising pruning the hierarchical event tree to identify the root cause of the cascading events.

17. A system operable in an industrial automation environment, comprising:
a memory that stores computer-executable instructions; and
a processor, communicatively coupled to the memory, configured to facilitate execution of the computer-executable instructions to at least:
modify profitability data representing a production facility based at least in part on cost data representing variable costs associated with financial information and product schedules, wherein the profitability data is modified based on a stochastic model that assesses a probability of achieving an economic return that satisfies input constraints employed in developing the model and a correlation between a group of elements comprising an energy usage of the production facility, an energy cost incurred by the production facility, a revenue generated by the production facility, a product throughput by the production facility, a machine life cycle cost, and a machine longevity; and
based at least in part on the profitability data, project a visual instrumentation associated with a predictive visualization, wherein industrial equipment associated with the production facility is controlled based on tactile input received by the visual instrumentation through a display configured to receive a tactile user input.

18. The system of claim 17, wherein the visual instrumentation associated with the predictive visualization provides a multi-dimensional manipulable view of at least one of a current capacity of the production facility and a future capacity of the production facility.

19. The system of claim 17, wherein the processor is further configured to facilitate the execution of the computer-executable instructions to analyze at least one of the financial information and the product schedules associated with a corporate entity to mitigate negative factors associated with the financial information and the product schedules or enhance positive factors associated with the financial information and the product schedules.

20. The system of claim 17, the modifying further comprising inferring an event based at least in part on real-time input and historical data received from a non-human knowledge source.

* * * * *